(12) United States Patent
Urakabe et al.

(10) Patent No.: US 7,619,907 B2
(45) Date of Patent: Nov. 17, 2009

(54) DC/DC POWER CONVERSION DEVICE

(75) Inventors: Takahiro Urakabe, Tokyo (JP); Matahiko Ikeda, Tokyo (JP); Masaru Kobayashi, Tokyo (JP); Akihiko Iwata, Tokyo (JP); Tatsuya Okuda, Tokyo (JP); Hirotoshi Maekawa, Tokyo (JP); Toshiyuki Kikunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 12/059,109

(22) Filed: Mar. 31, 2008

(65) Prior Publication Data

US 2008/0252145 A1  Oct. 16, 2008

(30) Foreign Application Priority Data

Apr. 12, 2007 (JP) ............................. 2007-104521
Jan. 29, 2008 (JP) ............................. 2008-017182

(51) Int. Cl.
*H02M 5/45* (2006.01)

(52) U.S. Cl. ............................. 363/37; 363/69; 363/71

(58) Field of Classification Search .................. 363/17, 363/37, 67, 69, 71, 98, 132
See application file for complete search history.

(56) References Cited

U.S. PATENT DOCUMENTS 5,710,699 A * 1/1998 King et al. .................. 363/132
5,930,127 A * 7/1999 Iwahori et al. ................ 363/37
2003/0057923 A1 * 3/2003 Hofstetter et al. ............. 322/24
2007/0216425 A1 * 9/2007 Okamura et al. ............ 324/678
2008/0031019 A1 * 2/2008 Alexander .................... 363/37
2008/0253156 A1 * 10/2008 Urakabe et al. ............... 363/65

FOREIGN PATENT DOCUMENTS

JP      9-191638     7/1997

OTHER PUBLICATIONS

U.S. Appl. No. 12/441,025, filed Mar. 12, 2009, Ikeda, et al.
U.S. Appl. No. 12/439,829, filed Mar. 4, 2009, Urakabe, et al.
U.S. Appl. No. 12/060,542, filed Apr. 1, 2008, Urakabe, et al.

* cited by examiner

*Primary Examiner*—Jessica Han
(74) *Attorney, Agent, or Firm*—Oblon, Spivak, McClelland, Maier & Neustadt, L.L.P.

(57) ABSTRACT

A DC/DC power conversion device includes n-stage circuits comprised of an inverter circuit for driving which is connected between positive terminals and negative terminals of smoothing capacitors, and a rectifier circuit which is connected between positive terminals and negative terminals of smoothing capacitors; a first circuit corresponding to at least one among the n-stage circuits and configured by connecting in parallel cell circuits of m, second circuits corresponding to a plurality of remaining circuits of (n−1) among the n-stage circuits; capacitors for energy transfer connected between middle points of the cell circuits and middle points of the second circuits; and column circuits of m comprised of the cell circuits, the second circuits and the capacitors for energy transfer, wherein the middle points are contact points of high voltage sided elements and low voltage sided elements of the cell circuits and the second circuits; and driving signals for driving the respective column circuits have the same driving cycle and are out of phase with each other.

19 Claims, 20 Drawing Sheets

DC/DC POWER CONVERSION DEVICE

BACKGROUND OF THE INVENTION

1. Field of the Invention

The present invention relates to a DC/DC power conversion device for converting a DC voltage into a boosted or deboosted DC voltage.

2. Description of the Background Art

Japanese Unexamined Patent Application Publication No. H9-191638 discloses a DC/DC converter as a conventional DC/DC power conversion device. The DC/DC converter is comprised of inverter circuits including semiconductor switches connected to a voltage with a positive polarity (hereinafter, abbreviated to "positive voltage") and semiconductor switches connected to a voltage with a negative polarity (hereinafter, abbreviated to "negative voltage") and multiplier-rectifier circuits including a plurality of rectifiers connected in series and a plurality of capacitors connected in series. The inverter circuits generate alternating current (AC) voltages and the multiplier-rectifier circuits generate high DC voltages for application to a load.

Such conventional DC/DC power conversion device includes inverter circuits and rectifier circuits with smoothing capacitors connected in parallel, and performs DC/DC power conversion using charge-discharge of capacitors which are connected in series between the inverter circuits and the rectifier circuits. In this case, the smoothing capacitors supply currents together with the capacitors connected between the circuits. Since currents flowing through the capacitors connected between the respective circuits flow through overlapping the smoothing capacitors, ripple currents flowing through the smoothing capacitors increase. This causes heat-emission to be large in the smoothing capacitors and capacitances for permission of the currents to be also large, thereby increasing the size of the smoothing capacitors.

SUMMARY OF THE INVENTION

The present invention is directed to solve such problems and to provide a DC/DC power conversion device with smoothing capacitors disposed in parallel in each of a plurality of circuits including inverter circuits for driving and rectifier circuits and with use of charge-discharge of capacitors for energy transfer. Furthermore, the present invention is directed not only to make the device small-sized but also to increase reliability thereof by reducing ripple currents flowing through the respective smoothing capacitors disposed in parallel in each of the plurality of circuits and thereby decreasing capacitances of the smoothing capacitors.

A first DC/DC power conversion device according to the present invention includes n-stage circuits configured by connecting in series circuits of n (where n is 3 or more) comprised of an inverter circuit for driving, which is configured by connecting in series high voltage sided elements and low voltage sided elements made of semiconductor switching elements and by connecting them between positive terminals and negative terminals of smoothing capacitors, and a rectifier circuit, which is configured by connecting in series high voltage sided elements and low voltage sided elements made of semiconductor switching elements or diodes and by connecting them between positive terminals and negative terminals of smoothing capacitors; a first circuit corresponding to at least one among the n-stage circuits and configured by connecting in parallel cell circuits of m including the high voltage sided elements and the low voltage sided elements connected in series for connection between the positive and the negative terminals of the smoothing capacitors, second circuits corresponding to a plurality of remaining circuits of (n−1) among the n-stage circuits; capacitors for energy transfer connected between middle points of the cell circuits and middle points of the second circuits; and column circuits of m comprised of the cell circuits, the second circuits and the capacitors for energy transfer, wherein the first circuit is either the inverter circuit for driving or the rectifier circuit, and the second circuit is the remaining one between the inverter circuit for driving and the rectifier circuit; the middle points are contact points of the high voltage sided elements and the low voltage sided elements of the cell circuits and the second circuits; and driving signals for driving the respective column circuits have the same driving cycle and are out of phase with each other.

A second DC/DC power conversion device according to the present invention includes n-stage circuits configured by connecting in series circuits of n (where n is 3 or more) comprised of an inverter circuit for driving configured by connecting in series high voltage sided elements and low voltage sided elements made of semiconductor switching elements, and a rectifier circuit configured by connecting in series high voltage sided elements and low voltage sided elements made of semiconductor switching elements or diodes; a high voltage sided smoothing capacitor connected between a high voltage sided terminal of one high voltage sided circuit and a low voltage sided terminal of a predetermined low voltage sided circuit in the n-stage circuits, smoothing capacitors connected respectively between high voltage sided terminals and low voltage sided terminals of remaining low voltage sided circuits of (n−1) stages, a first circuit corresponding to at least one among the n-stage circuits and configured by connecting in parallel two cell circuits including the high voltage sided elements and the low voltage sided elements connected in series, a second circuits corresponding to a plurality of remaining circuits of (n−1) among the n-stage circuits; capacitors for energy transfer connected between middle points of the cell circuits and middle points of the second circuits, two column circuits comprised of the cell circuits, the second circuits and the capacitors for energy transfer, wherein the first circuit is either the inverter circuit for driving or the rectifier circuit, and the second circuit is the remaining one between the inverter circuit for driving and the rectifier circuit; the middle points are contact points of the high voltage sided elements and the low voltage sided elements of the cell circuits and the second circuits; and driving signals for driving the respective column circuits have the same driving cycle and are out of phase with each other.

According to the DC/DC power conversion device of the present invention, ripple currents flowing through the smoothing capacitors can be reduced. This restricts a heat-emission of the smoothing capacitors to increase reliability of the DC/DC power conversion device and conversion efficiency thereof. Furthermore, this reduces capacitances of the smoothing capacitors to promote making a small-sized structure of the device.

The foregoing and other objects, features, aspects and advantages of the present invention will become more apparent from the following detailed description when read in conjunction with the accompanying drawings.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principle of the invention.

DETAILED DESCRIPTION OF THE PREFERRED EMBODIMENTS OF THE INVENTION

Hereinafter, embodiments of the present invention will be described with reference to the accompanying drawings.

First Embodiment

A DC/DC power conversion device according to the first embodiment will now be described.

Figure 1:
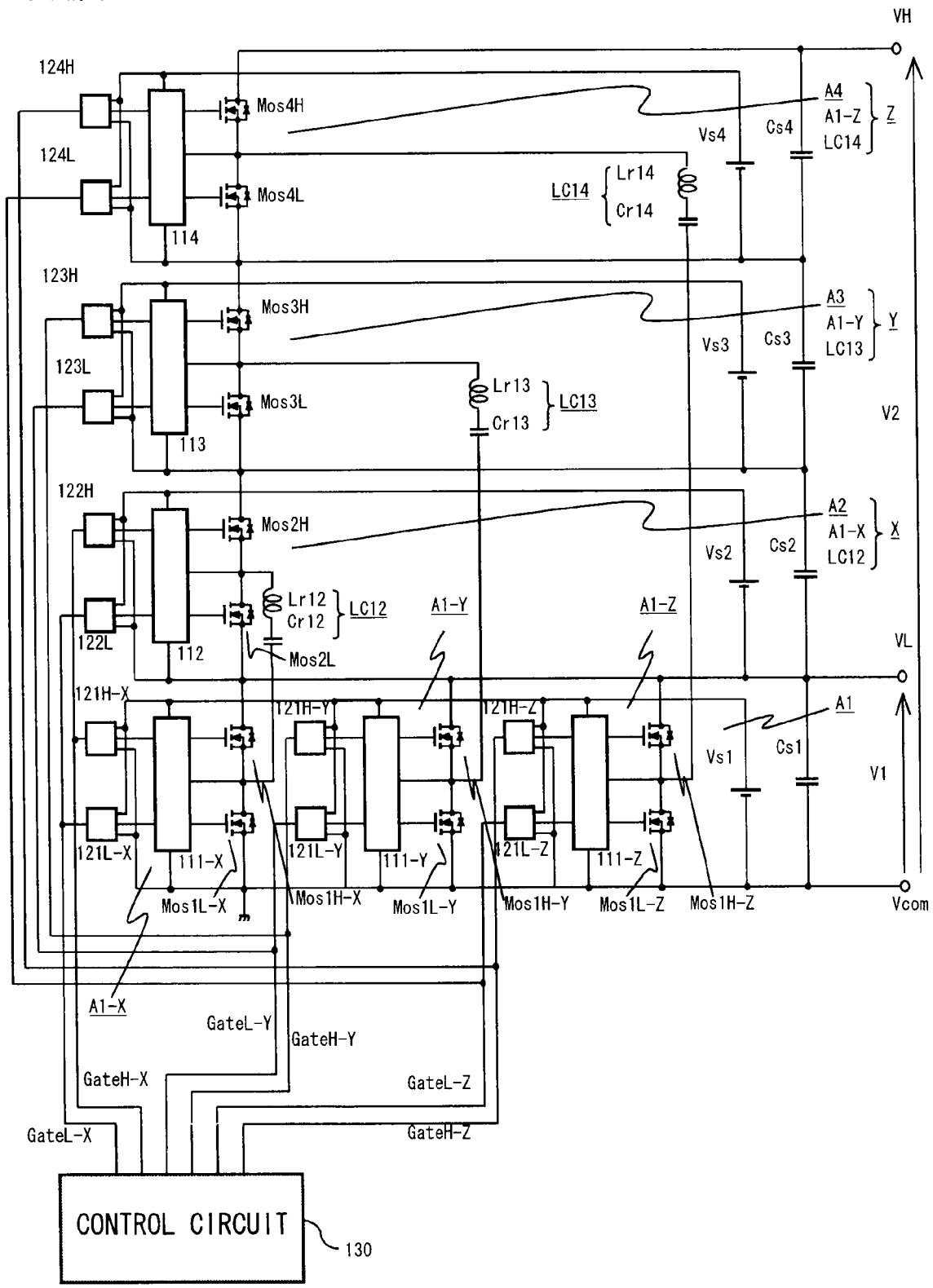
FIG. 1 is a block diagram to represent a circuital structure of a DC/DC power conversion device according to a first embodiment.

FIG. 1 is a block diagram to represent a circuital structure of a DC/DC power conversion device according to the first embodiment.

As shown in FIG. 1, a DC/DC power conversion device includes a circuit A1 as a first circuit with a plurality (in this case, 3) of cell circuits A1-X, A1-Y and A1-Z connected in parallel and circuits A2 to A4 as a second circuit. The circuit A1 as the first circuit and the circuits A2 to A4 as the second circuit are arranged for configuration of a plurality of stages (in this case, four stages). Furthermore, the DC/DC power conversion device includes voltage sources Vs1, Vs2, Vs3 and Vs4 for driving, smoothing capacitors Cs1, Cs2, Cs3 and Cs4 for smoothing input and output voltages and further functioning as voltage sources for energy transfer, a control circuit 130, and input and output voltage terminals Vcom, VL and VH. The DC/DC power conversion device has a function to convert a voltage V1 input across the voltage terminals VL and Vcom into a boosted voltage V2 about four times a magnitude of the voltage V1 for output across the voltage terminals VH and Vcom.

The circuit A1 is configured by connecting in parallel the cell circuits A1-X, A1-Y and A1-Z with two MOSFETs Mos1L-X and Mos1H-X, Mos1L-Y and Mos1H-Y, and Mos1L-Z and Mos1H-Z connected in series as a low voltage sided element and a high voltage sided element. The circuit A1 is connected between both terminals of the smoothing capacitor Cs1. The circuits A2, A3 and A4 are configured by connecting in series respectively two MOSFETs Mos2L and Mos2H, Mos3L and Mos3H, and Mos4L and Mos4H as a low voltage sided element and a high voltage sided element. The circuits A2, A3 and A4 are respectively connected between both terminals of the smoothing capacitors Cs2, Cs3 and Cs4. The circuit A1 and three circuits A2, A3 and A4 are connected in series to configure four-stage circuits.

Contact points of two MOSFETs in the cell circuits A1-X, A1-Y and A1-Z and the circuits A2, A3 and A4 are middle points. An LC serial body LC 12 including an energy transferring capacitor Cr12 and an inductor Lr12 connected in series for playing a part in transferring energy is connected between the middle points of the cell circuit A1-X and the circuit A2.

Likewise, An LC serial body LC 13 including an energy transferring capacitor Cr13 and an inductor Lr13 connected in series for playing a part in transferring energy is connected between the middle points of the cell circuit A1-Y and the circuit A3, and An LC serial body LC 14 including an energy transferring capacitor Cr14 and an inductor Lr14 connected in series for playing a part in transferring energy is connected between the middle points of the cell circuit A1-Z and the circuit A4. Values of resonant cycles determined by inductances of the inductors Lr and capacitances of the capacitors Cr of the respective LC serial bodies are set to be identical.

The DC/DC power conversion device includes three column circuits X, Y and Z such as a column circuit X comprised of the cell circuit A1-X, the circuit A2 and the LC serial body LC12, a column circuit Y comprised of the cell circuit A1-Y, the circuit A3 and the LC serial body LC13 and a column circuit z comprised of the cell circuit A1-Z, the circuit A4 and the LC serial body LC14.

Moreover, the DC/DC power conversion device includes gate driving circuits 111-X, 111-Y, 111-Z, and 112 to 114 and photocouplers 121L-X and 121H-X, 121L-Y and 121H-Y, 121L-Z and 121H-Z, and 122L and 122H to 124L and 124H for driving the MOSFETs in the respective cell circuits A1-X, A1-Y, A1-Z, A2, A3 and A4. Each MOSFET is a power MOSFET with a parasitic diode formed between a source and a drain thereof.

Connection relationship thereof will be described in detail.

The both terminals of the smoothing capacitor Cs1 are connected the voltage terminals VL and Vcom and the voltage terminal Vcom is grounded. The VL sided voltage terminal of the smoothing capacitor Cs1 is connected to one terminal of the smoothing capacitor Cs2 of which the other terminal is connected to one end of the smoothing capacitor Cs3. The other terminal of the smoothing capacitor Cs3 is connected to one end of the smoothing capacitor Cs4 of which the other terminal is connected to the voltage terminal VH.

The source terminals of the MOSFETs Mos1L-X, Mos1L-Y and Mos1L-Z are connected to the voltage terminal Vcom, the drain terminals thereof are connected to the source terminals of the MOSFETs Mos1H-X, Mos1H-Y and Mos1H-Z, and the drain terminals of the MOSFETs Mos1H-X, Mos1H-Y and Mos1H-Z are connected to the voltage terminal VL. The source terminal of the MOSFET Mos2L is connected to the low voltage sided terminal of the smoothing capacitor Cs2, the drain terminal of the MOSFET Mos2L is connected to the source terminal of the MOSFET Mos2H, and the drain terminal of the MOSFET Mos2H is connected to the high voltage sided terminal of the smoothing capacitor Cs2.

The source terminal of the MOSFET Mos3L is connected to the low voltage sided terminal of the smoothing capacitor Cs3, the drain terminal of the MOSFET Mos3L is connected to the source terminal of the MOSFET Mos3H, and the drain terminal of the MOSFET Mos3H is connected to the high voltage sided terminal of the smoothing capacitor Cs3.

The source terminal of the MOSFET Mos4L is connected to the low voltage sided terminal of the smoothing capacitor Cs4, the drain terminal of the MOSFET Mos4L is connected to the source terminal of the MOSFET Mos4H, and the drain terminal of the MOSFET Mos4H is connected to the high voltage sided terminal of the smoothing capacitor Cs4.

One terminal of the LC serial body LC12 is connected to a contact point of the MOSFETs Mos1L-X and Mos1H-X and the other terminal thereof is connected to a contact point of the MOSFETs Mos2L and Mos2H. One terminal of the LC serial body LC13 is connected to a contact point of the MOSFETs Mos1L-Y and Mos1H-Y and the other terminal thereof is connected to a contact point of the MOSFETs Mos3L and Mos3H. One terminal of the LC serial body LC14 is connected to a contact point of the MOSFETs Mos1L-Z and Mos1H-Z and the other terminal thereof is connected to a contact point of the MOSFETs Mos4L and Mos4H.

The gate terminals of the MOSFETs Mos1L-X and Mos1H-X are connected to an output terminal of the gate driving circuit 111-X, and an input terminal of the gate driving circuit 111-X is supplied with respective gate driving signals which have the voltage of the source terminal of the MOSFET Mos1L-X as a reference.

Likewise, the gate terminals of the MOSFETs (Mos1L-Y and Mos1H-Y), (Mos1L-Z and Mos1H-Z), (Mos2L and Mos2H) to (Mos4L and Mos4H) are connected to output terminals of the gate driving circuit 111-Y, 111-Z and 112 to 114, and input terminals of the gate driving circuit 111-Y, 111-Z and 112 to 114 are supplied with respective gate driving signals which have the voltages of the source terminals of the MOSFETs Mos1L-Y, Mos1L-Z and Mos2L to Mos4L as a reference. The gate driving circuits 111-X, 111-Y, 111-Z and 112 to 114 are typical bootstrap typed driving circuits, which are comprised of driving ICs for driving half-bridge inverter circuits or capacitors for driving high voltage sided MOSFETs, and so on.

A gate driving signal for driving the MOSFET Mos1L-X is generated from the photocoupler 121L-X and a gate driving signal for driving the MOSFET Mos1H-X is generated from the photocoupler 121H-X.

Likewise, gate driving signals for driving the MOSFETs Mos1L-Y, Mos1L-Z and Mos2L to Mos4L are generated from the photocouplers 121L-Y, 121L-Z and 122L to 124L, and gate driving signals for driving the MOSFET Mos1H-Y, Mos1H-Z, Mos2H to Mos4H are generated from the photocouplers 121H-Y, 121H-Z and 122H to 124H.

The control circuit 130 generates gate signals GateL-X and GateH-X, GateL-Y and GateH-Y, and GateL-Z and GateH-Z for the respective column circuits X, Y and Z. In this case, the gate signals are generated by a signal processing circuit such as a micro-computer in the control circuit 130.

The photocouplers 121L-X and 122L of the column circuit X are applied with the gate signal GateL-X, and the photocouplers 121H-X and 122H thereof are applied with the gate signal GateH-X. The photocouplers 121L-Y and 123L of the column circuit Y are applied with the gate signal GateL-Y, and the photocouplers 121H-Y and 123H thereof are applied with the gate signal GateH-Y. The photocouplers 121L-Z and 124L of the column circuit Z are applied with the gate signal GateL-Z, and the photocouplers 121H-Z and 124H thereof are applied with the gate signal GateH-Z.

The voltage source Vs1 is provided for driving the MOSFETs, the gate driving circuits and the photocouplers which have the voltages of the source terminals of the MOSFETs Mos1L-X, Mos1L-Y and Mos1L-Z as a reference, and the respective voltage sources Vs2, Vs3 and Vs4 are provided for driving the MOSFETs, the gate driving circuits and the photocouplers which have the voltages of the source terminals of the MOSFETs Mos2L, Mos3L and Mos4L as a reference. The photocouplers are disposed in order to disconnect the gate signals and the gate driving signals electrically.

The operation thereof will now be described.

The circuit A1 as the first circuit operates as an inverter circuit for driving which transmits energy input across the voltage terminals VL and Vcom to the high voltage side by on and off operations of the MOSFETs in the respective cell circuits A1-X, A1-Y and A1-Z comprising the circuit A1. In other words, the respective cell circuits A1-X, A1-Y and A1-Z are used as inverter circuits for driving.

In the column circuit X, the cell circuit A1-X operates as an inverter circuit for driving which transmits energy input across the voltage terminals VL and Vcom to the high voltage side by on and off operations of the MOSFETs Mos1L-X and Mos1H-X, and the circuit A2 operates as a rectifier circuit to rectify currents driven by the cell circuit A1-X and to transmit energy to the high voltage side.

In the column circuit Y, the cell circuit A1-Y operates as an inverter circuit for driving which transmits energy input across the voltage terminals VL and Vcom to the high voltage side by on and off operations of the MOSFETs Mos1L-Y and Mos1H-Y, and the circuit A3 operates as a rectifier circuit to rectify currents driven by the cell circuit A1-Y and to transmit energy thereto.

In the column circuit Z, the cell circuit A1-Z operates as an inverter circuit for driving which transmits energy input across the voltage terminals VL and Vcom to the high voltage side by on and off operations of the MOSFETs Mos1L-Z and Mos1H-Z, and the circuit A4 operates as a rectifier circuit to rectify currents driven by the cell circuit A1-Z and to transmit energy thereto.

The control circuit 130 generates the gate signals GateL-X and GateH-X, GateL-Y and GateH-Y, and GateL-Z and GateH-Z for the respective column circuits X, Y and Z, and the respective column circuits X, Y and Z are driven thereby.

Figure 2:
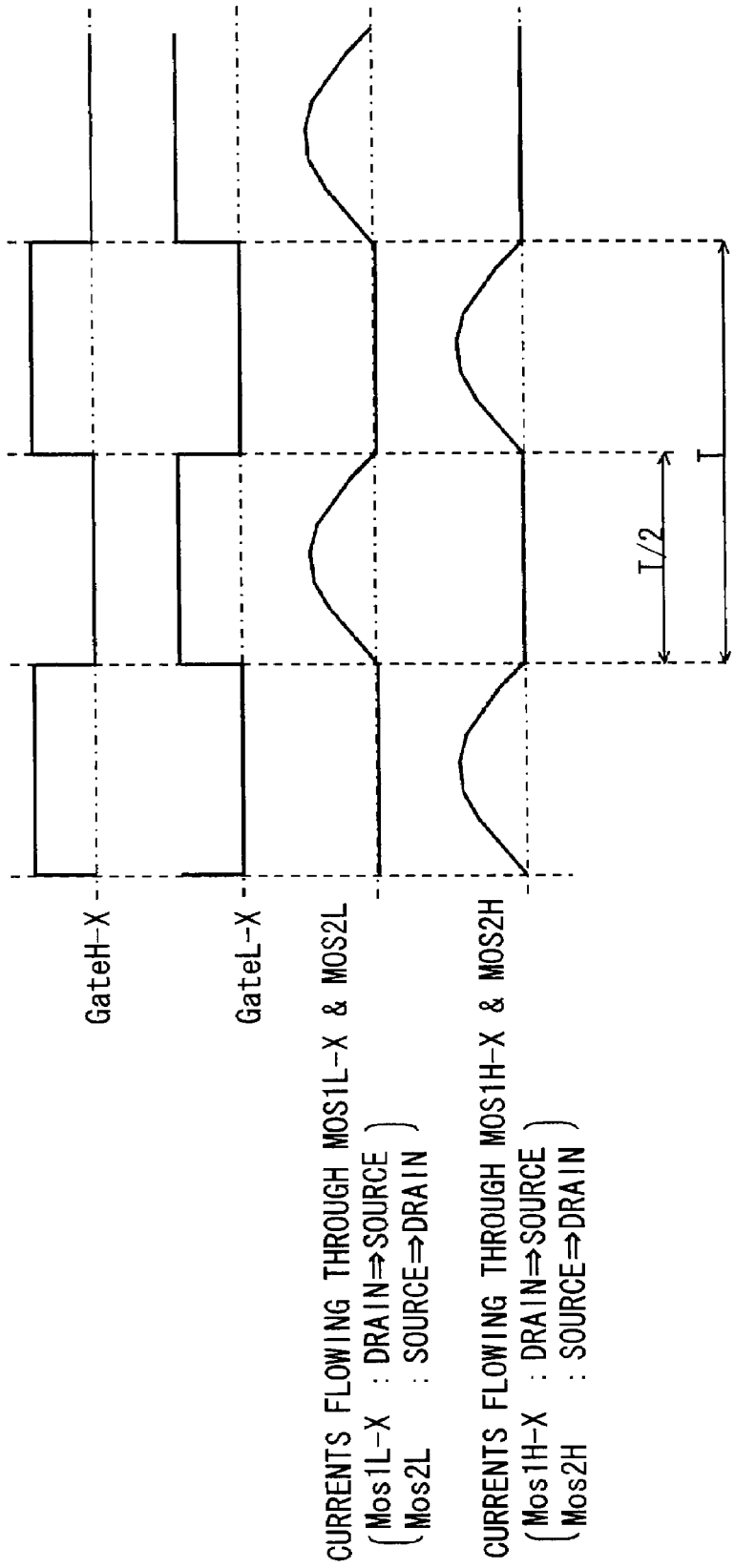
FIG. 2 shows waveforms of gate signals and current waveforms of respective elements according to the first embodiment.

FIG. 2 shows waveforms of the gate signals GateH-X and GateL-X for the column circuit X, and those of currents flowing through the low voltage sided MOSFETs Mos1L-X and Mos2L and currents flowing through the high voltage sided MOSFETs Mos1H-X and Mos2H in the inverter circuit for driving A1-X and the rectifier circuit A2. The currents flow from the drain to the source in the MOSFET of the inverter circuit for driving A1-X and the currents flow from the source to the drain in the MOSFET of the rectifier circuit A2. The MOSFETs turn on at high levels of the gate signals.

As shown in FIG. 2, the gate signals GateL-X and GateH-X are ON and OFF signals having a resonant cycle T determined by the LC serial bodies LC12, LC13 and LC 14 including Lr and Cr, and a duty ratio of about 50%. The waveforms of the gate signals GateL-Y, GateH-Y, GateL-Z and GateH-Z input to the column circuits Y and Z and currents flowing through the respective MOSFETs in the column circuits Y and Z are the same as those in shown FIG. 2.

The capacitances of the smoothing capacitors Cs1, Cs2, Cs3 and Cs4 are set to be sufficiently larger than those of the capacitors Cr12, Cr13 and Cr14 of the LC serial bodies.

As described above, the voltage V1 input across the voltage terminals VL and Vcom is converted into the voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs1 is charged with the voltage V1 and the smoothing capacitors Cs2, Cs3 and Cs4 are charged with an average voltage of (V2−V1)/3.

The operation of the column circuit X comprised of the cell circuit A1-X, the circuit A2 and the LC serial body LC12 will be described.

When the low voltage sided MOSFETs Mos1L-X and Mos2L of the respective cell circuits A1-X and the circuit A2 turn on by the gate signal GateL-X for the low voltage sided MOSFETs, some energy accumulated in the smoothing capacitor Cs1 is transferred to the capacitor Cr12 via a following path due to voltage differences therebetween.

Cs1⇒Mos2L⇒Lr12⇒Cr12⇒Mos1L-X

Subsequently, when the high voltage sided MOSFETs Mos1H-X and Mos2H of the cell circuit A1-X and the circuit A2 turn on by the gate signal GateH-X for the high voltage sided MOSFETs, energy accumulated in the capacitor Cr12 is transferred to the smoothing capacitor Cs2 via a following path due to voltage differences therebetween.

Cr12⇒Lr12⇒Mos2H⇒Cs2⇒Mos1H-X

The operation of the column circuit Y comprised of the cell circuit A1-Y, the circuit A3 and the LC serial body LC13 will now be described.

When the low voltage sided MOSFETs Mos1L-Y and Mos3L of the cell circuit A1-Y and the circuit A3 turn on by the gate signal GateL-Y for the low voltage sided MOSFETs, some energy accumulated in the smoothing capacitors Cs1 and Cs2 is transferred to the capacitor Cr13 via a following path due to voltage differences therebetween.

Cs1⇒Cs2⇒Mos3L⇒Lr13⇒Cr13⇒Mos1L-Y

Subsequently, when the high voltage sided MOSFETs Mos1H-Y and Mos3H of the cell circuit A1-Y and the circuit A3 turn on by the gate signal GateH-Y for the high voltage sided MOSFETs, energy accumulated in the capacitor Cr13 is transferred to the smoothing capacitors Cs2 and Cs3 via a following path due to voltage differences therebetween.

Cr13⇒Lr13⇒Mos3H⇒Cs3⇒Cs2⇒Mos1H-Y

The operation of the column circuit Z comprised of the cell circuit A1-Z, the circuit A4 and the LC serial body LC14 will be described.

When the low voltage sided MOSFETs Mos1L-Z and Mos4L of the cell circuit A1-Z and the circuit A4 turn on by the gate signal GateL-Z for the low voltage sided MOSFETs, some energy accumulated in the smoothing capacitors Cs1, Cs2 and Cs3 is transferred to the capacitor Cr14 via a following path due to voltage differences therebetween.

Cs1⇒Cs2⇒Cs3⇒Mos4L⇒Lr14⇒Cr14⇒Mos1L-Z

Subsequently, when the high voltage sided MOSFETs Mos1H-Z and Mos4H of the cell circuit A1-Z and the circuit A4 turn on by the gate signal GateH-Z for the high voltage sided MOSFETs, energy accumulated in the capacitor Cr14 is transferred to the smoothing capacitors Cs2, Cs3 and Cs4 via a following path due to voltage differences therebetween.

Cr14⇒Lr14⇒Mos4H⇒Cs4⇒Cs3⇒Cs2⇒Mos1H-Z

As above, energy is transferred from the smoothing capacitor Cs1 to the smoothing capacitors Cs2, Cs3 and Cs4 by the charge-discharge of the capacitors Cr12, Cr13 and Cr14. Furthermore, the voltage V1 input across the voltage terminals VL and Vcom is converted into the boosted voltage V2 four times the magnitude of the voltage V1 for output across the voltage terminals VH and Vcom.

Since the respective capacitors Cr12, Cr13 and Cr14 are connected in series to the respective inductors Lr12, Lr13 and Lr14 to configure the LC serial bodies LC12, LC13 and LC14, the transfer of the energy uses a resonant phenomenon, and thus a large amount of energy can be transferred efficiently.

Moreover, since the rectifier circuits A2 to A4 adopt the MOSFETs in the present embodiment, conduction loss can be reduced and efficiency of power conversion can be increased relative to a case of adopting diodes described later as well.

The respective column circuits X, Y and Z operate as described above. The entire operation of the DC/DC power conversion device with three column circuits X, Y and Z will now be described.

Figure 3:
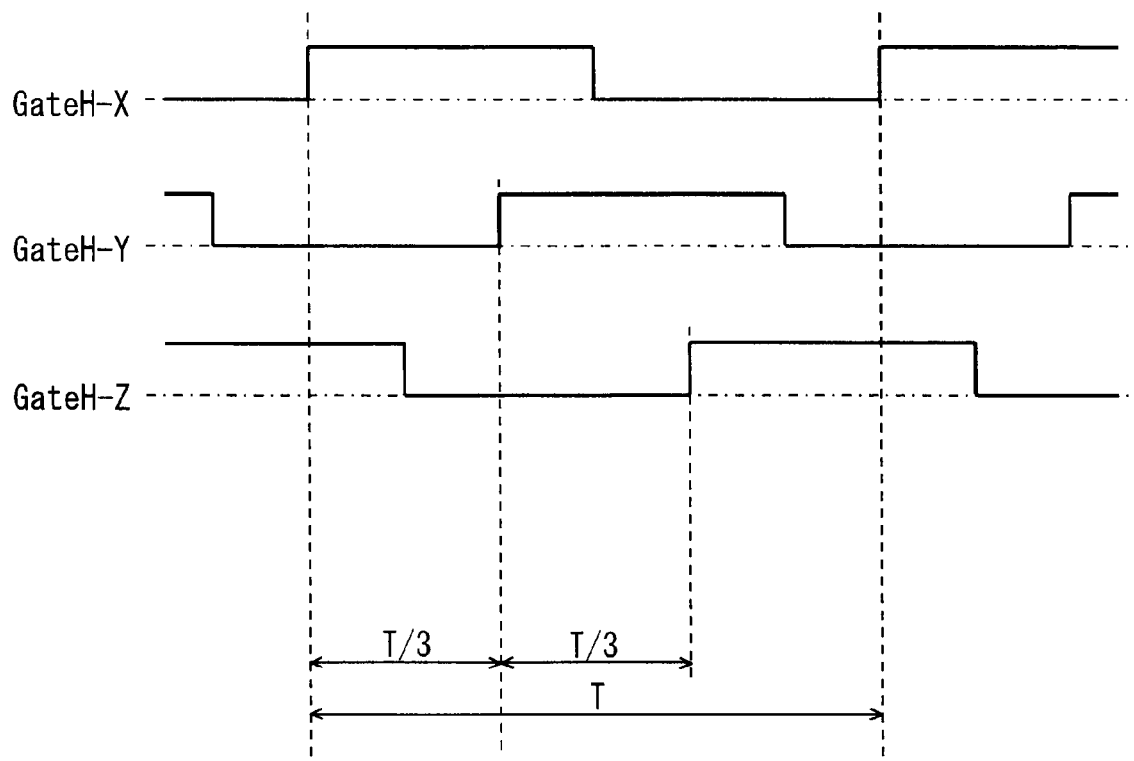
FIG. 3 shows waveforms of gate signals for driving respective column circuits according to the first embodiment.

FIG. 3 shows waveforms of the gate signals GateH-X, GateH-Y and GateH-Z for driving the high voltage sided MOSFETs of the respective column circuits X, Y and Z. Inversion signals of such gate signals GateH-X, GateH-Y and GateH-Z are the gate signals GateL-X, GateL-Y and GateL-Z for driving the low voltage sided MOSFETs as shown in FIG. 2.

Referring to FIG. 3, the gate signals for driving the respective column circuits X, Y and Z have the same cycle T and are also out of phase with each other, i.e., with the column circuits X and Y, with column circuits Y and Z, and with the column circuits X and Z, by T/3.

Figure 4:
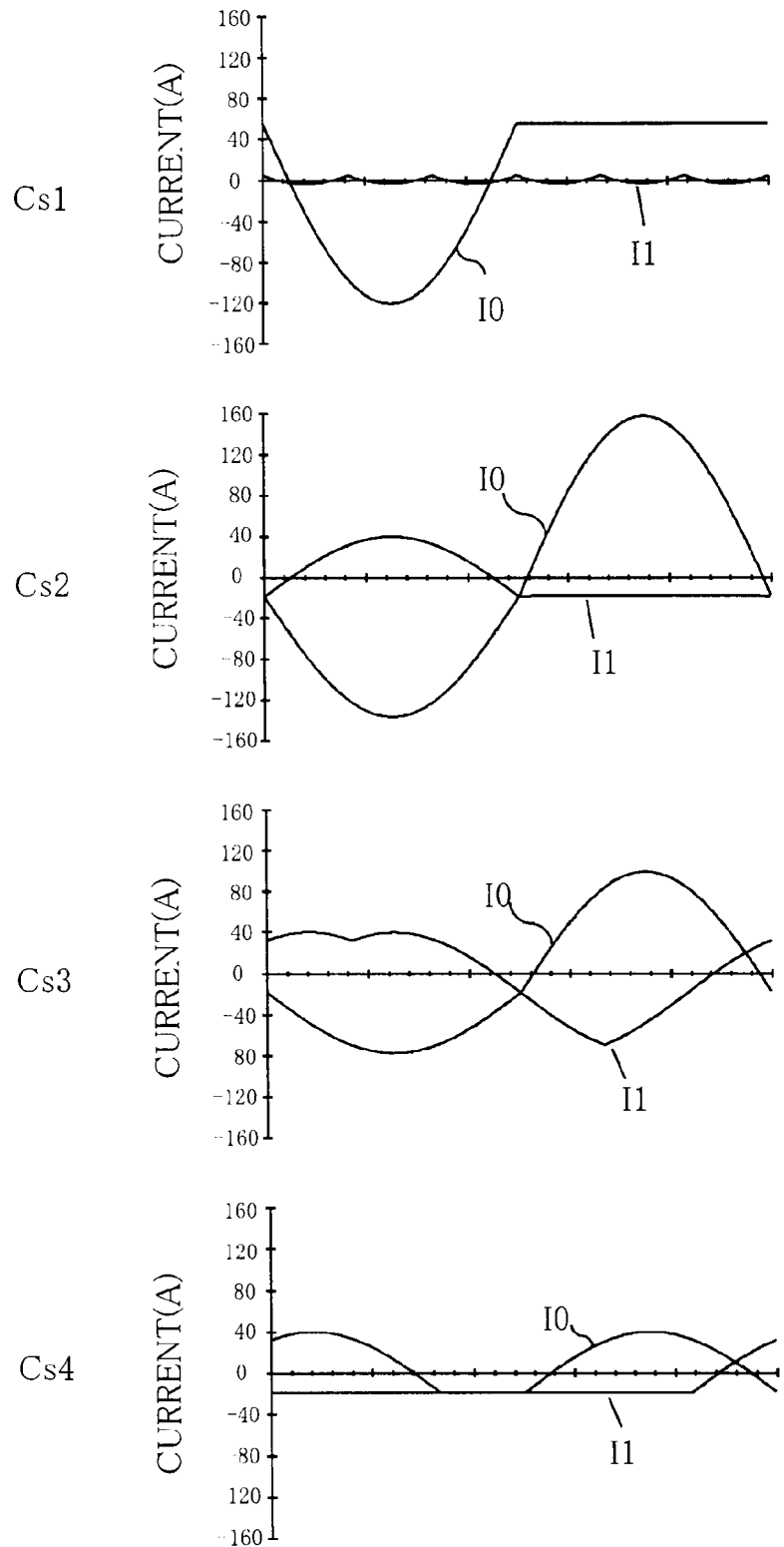
FIG. 4 shows waveforms of currents flowing through smoothing capacitors according to the first embodiment together with comparative examples.

For example, FIG. 4 shows waveforms of currents flowing through the smoothing capacitors Cs1, Cs2, Cs3 and Cs4 under the condition of the voltage V1 of 72V and an input DC current of 75 A.

FIG. 4 shows the waveforms of currents flowing through the respective smoothing capacitors Cs1, Cs2, Cs3 and Cs4 for a case driven with three column circuits out of phase with each other by T/3 (represented by I1), that is, according to the present embodiment, and the waveforms of currents flowing through the smoothing capacitors Cs1, Cs2, Cs3 and Cs4 for a case driven with three column circuits in phase with each other as comparative examples (represented by I0). The longitudinal axis represents currents and the transverse axis represents time.

As shown in FIG. 4, the case driven with three column circuits out of phase with each other reduces ripple currents flowing through the smoothing capacitors Cs1, Cs2 and Cs3.

As above, the first circuit A1, which operates as an inverter circuit for driving, among the four-stage circuits A1, A2, A3 and A4 is configured by connecting in parallel three cell circuits A1-X, A1-Y and A1-Z. The column circuit X is comprised of the cell circuit A1-X and the circuit A2, the column circuit Y is comprised of the cell circuit A1-Y and the circuit A3, and the column circuit Z is comprised of the cell circuit A1-Z and the circuit A4 in the DC/DC power conversion device. The respective column circuits X, Y and Z have the same driving cycle T and are out of phase with each other by T/3, or $2\pi/3$(rad) for driving the DC/DC power conversion device. With this, charge-discharge timing of the smoothing capacitors Cs1, Cs2, Cs3 and Cs4 become different, the currents flowing to the smoothing capacitors Cs1, Cs2 and Cs3 are generated dispersedly within one cycle, and the charge-discharge currents are circulated among the column circuits X, Y and Z as well, thereby reducing the AC currents (ripple currents) flowing through the smoothing capacitors Cs1, Cs2 and Cs3.

Such reduction of the ripple currents flowing through the smoothing capacitors has following effects.

A heat-emission of the smoothing capacitors is restricted and reliability of the DC/DC power conversion device is increased. Moreover, a loss due to resistance component is reduced by the ripple current reduction and efficiency for power conversion is increased. Capacitances required for the smoothing capacitors are reduced and the size thereof is made smaller, and thereby a structure of the device can be promoted to be made small-sized. Moreover, a ceramic capacitor with a large loss for induced electricity but small size can be adopted as the smoothing capacitor and thus the size of the smoothing capacitor can be made much smaller.

Although the number of the column circuits has been three in the present embodiment, a DC/DC power conversion device may include an n-stage circuit A1 to An of 3 or 5 more. In this case, the first circuit A1 operating as an inverter circuit for driving is configured by connecting in parallel (n−1) cell circuits and (n−1) column circuits is configured by making up the (n−1) cell circuits and the (n−1)-stage circuit A2 to An.

And the respective column circuits have the same driving cycle T and are also out of phase with each other by T/(n−1), or $2\pi/(n-1)$ (rad) for driving the DC/DC power conversion device, and thus an effect of reducing the ripple currents flowing through the smoothing capacitors is acquired. Furthermore, as the number of the column circuits is more, the currents flowing through the smoothing capacitors are generated more dispersedly within one cycle, so the ripple currents are reduced efficiently.

When the number of the column circuits is m, a driving such as being out of phase with each other by T/m, or $2\pi/m$ (rad) among the column circuits is the most effective; a phase difference, however, is not limited thereto, the charge-discharge currents flowing through the smoothing capacitors can be circulated among the column circuits by being out of phase with the column circuits, thereby reducing the ripple currents.

Second Embodiment

Although the first embodiment represents a voltage boost typed DC/DC power conversion device which boosts the voltage V1 into the voltage V2 about four times higher than that, the second embodiment represents a voltage deboost typed DC/DC power conversion device which deboosts the voltage V2 into V1.

The circuital structure of the DC/DC power conversion device according to the present embodiment is the same as that shown in FIG. 1; in this case, however, circuits A2, A3 and A4 of the respective column circuits X, Y and Z operate as an inverter circuit for driving. A circuit A1 operates as a rectifier circuit to rectify currents driven by the inverter circuits for driving and to transfer energy to a low voltage side. That is, the respective cell circuits A1-X, A1-Y and A1-Z are adopted as a rectifier circuit.

In detail, in the column circuit X, the circuit A2 operates as an inverter circuit for driving and the cell circuit A1-X operates as a rectifier circuit. In the column circuit Y, the circuit A3 operates as an inverter circuit for driving and the cell circuit A1-Y operates as a rectifier circuit. In the column circuit Z, the circuit A4 operates as an inverter circuit for driving and the cell circuit A1-Z operates as a rectifier circuit.

The control circuit 130 generates the gate signals GateL-X and GateH-X, GateL-Y and GateH-Y, and GateL-Z and GateH-Z for the respective column circuits X, Y and Z, and the respective column circuits X, Y and Z are driven thereby.

Figure 5:
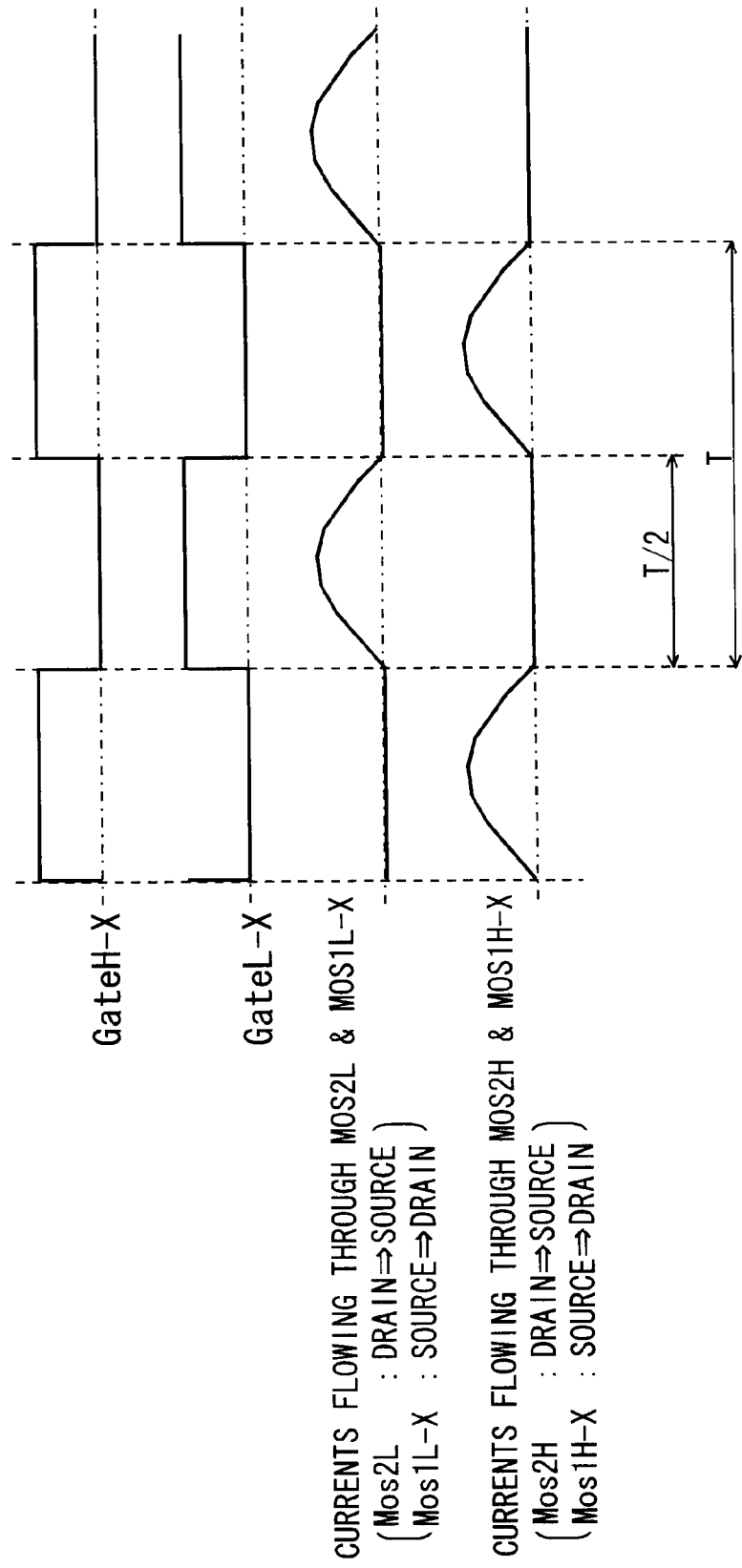
FIG. 5 shows waveforms of gate signals and current waveforms of respective elements according to a second embodiment.

FIG. 5 shows waveforms of the gate signals GateH-X and GateL-X for the column circuit X, and those of currents flowing through the low voltage sided MOSFETs Mos2L and Mos1L-X and currents flowing through the high voltage sided MOSFETs Mos2H and Mos1H-X in the inverter circuit A2 for driving and the rectifier circuit A1-X.

The currents flow from the drain to the source in the MOSFET of the inverter circuit A2 for driving and the currents flow from the source to the drain in the MOSFET of the rectifier circuit A1-X. The MOSFETs turn on at high levels of the gate signals.

As shown in FIG. 5, the gate signals GateL-X and GateH-X are ON and OFF signals having a resonant cycle T determined by the LC serial bodies LC12, LC13 and LC 14 including Lr and Cr, and a duty ratio of about 50%. The waveforms of the gate signals GateL-Y, GateH-Y, GateL-Z and GateH-Z input to the column circuits Y and Z and currents flowing through the respective MOSFETs in the column circuits Y and Z are the same as those in shown FIG. 5.

The capacitances of the smoothing capacitors Cs1, Cs2, Cs3 and Cs4 are set to be sufficiently larger than those of the capacitors Cr12, Cr13 and Cr14 of the LC serial bodies.

Since the voltage V2 input across the voltage terminals VH and Vcom is converted into the deboosted voltage V1 a quarter time lower than that for output across the voltage terminals VL and Vcom, a load is connected between the voltage terminal VL and Vcom, and thus the voltage V2 has a higher value than 4×V1. In the steady state, the smoothing capacitor Cs1 is charged with the voltage V1 and the smoothing capacitors Cs2, Cs3 and Cs4 are charged with an average voltage of (V2−V1)/3.

The operation of the column circuit X comprised of the cell circuit A1-X, the circuit A2 and the LC serial body LC12 will be described.

When the high voltage sided MOSFETs Mos1H-X and Mos2H of the respective cell circuits A1-X and the circuit A2 turn on by the gate signal GateH-X for the high voltage sided MOSFETs, energy accumulated in the smoothing capacitor Cs2 is transferred to the capacitor Cr12 via a following path due to voltage differences therebetween.

Cs2⇒Mos2H⇒Lr12⇒Cr12⇒Mos1H-X

Subsequently, when the low voltage sided MOSFETs Mos1L-X and Mos2L of the cell circuit A1-X and the circuit A2 turn on by the gate signal GateL-X for the low voltage sided MOSFETs, energy accumulated in the capacitor Cr12 is transferred to the smoothing capacitor Cs1 via a following path due to voltage differences therebetween.

Cr12⇒Lr12⇒Mos2L⇒Cs1⇒Mos1L-X

The operation of the column circuit Y comprised of the cell circuit A1-Y, the circuit A3 and the LC serial body LC13 will be described.

When the high voltage sided MOSFETs Mos1H-Y and Mos3H of the respective cell circuits A1-Y and the circuit A3 turn on by the gate signal GateH-Y for the high voltage sided MOSFETs, some energy accumulated in the smoothing capacitors Cs2 and Cs3 is transferred to the capacitor Cr13 via a following path due to voltage differences therebetween.

Cs2⇒Cs3⇒Mos3H⇒Lr13⇒Cr13⇒Mos1H-Y

Subsequently, when the low voltage sided MOSFETs Mos1L-Y and Mos3L of the cell circuit A1-Y and the circuit A3 turn on by the gate signal GateL-Y for the low voltage sided MOSFETs, energy accumulated in the capacitor Cr13 is transferred to the smoothing capacitors Cs1 and Cs2 via a following path due to voltage differences therebetween.

Cr13⇒Lr13⇒Mos3L⇒Cs2⇒Cs1⇒Mos1L-Y

The operation of the column circuit Z comprised of the cell circuit A1-Z, the circuit A4 and the LC serial body LC14 will be described.

When the high voltage sided MOSFETs Mos1H-Z and Mos4H of the respective cell circuits A1-Z and the circuit A4 turn on by the gate signal GateH-Z for the high voltage sided MOSFETs, energy accumulated in the smoothing capacitors Cs2, Cs3 and Cs4 is transferred to the capacitor Cr14 via a following path due to voltage differences therebetween.

Cs2⇒Cs3⇒Cs4⇒Mos4H⇒Lr14⇒Cr14⇒Mos1H-Z

Subsequently, when the low voltage sided MOSFETs Mos1L-Z and Mos4L of the cell circuit A1-Z and the circuit A4 turn on by the gate signal GateL-Z for the low voltage sided MOSFETs, energy accumulated in the capacitor Cr14 is transferred to the smoothing capacitors Cs1, Cs2 and Cs3 via a following path due to voltage differences therebetween.

Cr14⇒Lr14⇒Mos4L⇒Cs3⇒Cs2⇒Cs1⇒Mos1L-Z

As above, energy is transferred from the smoothing capacitors Cs2, Cs3 and Cs4 to the smoothing capacitor Cs1 by the charge-discharge of the capacitors Cr12, Cr13 and Cr14. Furthermore, the voltage V2 input across the voltage terminals VH and Vcom is converted into the deboosted voltage V1 about a quarter time lower than the voltage V1 for output across the voltage terminals VL and Vcom.

Since the respective capacitors Cr12, Cr13 and Cr14 are connected in series to the respective inductors Lr12, Lr13 and Lr14 to configure the LC serial bodies LC12, LC13 and LC14, the transfer of the energy uses a resonant phenomenon, and thus a large amount of energy can be transferred efficiently.

Moreover, since the cell circuits A1-X, A1-Y, A1-Z in the rectifier circuits A1 adopt the MOSFETs in the present embodiment, conduction loss can be reduced and efficiency of power conversion can be also increased relative to a case of adopting diodes described later.

The respective column circuits X, Y and Z operate as described above. And the driving signals for driving the respective column circuits X, Y and Z have the same driving cycle T (where T is a resonant cycle determined by the LC serial body) and are also out of phase with each other by T/3, or 2π/3 (rad) like the first embodiment (Refer to FIG. 3). With this, charge-discharge timing of the smoothing capacitors Cs1, Cs2, Cs3 and Cs4 become different, the currents flowing to the smoothing capacitors Cs1, Cs2 and Cs3 are generated dispersedly within one cycle, and the charge-discharge currents are circulated among the column circuits X, Y and Z as well, thereby reducing the AC currents (ripple currents) flowing through the smoothing capacitors Cs1, Cs2 and Cs3 like the first embodiment. Such reduction of the ripple currents flowing through the smoothing capacitors causes reliability of the DC/DC power conversion device to be increased, efficiency for power conversion to be increased and a structure of the device to be made small-sized like the first embodiment.

In the present embodiment, too, not limited to the number of the column circuits and the phase difference as described above, an effect of reducing the ripple currents flowing through the smoothing capacitors is acquired by arranging a plurality thereof (m) and being out of phase with each other for operation of the column circuits.

Moreover, a driving such as being out of phase with each other by T/m, or 2π/m(rad) among the column circuits is the most effective, and, as the number of the column circuits is more, the currents flowing through the smoothing capacitors are generated more dispersedly within one cycle, thereby reducing the ripple currents efficiently.

Furthermore, although the first embodiment represents the voltage boost typed DC/DC power conversion device of V1⇒V2 and the second embodiment represents the voltage deboost typed DC/DC power conversion device of V2⇒V1, energy transfer in both directions can be realized by including both of two functions of the first and the second embodiments.

In this case, if V1×4>V2, an operation of boosting voltage is performed, and, on boosting voltage, the circuit A1 is used as an inverter circuit for driving and the circuits A2, A3 and A4 are used as a rectifier circuit. Further, if V1×4<V2, an operation of deboosting voltage is performed, and, on deboosting voltage, the circuits A2, A3 and A4 are used as an inverter circuit for driving and the circuit A1 is used as a rectifier circuit.

The boosting-deboosting DC/DC power conversion device controlled as described above obtains the same effects as the first and the second embodiments and can be also used widely due to realization of energy transfer in both directions using one device.

Third Embodiment

A DC/DC power conversion device according to the third embodiment of the present invention will now be described.

Figure 6:
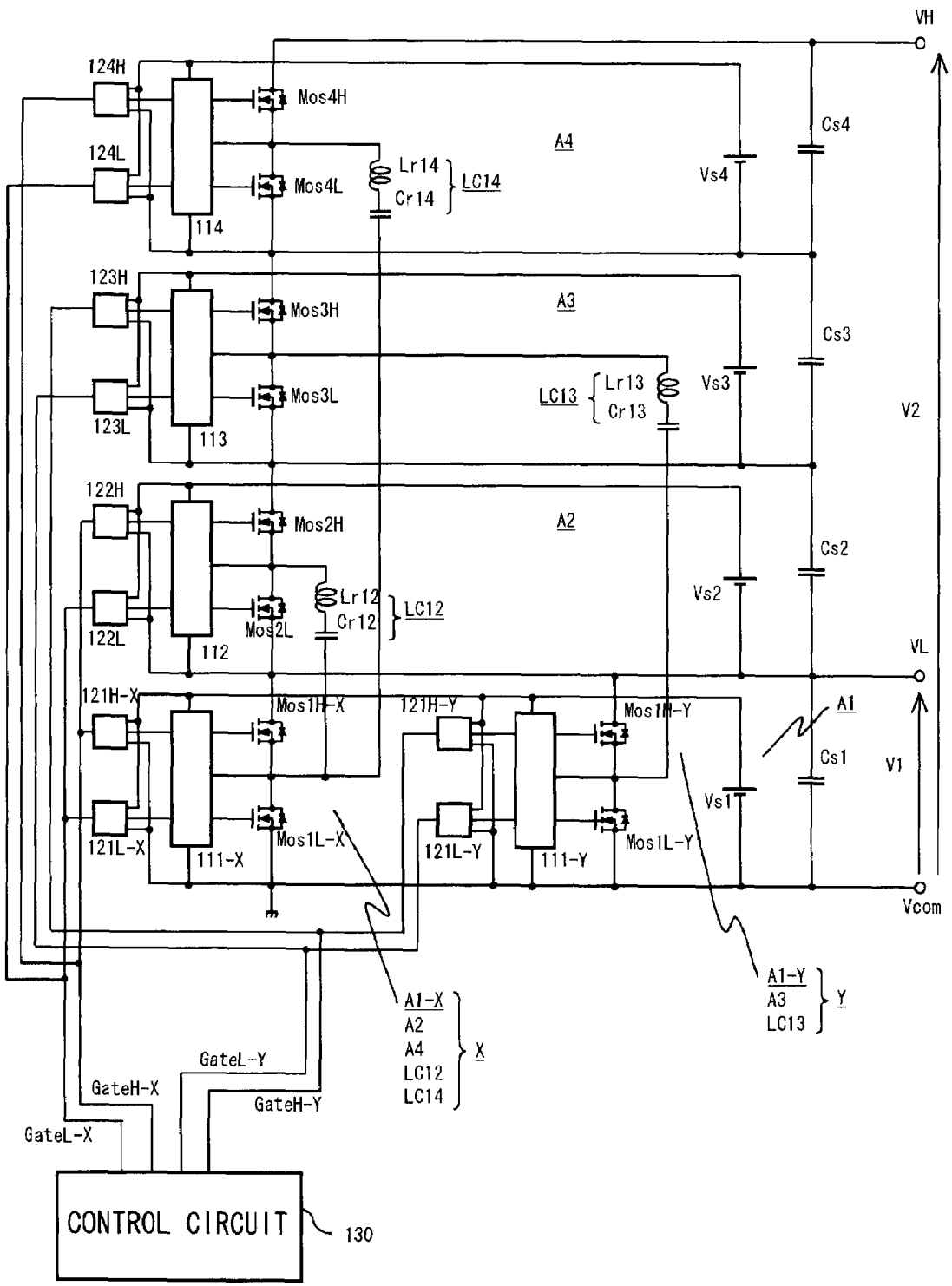
FIG. 6 is a block diagram to represent a circuital structure of a DC/DC power conversion device according to a third embodiment.

FIG. 6 is a block diagram to represent a circuital structure of a DC/DC power conversion device according to the third embodiment of the present invention.

As shown in FIG. 6, a DC/DC power conversion device includes a circuit A1 as a first circuit with two cell circuits A1-X and A1-Y connected in parallel and three circuits A2 to A4 as a second circuit. The circuit A1 as the first circuit and the circuits A2 to A4 as the second circuit are arranged for configuration of a plurality of stages (in this case, four stages). Furthermore, the DC/DC power conversion device includes voltage sources Vs1, Vs2, Vs3 and Vs4 for driving, smoothing capacitors Cs1, Cs2, Cs3 and Cs4 for smoothing input and output voltages and further functioning as voltage sources for energy transfer, a control circuit 130, and input and output voltage terminals Vcom, VL and VH. The DC/DC power conversion device has a function to convert a voltage V1 input across the voltage terminals VL and Vcom into a boosted voltage V2 about four times a magnitude of the voltage V1 for output across the voltage terminals VH and Vcom.

The respective cell circuits A1-X and A1-Y, and the second circuits A2 to A4 are configured by connecting two MOSFETs in series as a low voltage sided element and a high voltage sided element in the same manner as the first embodiment. The first circuit A1 is configured by connecting in parallel the cell circuits A1-X and A1-Y and connecting them between both terminals of the smoothing capacitor Cs1.

Three circuits A2, A3 and A4 are connected between both terminals of the smoothing capacitors Cs2, Cs3 and Cs4, respectively. The circuit A1 and the circuits A2, A3 and A4 are connected in series to configure four-stage circuits. Contact points of two MOSFETs in the cell circuits A1-X, A1-Y and the circuits A2, A3 and A4 are middle points. LC serial bodies LC12 and LC14 include capacitors Cr12 and Cr14 and inductors Lr12 and Lr14 connected in series and play a part in transferring energy. LC serial bodies LC12 and LC14 are respectively connected between the middle point of the cell circuit A1-X and the middle points of two circuits A2 and A4.

An LC serial body LC 13 include a capacitor Cr13 and an inductor Lr13 connected in series and play a part in transferring energy. An LC serial body LC 13 is connected between the middle point of the cell circuit A1-Y and the middle point of the circuit A3.

Values of resonant cycles determined by inductances of the inductors Lr and capacitances of the capacitors Cr of the respective LC serial bodies are set to be identical.

The DC/DC power conversion device includes two column circuits X and Y such as a column circuit X comprised of the cell circuit A1-X, the circuits A2 and A4 and the LC serial bodies LC12 and LC14, and a column circuit Y comprised of the cell circuit A1-Y, the circuit A3 and the LC serial body LC13. Moreover, the DC/DC power conversion device includes gate driving circuits 111-X and 111-Y, and 112 to 114 and photocouplers 121L-X and 121H-X, 121L-Y and 121H-Y, and 122L and 122H to 124L and 124H for driving the MOSFETs in the respective cell circuits A1-X and A1-Y, and the circuits A2, A3 and A4. Each MOSFET is a power MOSFET with a parasitic diode formed between a source and a drain thereof.

The operation thereof will now be described.

The circuit A1 as the first circuit operates as an inverter circuit for driving which transmits energy input across the voltage terminals VL and Vcom to the high voltage sides. In other words, the respective cells A1-X and A1-Y are used as inverter circuits for driving.

In the column circuit X, the cell circuit A1-X operates as an inverter circuit for driving and the circuits A2 and A4 operate as a rectifier circuit. In the column circuit Y, the cell circuit A1-Y operates as an inverter circuit for driving and the circuit A3 operates as a rectifier circuit.

The control circuit 130 generates the gate signals GateL-X and GateH-X, and GateL-Y and GateH-Y for the respective column circuits X and Y, and the respective column circuits X and Y are driven thereby.

The gate signals GateL-X and GateH-X, and GateL-Y and GateH-Y for the respective column circuits X and Y are the same as those of the first embodiment, and the relationship of the currents flowing through the MOSFETs in the respective circuits and the gate signals is the same as that shown in FIG. 2 of the first embodiment.

The capacitances of the smoothing capacitors Cs1, Cs2, Cs3 and Cs4 are set to be sufficiently larger than those of the capacitors Cr12, Cr13 and Cr14 of the LC serial bodies.

As described above, the voltage V1 input across the voltage terminals VL and Vcom is converted into the boosted voltage V2 about four times higher than that for output across the voltage terminals VH and Vcom and a load is connected between the voltage terminals VH and Vcom, and thus the voltage V2 has a lower value than 4×V1. In the steady state, the smoothing capacitor Cs1 is charged with the voltage V1 and the smoothing capacitors Cs2, Cs3 and Cs4 are charged with an average voltage of (V2−V1)/3.

The operation of the column circuit X comprised of the cell circuit A1-X, the circuits A2 and A4 and the LC serial bodies LC12 and LC14 will be described.

When the low voltage sided MOSFETs Mos1L-X, Mos2L and Mos4L of the respective cell circuits A1-X and the circuits A2 and A4 turn on by the gate signal GateL-X for the low voltage sided MOSFETs, some energy accumulated in the smoothing capacitors Cs1, Cs2 and Cs3 is transferred to the capacitor Cr12 and Cr 14 via following paths due to voltage differences therebetween.

Cs1⇒Mos2L⇒Lr12⇒Cr12⇒Mos1L-X

Cs1⇒Cs2⇒Cs3⇒Mos4L⇒Lr14⇒Cr14⇒Mos1L-X

Subsequently, when the high voltage sided MOSFETs Mos1H-X, Mos2H and Mos4H of the cell circuit A1-X and the circuits A2 and A4 turn on by the gate signal GateH-X for the high voltage sided MOSFETs, energy accumulated in the capacitors Cr12 and Cr14 is transferred to the smoothing capacitors Cs2, Cs3 and Cs4 via following paths due to voltage differences therebetween.

Cr12⇒Lr12⇒Mos2H⇒Cs2⇒Mos1H-X

Cr14⇒Lr14⇒Mos4H⇒Cs4⇒Cs3⇒Cs2⇒Mos1H-X

The operation of the column circuit Y comprised of the cell circuit A1-Y, the circuit A3 and the LC serial body LC13 will now be described.

When the low voltage sided MOSFETs Mos1L-Y and Mos3L of the cell circuit A1-Y and the circuit A3 turn on by the gate signal GateL-Y for the low voltage sided MOSFETs, some energy accumulated in the smoothing capacitors Cs1 and Cs2 is transferred to the capacitor Cr13 via a following path due to voltage differences therebetween.

Cs1⇒Cs2⇒Mos3L⇒Lr13⇒Cr13⇒Mos1L-Y

Subsequently, when the high voltage sided MOSFETs Mos1H-Y and Mos3H of the cell circuit A1-Y and the circuit A3 turn on by the gate signal GateH-Y for the high voltage sided MOSFETs, energy accumulated in the capacitor Cr13 is transferred to the smoothing capacitors Cs2 and Cs3 via a following path due to voltage differences therebetween.

Cr13⇒Lr13⇒Mos3H⇒Cs3⇒Cs2⇒Mos1H-Y

As above, energy is transferred from the smoothing capacitor Cs1 to the smoothing capacitors Cs2, Cs3 and Cs4 by the charge-discharge of the capacitors Cr12, Cr13 and Cr14. Furthermore, the voltage V1 input across the voltage terminals VL and Vcom is converted into the boosted voltage V2 about four times the magnitude of the voltage V1 for output across the voltage terminals VH and Vcom.

Since the respective capacitors Cr12, Cr13 and Cr14 are connected in series to the respective inductors Lr12, Lr13 and Lr14 to configure the LC serial bodies LC12, LC13 and LC14, the transfer of the energy uses a resonant phenomenon, and thus a large amount of energy can be transferred efficiently.

Moreover, since the rectifier circuits A2 to A4 adopt the MOSFETs in the present embodiment, conduction loss can be reduced and efficiency of power conversion can be increased relative to a case of adopting diodes, too.

The respective column circuits X and Y operate as described above. The entire operation of the DC/DC power conversion device with two column circuits X and Y will now be described.

Figure 7:
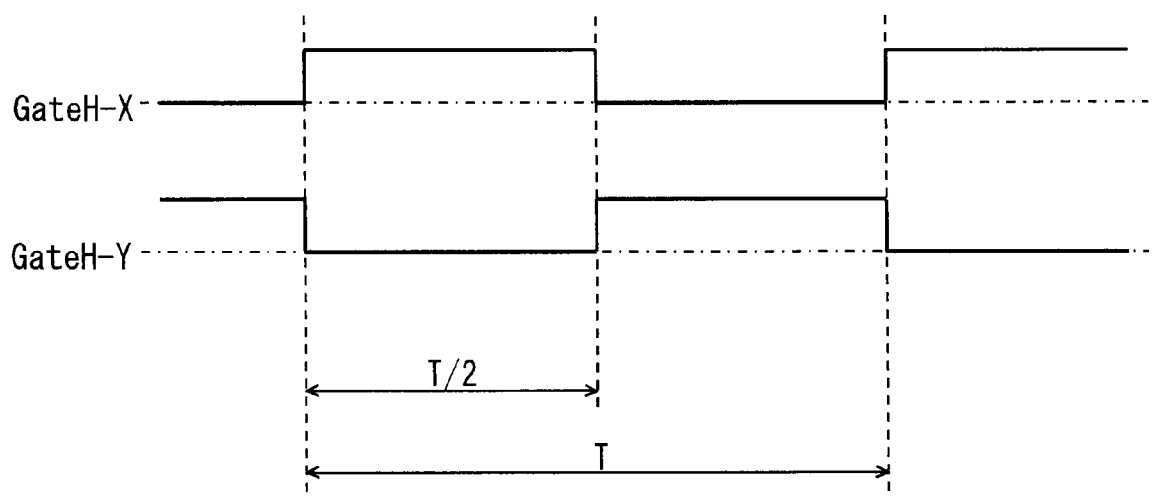
FIG. 7 shows waveforms of gate signals for driving respective column circuits according to the third embodiment.

FIG. 7 shows waveforms of the gate signals GateH-X and GateH-Y for driving the high voltage sided MOSFETs of the respective column circuits X and Y. Inversion signals of such gate signals GateH-X and GateH-Y are the gate signals GateL-X GateL-Y for driving the low voltage sided MOSFETs as shown in FIG. 2.

Referring to FIG. 7, the drive signals for driving the respective column circuits X and Y have the same cycle T (where T is a resonant cycle determined by the LC serial body) and are also out of phase with the column circuits X and Y by T/2.

Figure 8:
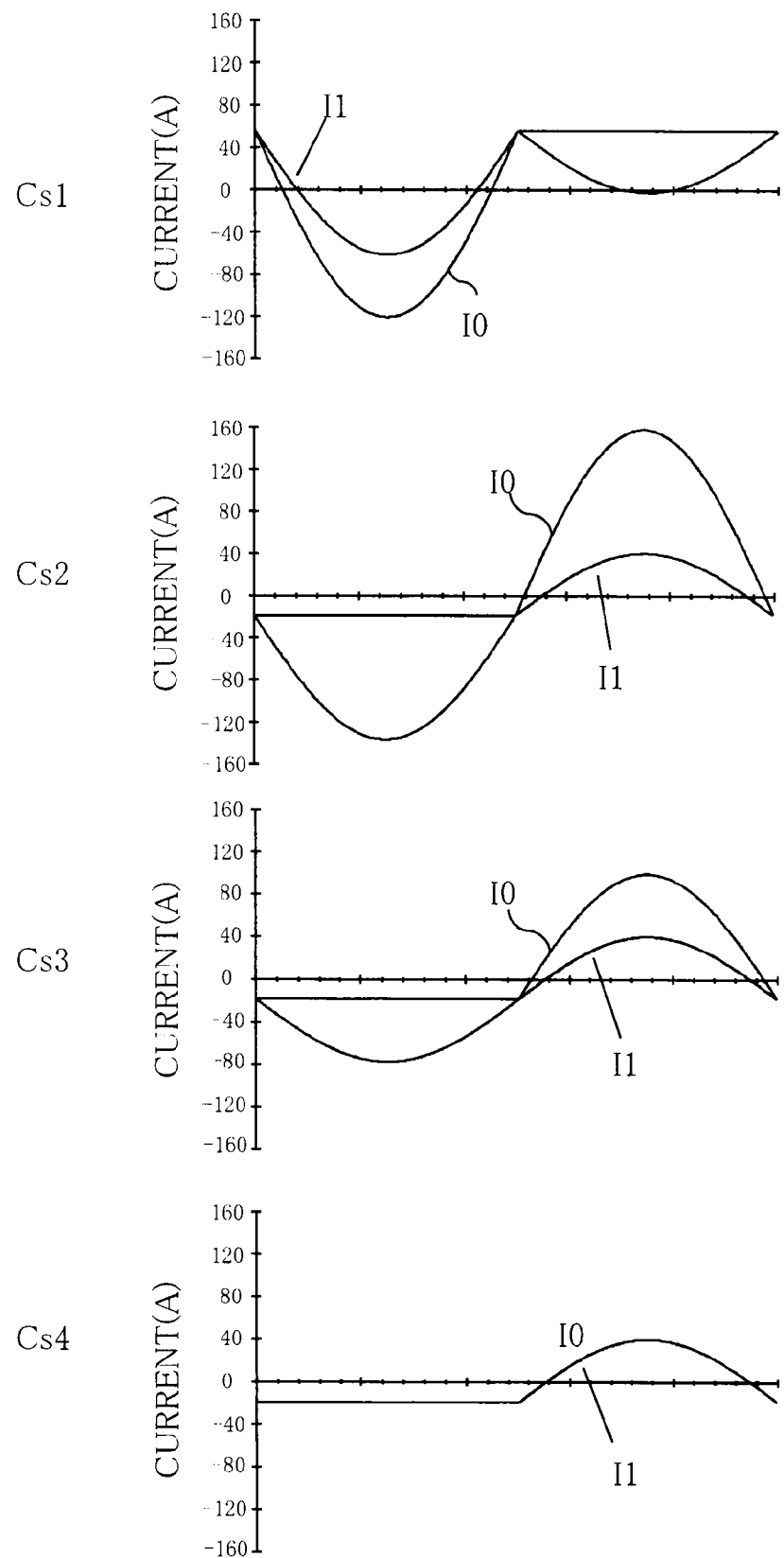
FIG. 8 shows waveforms of currents flowing through smoothing capacitors according to the third embodiment together with comparative examples.

For example, FIG. 8 shows waveforms of currents flowing through the smoothing capacitors Cs1, Cs2, Cs3 and Cs4 under the condition of the voltage V1 of 72V and an input DC current of 75 A.

FIG. 8 shows the waveforms of currents flowing through the respective smoothing capacitors Cs1, Cs2, Cs3 and Cs4 for a case driven with two column circuits out of phase with each other by T/2 (represented by I1), that is, according to the present embodiment, and the waveforms of currents flowing through the smoothing capacitors Cs2, Cs3 and Cs4 for a case driven with two column circuits in phase with each other as comparative examples (represented by I0). The longitudinal axis represents currents and the transverse axis represents time.

As shown in FIG. 8, the case driven with two column circuits out of phase with each other reduces ripple currents flowing through the smoothing capacitors Cs1, Cs2 and Cs3.

As above, the first circuit A1, which operates as an inverter circuit for driving, among the four-stage circuits A1, A2, A3 and A4 is configured by connecting in parallel two cell circuits A1-X and A1-Y, and this configures two column circuits X and Y in the DC/DC power conversion device. The respective column circuits X and Y have the same driving cycle and are also out of phase with each other by T/2, or $2\pi/2$(rad) for driving the DC/DC power conversion device.

With this, charge-discharge timing of the smoothing capacitors Cs1, Cs2 and Cs3 become different, the currents flowing to the smoothing capacitors Cs1, Cs2 and Cs3 are generated dispersedly within one cycle, and the charge-discharge currents are circulated between the column circuits as well, thereby reducing the AC currents (ripple currents) flowing through the smoothing capacitors Cs1, Cs2 and Cs3.

Such reduction of the ripple currents flowing through the smoothing capacitors causes reliability of the DC/DC power conversion device to be increased, efficiency for power conversion to be increased and a structure of the device to be made small-sized like the first embodiment.

Fourth Embodiment

Although the third embodiment represents a voltage boost typed DC/DC power conversion device which boosts the voltage V1 into the voltage V2 about four times higher than that, the present embodiment represents a voltage deboost typed DC/DC power conversion device which deboosts the voltage V2 into V1.

The circuital structure of the DC/DC power conversion device according to the present embodiment is the same as that shown in FIG. 6; in this case, however, circuits A2, A3 and A4 of the respective column circuits X and Y operate as an inverter circuit for driving. A circuit A1 operates as a rectifier circuit to rectify currents driven by the inverter circuits for driving and to transfer energy to a low voltage side. That is, the respective cell circuits A1-X and A1-Y are adopted as a rectifier circuit. In detail, in the column circuit X, the circuits A2 and A4 operate as an inverter circuit for driving and the cell circuit A1-X operates as a rectifier circuit. In the column circuit Y, the circuit A3 operates as an inverter circuit for driving and the cell circuit A1-Y operates as a rectifier circuit.

The control circuit 130 generates the gate signals GateL-X and GateH-X, and GateL-Y and GateH-Y for the respective column circuits X and Y, and the respective column circuits X and Y are driven thereby.

The gate signals GateL-X and GateH-X, and GateL-Y and GateH-Y for the respective column circuits X and Y are the same as those of the above-described embodiments, and the relationship of the currents flowing through the MOSFETs of the respective circuits and the gate signals is the same as that shown in FIG. 5 of the second embodiment as well.

The capacitances of the smoothing capacitors Cs1, Cs2, Cs3 and Cs4 are set to be sufficiently larger than those of the capacitors Cr12, Cr13 and Cr14 of the LC serial bodies.

Since the voltage V2 input across the voltage terminals VH and Vcom is converted into the deboosted voltage V1 a quarter time lower than that for output across the voltage terminals VL and Vcom, a load is connected between the voltage terminal VL and Vcom, and thus the voltage V2 has a higher value than 4×V1. In the steady state, the smoothing capacitor Cs1 is charged with the voltage V1 and the smoothing capacitors Cs2, Cs3 and Cs4 are charged with an average voltage of (V2−V1)/3.

The operation of the column circuit X comprised of the cell circuit A1-X, the circuits A2 and A4 and the LC serial bodies LC12 and LC14 will be described.

When the high voltage sided MOSFETs Mos1H-X, Mos2H and Mos4H of the respective cell circuits A1-X and the circuits A2 and A4 turn on by the gate signal GateH-X for the high voltage sided MOSFETs, some energy accumulated in the smoothing capacitor Cs2, Cs3 and Cs4 is transferred to the capacitor Cr12 and Cr14 via following paths due to voltage differences therebetween.

Cs2⇒Cs3⇒Cs4⇒Mos4H⇒Lr14⇒Cr14⇒Mos1H-X

Cs2⇒Mos2H⇒Lr12⇒Cr12⇒Mos1H-X

Subsequently, when the low voltage sided MOSFETs Mos1L-X, Mos2L and Mos4L of the cell circuit A1-X and the circuits A2 and A4 turn on by the gate signal GateL-X for the low voltage sided MOSFETs, energy accumulated in the capacitors Cr12 and Cr14 is transferred to the smoothing capacitor Cs1, Cs2 and Cs3 via following paths due to voltage differences therebetween.

Cr14⇒Lr14⇒Mos4L⇒Cs3⇒Cs2⇒Cs1⇒Mos1L-X

Cr12⇒Lr12⇒Mos2L⇒Cs1⇒Mos1L-X

The operation of the column circuit Y comprised of the cell circuit A1-Y, the circuit A3 and the LC serial body LC13 will be described.

When the high voltage sided MOSFETs Mos1H-Y and Mos3H of the respective cell circuits A1-Y and the circuit A3 turn on by the gate signal GateH-Y for the high voltage sided MOSFETs, some energy accumulated in the smoothing capacitors Cs2 and Cs3 is transferred to the capacitor Cr13 via a following path due to voltage differences therebetween.

Cs2⇒Cs3⇒Mos3H⇒Lr13⇒Cr13⇒Mos1H-Y

Subsequently, when the low voltage sided MOSFETs Mos1L-Y and Mos3L of the cell circuit A1-Y and the circuit A3 turn on by the gate signal GateL-Y for the low voltage sided MOSFETs, energy accumulated in the capacitor Cr13 is transferred to the smoothing capacitors Cs1 and Cs2 via a following path due to voltage differences therebetween.

Cr13⇒Lr13⇒Mos3L⇒Cs2⇒Cs1⇒Mos1L-Y

As above, energy is transferred from the smoothing capacitors Cs2, Cs3 and Cs4 to the smoothing capacitor Cs1 by the charge-discharge of the capacitors Cr12, Cr13 and Cr14. Furthermore, the voltage V2 input across the voltage terminals VH and Vcom is converted into the deboosted voltage V1 about a quarter time lower than the voltage V1 for output across the voltage terminals VL and Vcom. Since the respective capacitors Cr12, Cr13 and Cr14 are connected in series to the respective inductors Lr12, Lr13 and Lr14 to configure the LC serial bodies LC12, LC13 and LC14, the transfer of the energy uses a resonant phenomenon, and thus a large amount of energy can be transferred efficiently. Moreover, since the cell circuits A1-X and A1-Y in the rectifier circuits A1 adopt the MOSFETs in the present embodiment, conduction loss can be reduced and efficiency of power conversion can be increased relative to a case of adopting diodes as well.

The respective column circuits X and Y operate as described above. And the driving signals for driving the respective column circuits X and Y have the same driving cycle T (where T is a resonant cycle determined by the LC serial body) and are also out of phase with each other by T/2, or 2π/2(rad) like the third embodiment (Refer to FIG. 7). With this, charge-discharge timing of the smoothing capacitors Cs1, Cs2 and Cs3 become different, the currents flowing through the smoothing capacitors Cs1, Cs2 and Cs3 are generated dispersedly within one cycle, and the charge-discharge currents are circulated between the column circuits as well, thereby reducing the AC currents (ripple currents) flowing through the smoothing capacitors Cs1, Cs2 and Cs3 like the third embodiment. Such reduction of the ripple currents flowing through the smoothing capacitors causes reliability of the DC/DC power conversion device to be increased, efficiency for power conversion to be increased and a structure of the device to be made small-sized like the third embodiment.

Although the third and the fourth embodiments reduce the ripple currents effectively by driving out of phase with two column circuits by T/2, or 2π/2 (rad), not limited to the phase difference, an effect of reducing the ripple currents is acquired by being out of phase with the column circuits.

Although the DC/DC power conversion device includes two column circuits X and Y such as the column circuit X comprised of the cell circuit A1-X, the circuits A2 and A3 and the LC serial bodies LC12 and LC14, and the column circuit Y comprised of the cell circuit A1-Y, the circuit A3 and the LC serial body LC13 in the third and the fourth embodiments, a make-up of two column circuits is not limited thereto.

For example, a make-up may be a column circuit comprised of the cell circuit A1-X, the circuits A2 and A4 and LC serial bodies LC12 and LC13 and a column circuit comprised of the cell circuit A1-Y, the circuit A4 and the LC serial body LC14.

Furthermore, although the third embodiment represents the voltage boost typed DC/DC power conversion device of V1⇒V2 and the fourth embodiment represents the voltage deboost typed DC/DC power conversion device of V2⇒V1, energy transfer in both directions can be realized by including both of two functions of the third and the fourth embodiments.

In this case, if V1×4>V2, an operation of boosting voltage is performed, and, on boosting voltage, the circuit A1 is used as an inverter circuit for driving and the circuits A2, A3 and A4 are used as a rectifier circuit. Further, if V1×4<V2, an operation of deboosting voltage is performed, and, on deboosting voltage, the circuits A2, A3 and A4 are used as an inverter circuit for driving and the circuit A1 is used as rectifier circuit.

The boosting-deboosting DC/DC power conversion device controlled as described above obtains the same effects as the third and the fourth embodiments and can be also used widely due to realization of energy transfer in both directions using one device.

Fifth Embodiment

A DC/DC power conversion device according to the fifth embodiment of the present invention will now be described.

Figure 9:
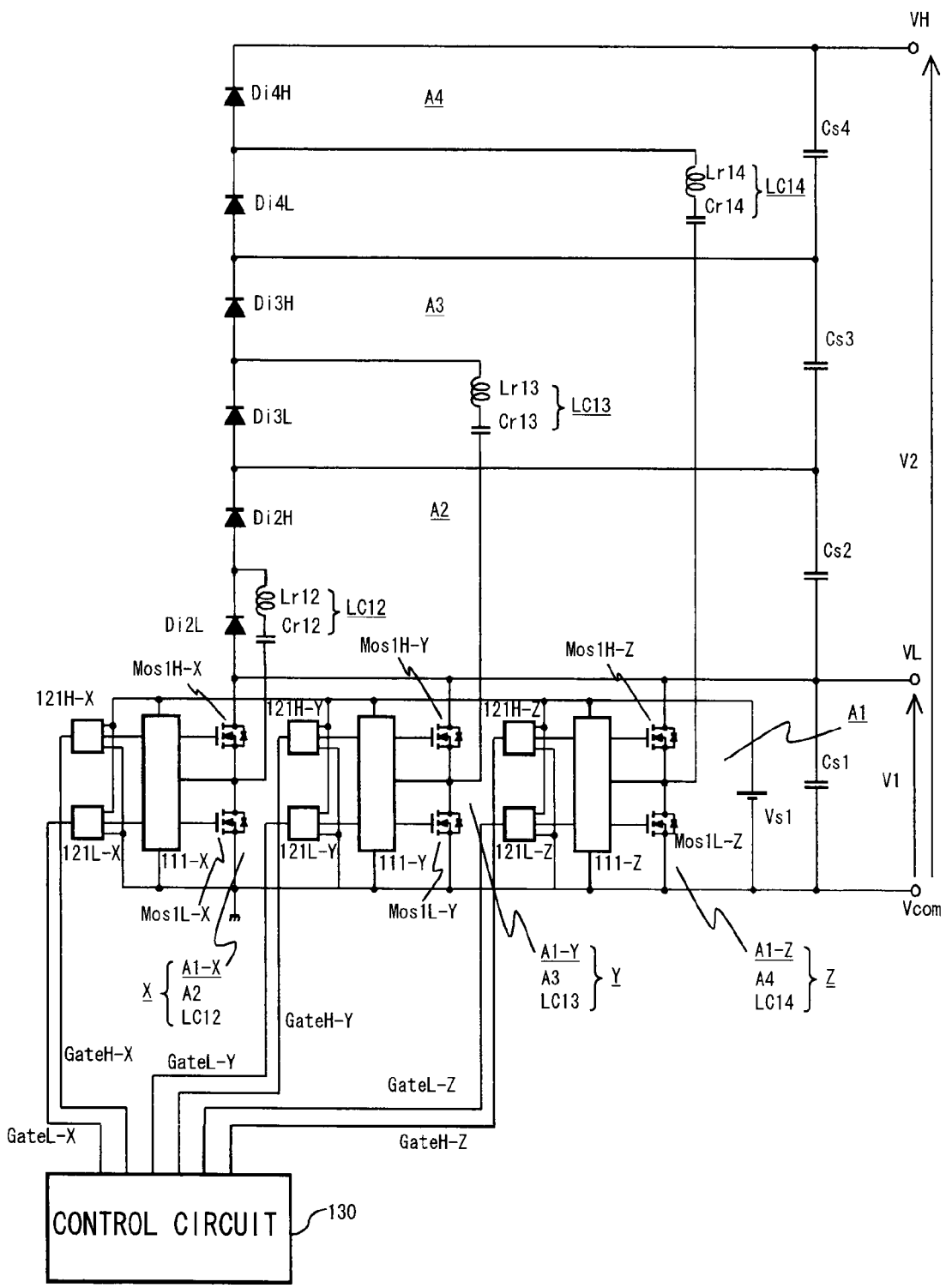
FIG. 9 is a block diagram to represent a circuital structure of a DC/DC power conversion device according to a fifth embodiment.

FIG. 9 is a block diagram to represent a circuital structure of a DC/DC power conversion device according to the fifth embodiment.

As shown in FIG. 9, a DC/DC power conversion device includes a circuit A1 as a first circuit with three cell circuits A1-X, A1-Y and A1-Z connected in parallel and three circuits A2 to A4 as a second circuit. The circuit A1 as the first circuit and the circuits A2 to A4 as the second circuit are arranged for configuration of a plurality of stages (in this case, four stages). Furthermore, the DC/DC power conversion device includes a voltage source Vs1 for driving, smoothing capacitors Cs1, Cs2, Cs3 and Cs4 for smoothing input and output voltages and further functioning as voltage sources for energy transfer, a control circuit 130, and input and output voltage terminals Vcom, VL and VH. The DC/DC power conversion device has a function to convert a voltage V1 input across the voltage terminals VL and Vcom into a boosted voltage V2 about four times a magnitude of the voltage V1 for output across the voltage terminals VH and Vcom.

The cell circuits A1-X, A1-Y and A1-Z are configured by connecting in series two MOSFETs as a low voltage sided element and a high voltage sided element like the first embodiment. The first circuit A1 is an inverter circuit for driving configured by connecting the cell circuits A1-X, A1-Y and A1-Z connected in parallel between both terminals of the smoothing capacitor Cs1.

The circuits A2 to A4 are rectifier circuits configured by connecting in series respectively two diodes Di2L and Di2H, Di3L and Di3H, and Di4L and Di4H as a low voltage sided element and a high voltage sided element, and by respectively connecting them both terminals of the smoothing capacitors Cs2, Cs3 and Cs4. The circuit A1 and three circuits A2, A3 and A4 are connected in series to configure four-stage circuits.

Contact points of two elements (MOSFETs or diodes) in the cell circuits A1-X, A1-Y and A1-Z and the circuits A2, A3 and A4 are middle points.

An LC serial body LC 12 including a capacitor Cr12 and an inductor Lr12 connected in series and playing a part in transferring energy is connected between the middle point of the cell circuit A1-X and the middle point of the circuit A2. Likewise, An LC serial body LC 13 including a capacitor Cr13 and an inductor Lr13 connected in series and playing a part in transferring energy is connected between the middle point of the cell circuit A1-Y and the middle point of the circuit A3, and an LC serial body LC 14 including a capacitor Cr14 and an inductor Lr14 connected in series and playing a part in transferring energy are connected between the middle point of the cell circuit A1-Z and the middle point of the circuit A4. Values of resonant cycles determined by inductances of the inductors Lr and capacitances of the capacitors Cr of the respective LC serial bodies are set to be identical.

With this, the DC/DC power conversion device includes three column circuits X, Y and Z such as a column circuit X comprised of the cell circuit A1-X, the circuit A2 and the LC serial body LC12, a column circuit Y comprised of the cell circuit A1-Y, the circuit A3 and the LC serial body LC13 and a column circuit Z comprised of the cell circuit A1-Z, the circuit A4 and the LC serial body LC14.

Moreover, the DC/DC power conversion device includes gate driving circuits 111-X, 111-Y and 111-Z and photocouplers 121L-X and 121H-X, 121L-Y and 121H-Y and 121L-Z and 121H-Z for driving the MOSFETs in the respective cell circuits A1-X, A1-Y and A1-Z.

Each MOSFET is a power MOSFET with a parasitic diode formed between a source and a drain thereof.

The operation thereof will now be described.

Like the first embodiment, in the column circuit X, the cell circuit A1-X operates as an inverter circuit for driving and the circuit A2 operates as a rectifier circuit. In the column circuit Y, the cell circuit A1-Y operates as an inverter circuit for driving and the circuit A3 operates as a rectifier circuit. In the column circuit Z, the cell circuit A1-Z operates as an inverter circuit for driving and the circuit A4 operates as a rectifier circuit.

The control circuit 130 generates the gate signals GateL-X and GateH-X, GateL-Y and GateH-Y, and GateL-Z and GateH-Z for the respective column circuits X, Y and Z, and the respective column circuits X, Y and Z are driven thereby.

The gate signals GateL-X and GateH-X, GateL-Y and GateH-Y, and GateL-Z and GateH-Z for the respective column circuits X, Y and Z are the same as those of the above-described embodiments, and the relationship of the currents flowing through the MOSFETs in the respective circuits and the gate signals is the same as that shown in FIG. 2 of the first embodiment.

The capacitances of the smoothing capacitors Cs1, Cs2, Cs3 and Cs4 are set to be sufficiently larger than those of the capacitors Cr12, Cr13 and Cr14 of the LC serial bodies. As described above, the voltage V1 input across the voltage terminals VL and Vcom is converted into the voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs1 is charged with the voltage V1 and the smoothing capacitors Cs2, Cs3 and Cs4 are averagely charged with a voltage of (V2−V1)/3.

The operation of the column circuit X comprised of the cell circuit A1-X, the circuit A2 and the LC serial body LC12 will be described.

When the MOSFET Mos1L-X of the cell circuit A1-X turns on by the gate signal GateL-X for the low voltage sided MOSFETs, some energy accumulated in the smoothing capacitor Cs1 is transferred to the capacitor Cr12 via a following path due to voltage differences therebetween.

Cs1⇒Di2L⇒Lr12⇒Cr12⇒Mos1L-X

Subsequently, when the MOSFET Mos1H-X of the cell circuit A1-X turns on by the gate signal GateH-X for the high voltage sided MOSFETs, energy accumulated in the capacitor Cr12 is transferred to the smoothing capacitor Cs2 via a following path due to voltage differences therebetween.

Cr12⇒Lr12⇒Di2H⇒Cs2⇒Mos1H-X

The operation of the column circuit Y comprised of the cell circuit A1-Y, the circuit A3 and the LC serial body LC13 will now be described.

When the MOSFET Mos1L-Y of the cell circuit A1-Y turns on by the gate signal GateL-Y for the low voltage sided MOSFETs, some energy accumulated in the smoothing capacitors Cs1 and Cs2 is transferred to the capacitor Cr13 via a following path due to voltage differences therebetween.

Cs1⇒Cs2⇒Di3L⇒Lr13⇒Cr13⇒Mos1L-Y

Subsequently, when the MOSFET Mos1H-Y of the cell circuit A1-Y turns on by the gate signal GateH-Y for the high voltage sided MOSFETs, energy accumulated in the capacitor Cr13 is transferred to the smoothing capacitors Cs2 and Cs3 via a following path due to voltage differences therebetween.

Cr13⇒Lr13⇒Di3H⇒Cs3⇒Cs2⇒Mos1H-Y

The operation of the column circuit Z comprised of the cell circuit A1-Z, the circuit A4 and the LC serial body LC14 will be described.

When the MOSFET Mos1L-Z of the cell circuit A1-Z turns on by the gate signal GateL-Z for the low voltage sided MOSFETs, some energy accumulated in the smoothing capacitors Cs1, Cs2 and Cs3 is transferred to the capacitor Cr14 via a following path due to voltage differences therebetween.

Cs1⇒Cs2⇒Cs3⇒Di4L⇒Lr14⇒Cr14⇒Mos1L-Z

Subsequently, when the MOSFET Mos1H-Z of the cell circuit A1-Z turns on by the gate signal GateH-Z for the high voltage sided MOSFETs, energy accumulated in the capacitor Cr14 is transferred to the smoothing capacitors Cs2, Cs3 and Cs4 via a following path due to voltage differences therebetween.

Cr14⇒Lr14⇒Di4H⇒Cs4⇒Cs3⇒Cs2⇒Mos1H-Z

As above, energy is transferred from the smoothing capacitor Cs1 to the smoothing capacitors Cs2, Cs3 and Cs4 by the charge-discharge of the capacitors Cr12, Cr13 and Cr14. Furthermore, the voltage V1 input across the voltage terminals VL and Vcom is converted into the boosted voltage V2 four times the magnitude of the voltage V1 for output across the voltage terminals VH and Vcom. Since the respective capacitors Cr12, Cr13 and Cr14 are connected in series to the respective inductors Lr12, Lr13 and Lr14 to configure the LC serial bodies LC12, LC13 and LC14, the transfer of the energy uses a resonant phenomenon, and thus a large amount of energy can be transferred efficiently.

Moreover, since the rectifier circuits A2 to A4 adopt the diodes in the present embodiment, conduction loss is increased relative to a case of adopting MOSFETs, but instead there is no need of voltage sources or circuits for driving.

The respective column circuits X, Y and Z operate as described above. And the driving signals for driving the respective column circuits X, Y and Z have the same driving cycle T (where T is a resonant cycle determined by the LC serial body) and are also out of phase with each other by T/3 like the first embodiment (Refer to FIG. 3). With this, charge-discharge timing of the smoothing capacitors Cs1, Cs2, Cs3 and Cs4 become different, the currents flowing to the smoothing capacitors Cs1, Cs2 and Cs3 are generated dispersedly within one cycle, and the charge-discharge currents are circulated among the column circuits X, Y and Z as well, thereby reducing the AC currents (ripple currents) flowing through the smoothing capacitors Cs1, Cs2 and Cs3 like the first embodiment. Such reduction of the ripple currents flowing through the smoothing capacitors causes reliability of the DC/DC power conversion device to be increased, efficiency for power conversion to be increased and a structure of the device to be made small-sized like the first embodiment.

Furthermore, although the present embodiment provides three column circuits in the DC/DC power conversion device using the diodes as elements comprising the rectifier circuits A2 to A4 among the four-stage circuits A1 to A4, two column circuits may be provided in the DC/DC power conversion device by configuration of the circuit A1 using two cell circuits in the same manner as the third embodiment.

The driving signals for driving the respective column circuits X and Y have the same driving cycle T and are also out of phase with each other by T/2, thereby reducing the AC currents (ripple currents) flowing the smoothing capacitors Cs1, Cs2 and Cs3 efficiently.

Rectifier circuits adopting diodes may be plural besides 3. Thus, a DC/DC power conversion device with a boosting ratio of n may include an n-stage circuit A1 to An of the first circuit A1, which operates as an inverter circuit for driving, and the rectifier circuits A2 to An. And the first circuit A1 may be configured by connecting in parallel (n−1) cell circuits, and (n−1) column circuits may be configured in the DC/DC power conversion device.

In this case, the respective column circuits have the same driving cycle T and are also out of phase with each other by T/(n−1), or 2π/(n−1) (rad) for driving the DC/DC power conversion device, and thus an effect of reducing the ripple currents flowing through the smoothing capacitors is acquired. Furthermore, as the number of the column circuits is more, the currents flowing through the smoothing capacitors are generated more dispersedly within one cycle, so the ripple currents are reduced efficiently.

When the number of the column circuits is m, a driving such as being out of phase with each other by T/m, or 2π/m (rad) among the column circuits is the most effective; a phase difference, however, is not limited thereto, the charge-discharge currents flowing through the smoothing capacitors can be circulated among the column circuits by being out of phase with the column circuits, thereby reducing the ripple currents.

Sixth Embodiment

A DC/DC power conversion device according to the sixth embodiment of the present invention will now be described.

Figure 10:
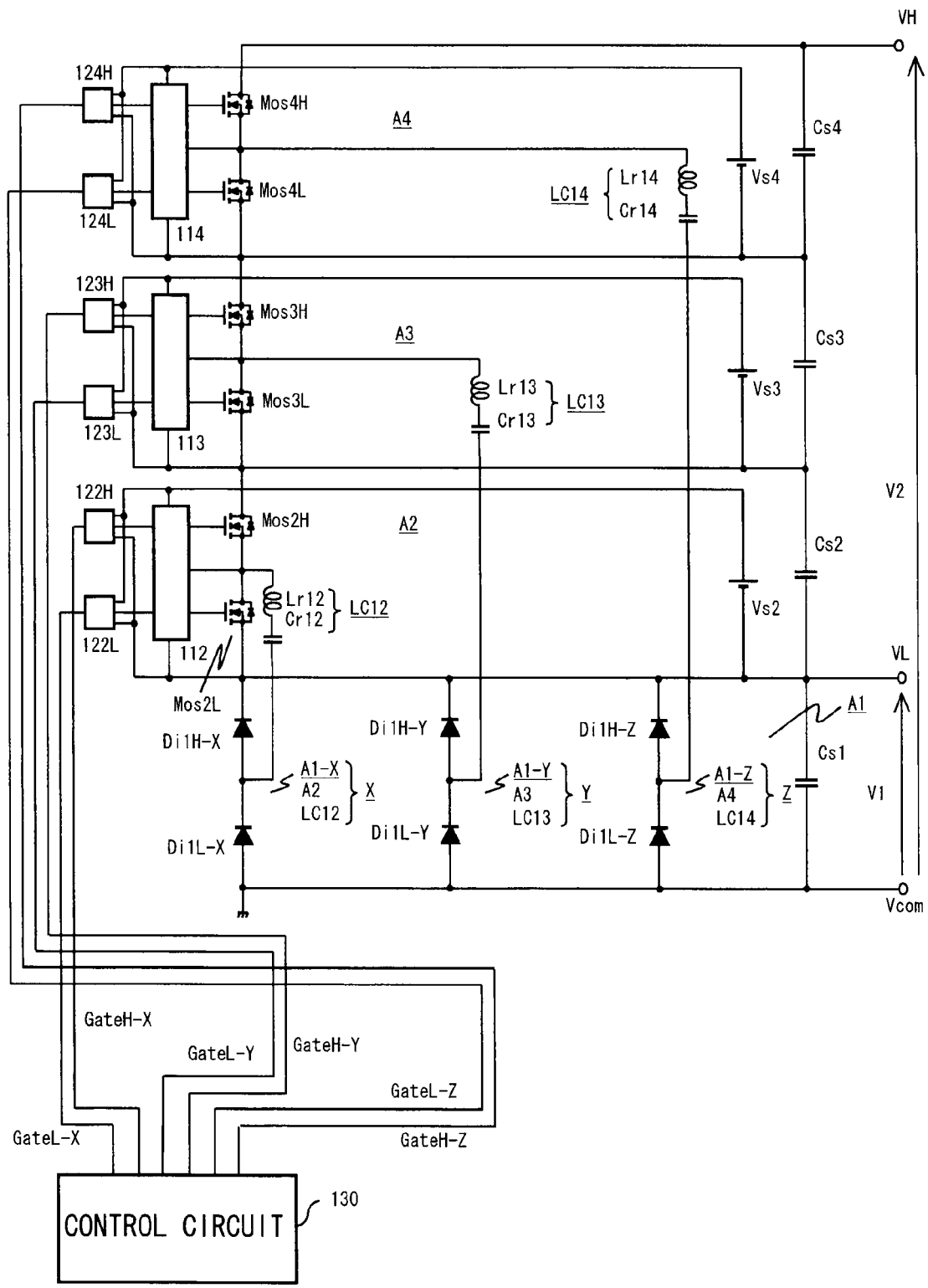
FIG. 10 is a block diagram to represent a circuital structure of a DC/DC power conversion device according to a sixth embodiment.

FIG. 10 is a block diagram to represent a circuital structure of a DC/DC power conversion device according to the sixth embodiment of the present invention.

As shown in FIG. 10, a DC/DC power conversion device includes a circuit A1 as a first circuit with cell circuits A1-X, A1-Y and A1-Z connected in parallel and three circuits A2 to A4 as a second circuit. The circuit A1 as the first circuit and the circuits A2 to A4 as the second circuit are arranged for configuration of a plurality of stages (in this case, four stages).

Furthermore, the DC/DC power conversion device includes voltage sources Vs2, Vs3 and Vs4 for driving, smoothing capacitors Cs1, Cs2, Cs3 and Cs4 for smoothing input and output voltages and further functioning as voltage sources for energy transfer, a control circuit 130, and input and output voltage terminals Vcom, VL and VH. The DC/DC power conversion device has a function to convert a voltage V2 input across the voltage terminals VH and Vcom into a deboosted voltage V1 about a quarter time a magnitude of the voltage V2 for output across the voltage terminals VL and Vcom.

The second circuits A2 to A4 are an inverter circuit for driving configured by connecting in series respectively two MOSFETs Mos2L and Mos2H, Mos3L and Mos3H, and Mos4L and Mos4H as a low voltage sided element and a high voltage sided element, and by respectively connecting them both terminals of the smoothing capacitors Cs2, Cs3 and Cs4.

The cell circuits A1-X, A1-Y and A1-Z are configured by connecting in series two diodes Di1L-X and Di1H-X, Di1L-Y and Di1H-Y, and Di1L-Z and Di1H-Z as a low voltage sided element and a high voltage sided element. The first circuit A1 is a rectifier circuit configured by connecting the cell circuits A1-X, A1-Y and A1-Z connected in parallel between both terminals of the smoothing capacitor Cs1. The circuit A1 and three circuits A2, A3 and A4 are connected in series to configure four-stage circuits.

Contact points of two elements (MOSFETs or diodes) in the cell circuits A1-X, A1-Y and A1-Z and the circuits A2, A3 and A4 are middle points. An LC serial body LC 12 including a capacitor Cr12 and an inductor Lr12 connected in series and playing a part in transferring energy is connected between the middle point of the cell circuit A1-X and the middle point of the circuit A2. Further, an LC serial body LC 13 including a capacitor Cr13 and an inductor Lr13 connected in series and playing a part in transferring energy is connected between the middle point of the cell circuit A1-Y and the middle point of the circuit A3, and an LC serial body LC 14 including a capacitor Cr14 and an inductor Lr14 connected in series and playing a part in transferring energy is connected between the middle point of the cell circuit A1-Z and the middle point of the circuit A4. Values of resonant cycles determined by inductances of the inductors Lr and capacitances of the capacitors Cr of the respective LC serial bodies are set to be identical.

The DC/DC power conversion device includes three column circuits X, Y and Z such as a column circuit X comprised of the cell circuit A1-X, the circuit A2 and the LC serial body LC12, a column circuit Y comprised of the cell circuit A1-Y, the circuit A3 and the LC serial body LC13 and a column circuit Z comprised of the cell circuit A1-Z, the circuit A4 and the LC serial body LC14.

Moreover, the DC/DC power conversion device includes gate driving circuits 112, 113 and 114 and photocouplers 122L and 122H, 123L and 123H, and 124L and 124H for driving the MOSFETs in each of the second circuits A2, A3 and A4. Each MOSFET is a power MOSFET with a parasitic diode formed between a source and a drain thereof.

The operation thereof will now be described.

In the column circuit X, the cell circuit A2 operates as an inverter circuit for driving and the circuit A1-X operates as a rectifier circuit. In the column circuit Y, the cell circuit A3 operates as an inverter circuit for driving and the cell circuit A1-Y operates as a rectifier circuit. In the column circuit Z, the cell circuit A4 operates as an inverter circuit for driving and the cell circuit A1-Z operates as a rectifier circuit.

The control circuit 130 generates the gate signals GateL-X and GateH-X, GateL-Y and GateH-Y, and GateL-Z and GateH-Z for the respective column circuits X, Y and Z, and the respective column circuits X, Y and Z are driven thereby. The gate signals GateL-X and GateH-X, GateL-Y and GateH-Y, and GateL-Z and GateH-Z for the respective column circuits X, Y and Z are the same as those of the above-described embodiments, and the relationship of the currents flowing through the MOSFETs in the respective circuits and the gate signals is the same as that shown in FIG. 5 of the second embodiment.

The capacitances of the smoothing capacitors Cs1, Cs2, Cs3 and Cs4 are set to be sufficiently larger than those of the capacitors Cr12, Cr13 and Cr14 of the LC serial bodies. The voltage V2 input across the voltage terminals VH and Vcom is converted into the voltage V1 about a fourth time lower than that for output across VL and Vcom and a load is connected between the voltage terminals VL and Vcom, and thus the voltage V2 has a higher value than 4×V1. In the steady state, the smoothing capacitor Cs1 is charged with the voltage V1 and the smoothing capacitors Cs2, Cs3 and Cs4 are averagely charged with a voltage of (V2−V1)/3.

The operation of the column circuit X comprised of the cell circuit A1-X, the circuit A2 and the LC serial body LC12 will be described.

When the MOSFET Mos2H of the circuit A2 turns on by the gate signal GateH-X for the high voltage sided MOS- FETs, some energy accumulated in the smoothing capacitor Cs2 is transferred to the capacitor Cr12 via a following path due to voltage differences therebetween.

Cs2⇒Mos2H⇒Lr12⇒Cr12⇒Di1H-X

Subsequently, when the MOSFET Mos2L of the circuit A2 turns on by the gate signal GateL-X for the low voltage sided MOSFETs, energy accumulated in the smoothing capacitor Cr12 is transferred to the smoothing capacitor Cs1 via a following path due to voltage differences therebetween.

Cr12⇒Lr12⇒Mos2L⇒Cs1⇒Di1L-X

The operation of the column circuit Y comprised of the cell circuit A1-Y, the circuit A3 and the LC serial body LC13 will be described.

When the MOSFET Mo3H of the circuit A3 turns on by the gate signal GateH-Y for the high voltage sided MOSFETs, some energy accumulated in the smoothing capacitors Cs2 and Cs3 is transferred to the capacitor Cr13 via a following path due to voltage differences therebetween.

Cs2⇒Cs3⇒Mos3H⇒Lr13⇒Cr13⇒Di1H-Y

Subsequently, when the MOSFET Mos3L of the circuit A3 turns on by the gate signal GateL-Y for the low voltage sided MOSFETs, energy accumulated in the capacitor Cr13 is transferred to the smoothing capacitors Cs1 and Cs2 via a following path due to voltage differences therebetween.

Cr13⇒Lr13⇒Mos3L⇒Cs2⇒Cs1⇒Di1L-Y

The operation of the column circuit Z comprised of the cell circuit A1-Z, the circuit A4 and the LC serial body LC14 will be described.

When the MOSFET Mos4H of the circuit A4 turns on by the gate signal GateH-Z for the high voltage sided MOSFETs, some energy accumulated in the smoothing capacitors Cs2, Cs3 and Cs4 is transferred to the capacitor Cr14 via a following path due to voltage differences therebetween.

Cs2⇒Cs3⇒Cs4⇒Mos4H⇒Lr14⇒Cr14⇒Di1H-Z

Subsequently, when the MOSFET Mos4L of the circuit A4 turns on by the gate signal GateL-Z for the low voltage sided MOSFETs, energy accumulated in the capacitor Cr14 is transferred to the smoothing capacitors Cs1, Cs3 and Cs3 via a following path due to voltage differences therebetween.

Cr14⇒Lr14⇒Mos4L⇒Cs3⇒Cs2⇒Cs1⇒Di1L-Z

As above, energy is transferred from the smoothing capacitors Cs2, Cs3 and Cs4 to the smoothing capacitor Cs1 by the charge-discharge of the capacitors Cr12, Cr13 and Cr14. Furthermore, the voltage V2 input across the voltage terminals VH and Vcom is converted into the deboosted voltage V1 a fourth time the magnitude of the voltage V2 for output across the voltage terminals VL and Vcom. Since the respective capacitors Cr12, Cr13 and Cr14 are connected in series to the respective inductors Lr12, Lr13 and Lr14 to configure the LC serial bodies LC12, LC13 and LC14, the transfer of the energy uses a resonant phenomenon, and thus a large amount of energy can be transferred efficiently.

Moreover, since the cell circuits A1-X, A1-Y and A1-Z in the rectifier circuit A1 adopt the diodes in the present embodiment, conduction loss is increased relative to a case of adopting MOSFETs, but instead there is no need of voltage sources or circuits for driving.

The respective column circuits X, Y and Z operate as described above. And the driving signals for driving the respective column circuits X, Y and Z have the same driving cycle T (where T is a resonant cycle determined by the LC serial body) and are also out of phase with each other by T/3 like the first and the second embodiments (Refer to FIG. 3). Therefore, charge-discharge timing of the smoothing capacitors Cs1, Cs2, Cs3 and Cs4 become different, the currents flowing to the smoothing capacitors Cs1, Cs2 and Cs3 are generated dispersedly within one cycle, and the charge-discharge currents are circulated among the column circuits X, Y and Z as well, thereby reducing the AC currents (ripple currents) flowing through the smoothing capacitors Cs1, Cs2 and Cs3 like the second embodiment. Such reduction of the ripple currents flowing through the smoothing capacitors causes reliability of the DC/DC power conversion device to be increased, efficiency for power conversion to be increased and a structure of the device to be made small-sized like the second embodiment.

Furthermore, although the present embodiment provides three column circuits in the DC/DC power conversion device using the diodes as elements comprising the rectifier circuit A1 among the four-stage circuits A1 to A4, two column circuits may be provided in the DC/DC power conversion device by configuration of the circuit A1 using two cell circuits in the same manner as the fourth embodiment. In this case, the driving signals for driving the respective column circuits X and Y have the same driving cycle T and are also out of phase with each other by T/2, thereby reducing the AC currents (ripple currents) flowing through the smoothing capacitors Cs1, Cs2 and Cs3 efficiently.

The number of the column circuits is not limited to three, and a DC/DC power conversion device may include an n-stage circuit A1 to An of the first circuit A1 which operates as a rectifier circuit, and the second circuits A2 to An. In this case, the first circuit A1 is configured by connecting in parallel (n−1) cell circuits adopting diodes therein, and (n−1) column circuits is configured in the DC/DC power conversion device.

And, the respective column circuits have the same driving cycle T and are also out of phase with each other by T/(n−1), or 2π/(n−1) (rad) for driving the DC/DC power conversion device, and thus an effect of reducing the ripple currents flowing through the smoothing capacitors is acquired. Furthermore, as the number of the column circuits is more, the currents flowing through the smoothing capacitors are generated more dispersedly within one cycle, and thus the ripple currents are reduced efficiently.

When the number of the column circuits is m, a driving such as being out of phase with each other by T/m, or 2π/m (rad) among the column circuits is the most effective; a phase difference, however, is not limited thereto, the charge-discharge currents flowing through the smoothing capacitors can be circulated among the column circuits by being out of phase with the column circuits, thereby reducing the ripple currents.

Seventh Embodiment

A DC/DC power conversion device according to the seventh embodiment of the present invention will now be described.

Figure 11:
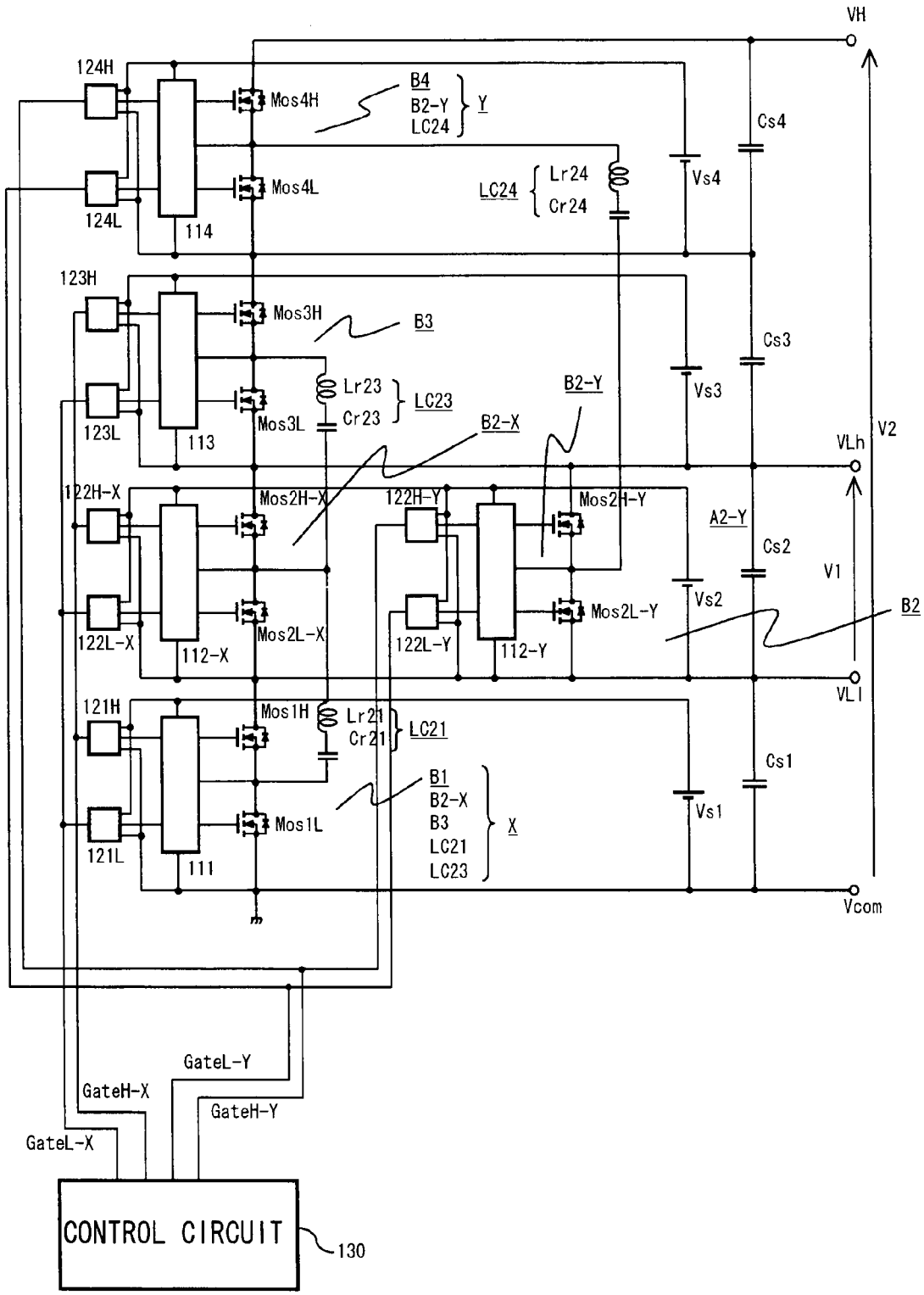
FIG. 11 is a block diagram to represent a circuital structure of a DC/DC power conversion device according to a seventh embodiment.

FIG. 11 is a block diagram to represent a circuital structure of a DC/DC power conversion device according to the seventh embodiment of the present invention.

As shown in FIG. 11, a DC/DC power conversion device includes a circuit B2 as a first circuit with two cell circuits B2-X and B2-Y connected in parallel and three circuits B1, B3 and B4 as a second circuit. The circuit B2 as the first circuit and the circuits B1, B3 and B4 as the second circuit are arranged for configuration of a plurality of stages (in this case, four stages).

Furthermore, the DC/DC power conversion device includes voltage sources Vs1, Vs2, Vs3 and Vs4 for driving, smoothing capacitors Cs1, Cs2, Cs3 and Cs4 for smoothing input and output voltages and further functioning as voltage sources for energy transfer, a control circuit 130, and input and output voltage terminals Vcom, VL1, VLh and VH. The DC/DC power conversion device has a function to convert a voltage V1 input across the voltage terminals VL1 and VLh into a boosted voltage V2 about four times a magnitude of the voltage V1 for output across the voltage terminals VH and Vcom.

The circuit B2 is configured by connecting in parallel the cell circuit B2-X and the cell circuit B2-Y and connecting them between both terminals of the smoothing capacitor Cs2. The B2-X is configured by connecting in series MOSFETs Mos2L-X and Mos2H-X as a low voltage sided element and as a high voltage sided element, and B2-Y is configured by connecting in series MOSFETs Mos2L-Y and Mos2H-Y as a low voltage sided element and as a high voltage sided element.

The circuits B1, B3 and B4 are configured respectively by connecting in series two MOSFETs Mos1L and Mos1H, Mos3L and Mos3H, and Mos4L and Mos4H as a low voltage sided element and as a high voltage sided element, and by connecting them between both terminals of the smoothing capacitors Cs1, Cs3 and Cs4. Three circuits B1, B3 and B4 and the circuit B2 comprise four-stage circuits by being connected in series in an order of B1, B2, B3 and B4.

Contact points of two MOSFETs in the respective cell circuits B2-X and B2-Y and the circuits B1, B3 and B4 are middle points. LC serial bodies LC21 and LC23 including capacitors Cr21 and Cr23 and inductors Lr21 and Lr23 connected in series respectively and playing a part in transferring energy are connected between the respective middle points of the cell circuit B2-X and two circuits B1 and B3.

An LC serial body LC24 including a capacitor Cr24 and an inductor Lr24 connected in series and playing a part in transferring energy is connected between the middle points of the cell circuit B2-Y and the circuit B4. Values of resonant cycles determined by inductances of the inductors Lr and capacitances of the capacitors Cr of the respective LC serial bodies are set to be identical.

The DC/DC power conversion device includes two column circuits X and Y such as a column circuit X comprised of the cell circuit B2-X, the circuits B1 and B3 and the LC serial bodies LC21 and LC23, and a column circuit Y comprised of the cell circuit B2-Y, the circuit B4 and the LC serial body LC24. Moreover, the DC/DC power conversion device includes gate driving circuits 112-X, 112-Y, 111 and 113 and 114 and photocouplers 122L-X and 122H-X, 122L-Y and 122H-Y, 121L and 121H, 123L and 123H, and 124L and 124H for driving the MOSFETs in the respective cell circuits B2-X, B2-Y and the circuits B1, B3 and B4. Each MOSFET is a power MOSFET with a parasitic diode formed between a source and a drain thereof.

The first circuit B2 comprised of two cell circuits B2-X and B2-Y is positioned at the middle interposed between other circuits B1 and B3, the voltage V1 inputs across the voltage terminals VLh and VL1 connected to a positive terminal and a negative terminal of the smoothing capacitor Cs2 of the first circuit B2 interposed therebetween.

The operation thereof will now be described.

The circuit B2 as the first circuit operates as an inverter circuit for driving which transmits energy input across the voltage terminals VLh and VL1 to the high voltage side by ON and OFF operations of the MOSFETs in the respective cell circuits B2-X and B2-Y comprising the first circuit B2. In other words, the respective cells B2-X and B2-Y are used as inverter circuits for driving.

In the column circuit X, the cell circuit B2-X operates as an inverter circuit for driving and the circuits B3 and B4 operate as a rectifier circuit. In the column circuit Y, the cell circuit B2-Y operates as an inverter circuit for driving and the circuit B3 operates as a rectifier circuit.

The control circuit 130 generates the gate signals GateL-X and GateH-X, and GateL-Y and GateH-Y for the respective column circuits X and Y, and the respective column circuits X and Y are driven thereby.

The gate signals GateL-X and GateH-X, and GateL-Y and GateH-Y for the respective column circuits X and Y are the same as those of the respective embodiments described above, and the relationship of the currents flowing through the MOSFETs in the respective circuits and the gate signals is the same as that shown in FIG. 2 of the first embodiment.

The capacitances of the smoothing capacitors Cs1, Cs2, Cs3 and Cs4 are set to be sufficiently larger than those of the capacitors Cr21, Cr23 and Cr24 of the LC serial bodies.

As described above, the voltage V1 input across the voltage terminals VLh and VL1 is converted into the boosted voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs2 is charged with the voltage V1 and the smoothing capacitors Cs1, Cs3 and Cs4 are averagely charged with a voltage of (V2−V1)/3.

The operation of the column circuit X comprised of the cell circuit B2-X, the circuits B1 and B3 and the LC serial bodies LC21 and LC23 will be described.

When the low voltage sided MOSFETs Mos2L-X, Mos1L and Mos3L of the respective cell circuits B2-X and the circuits B1 and B3 turn on by the gate signal GateL-X for the low voltage sided MOSFETs, some energy accumulated in the capacitor Cr21 is transferred to the smoothing capacitor Cs1 and some energy accumulated in the smoothing capacitor Cs2 to the capacitor Cr23 via following paths due to voltage differences therebetween.

Cr21⇒Lr21⇒Mos2L⇒Cs1⇒Mos1L

Cs2⇒Mos3L⇒Lr23⇒Cr23⇒Mos2L-X

Subsequently, when the high voltage sided MOSFETs Mos2H-X, Mos1H and Mos3H of the cell circuit B2-X and the circuits B1 and B3 turn on by the gate signal GateH-X for the high voltage sided MOSFETs, some energy accumulated in the smoothing capacitor Cs2 is transferred to the capacitor Cr21 and some energy accumulated in the capacitor Cr23 to the smoothing capacitor Cs3 via following paths due to voltage differences therebetween.

Cs2⇒Mos2H-X⇒Lr21⇒Cr21⇒Mos1H

Cr23⇒Lr23⇒Mos3H⇒Cs3⇒Cs2⇒Mos2H-X

The operation of the column circuit Y comprised of the cell circuit B2-Y, the circuit B4 and the LC serial body LC24 will now be described.

When the low voltage sided MOSFETs Mos2L-Y and Mos4L of the cell circuits B2-Y and the circuit B4 turn on by the gate signal GateL-Y for the low voltage sided MOSFETs, some energy accumulated in the smoothing capacitor Cs2 and Cs3 is transferred to the capacitor Cr24 via a following path due to voltage differences therebetween.

Cs2⇒Cs3⇒Mos4L⇒Lr24⇒Cr24⇒Mos2L-Y

Subsequently, when the high voltage sided MOSFETs Mos2H-Y and Mos4H of the cell circuit B2-Y and the circuit B4 turn on by the gate signal GateH-Y for the high voltage sided MOSFETs, energy accumulated in the capacitor Cr24 is transferred to the smoothing capacitors Cs3 and Cs4 via a following path due to voltage differences therebetween.

Cr24⇒Lr24⇒Mos4H⇒Cs4⇒Cs3⇒Mos2H-Y

As above, energy is transferred from the smoothing capacitor Cs2 to the smoothing capacitors Cs1, Cs3 and Cs4 by the charge-discharge of the capacitors Cr21, Cr23 and Cr24. Furthermore, the voltage V1 input across the voltage terminals VLh and VLl is converted into the boosted voltage V2 about four times the magnitude of the voltage V1 for output across the voltage terminals VH and Vcom.

Since the respective capacitors Cr21, Cr23 and Cr24 are connected in series to the respective inductors Lr21, Lr23 and Lr24 to configure the LC serial bodies LC21, LC23 and LC24, the transfer of the energy uses a resonant phenomenon, and thus a large amount of energy can be transferred efficiently. Moreover, since the rectifier circuits B1, B3 and B4 adopt the MOSFETs in the present embodiment, conduction loss can be reduced and efficiency of power conversion can be increased relative to a case of adopting diodes, too.

The respective column circuits X and Y operate as described above. And the driving signals for driving the respective column circuits X and Y have the same driving cycle T (where T is a resonant cycle determined by the LC serial body) and are also out of phase with each other by T/2 like the third embodiment (Refer to FIG. 7).

With this, charge-discharge timing of the smoothing capacitors Cs1, Cs2, Cs3 and Cs4 become different, the currents flowing through the smoothing capacitor Cs3 are generated dispersedly within one cycle, and the charge-discharge currents are circulated between the column circuits as well, thereby reducing the AC currents (ripple currents) flowing through the smoothing capacitor Cs3. For the smoothing capacitors Cs1, Cs2 and Cs4, the ripple currents have the same degree as a case of being in phase.

Such reduction of the ripple currents flowing through the smoothing capacitors causes reliability of the DC/DC power conversion device to be increased, efficiency for power conversion to be increased and a structure of the device to be made small-sized.

Although the DC/DC power conversion device includes two column circuits X and Y such as the column circuit X comprised of the cell circuit B2-X, the circuits B1 and B3 and the LC serial bodies LC21 and LC23, and the column circuit Y comprised of the cell circuit B2-Y, the circuit B4 and the LC serial body LC24 in the present embodiment, a make-up of two column circuits is not limited thereto. The number of the column circuits may be more than 3. In this case, a first circuit which is configured by connecting in parallel a plurality (m) of cell circuits is positioned interposed between other circuits, and a positive terminal and a negative terminal of a smoothing capacitor connected to the first circuit are connected to voltage terminals. And the DC/DC power conversion device includes m column circuits. The driving signals for driving the respective column circuits have the same driving cycle and are also out of phase with each other by T/m, or 2π/m (rad), thereby reducing the AC currents (ripple currents) flowing through the smoothing capacitors efficiently.

Moreover, not limited to the phase difference, the driving of being out of phase with the column circuits leads the charge-discharge currents toward the smoothing capacitors to be circulated among the column circuits for acquisition of an effect of reducing the ripple currents.

Furthermore, although the voltage boost typed DC/DC power conversion device of boosting the voltage V1 input across the voltage terminals VLh and VLl into the voltage V2 about four times higher than that for output across the voltage terminals VH and Vcom has been described in the present embodiment, an operation of deboosting the voltage V2 into the voltage V1 a quarter time lower than that is possible in the same manner as the second and the fourth embodiments. Moreover, if V1×4>V2, an operation of boosting voltage is performed, and, if V1×4<V2, an operation of deboosting voltage is performed, and thus energy transfer in both directions can be realized.

Although the rectifier circuits B1, B3 and B4 adopt the MOSFETs in the present embodiment, the rectifier circuits may adopt diodes like the fifth and the sixth embodiments.

Eighth Embodiment

A DC/DC power conversion device according to the eighth embodiment of the present invention will now be described.

Figure 12:
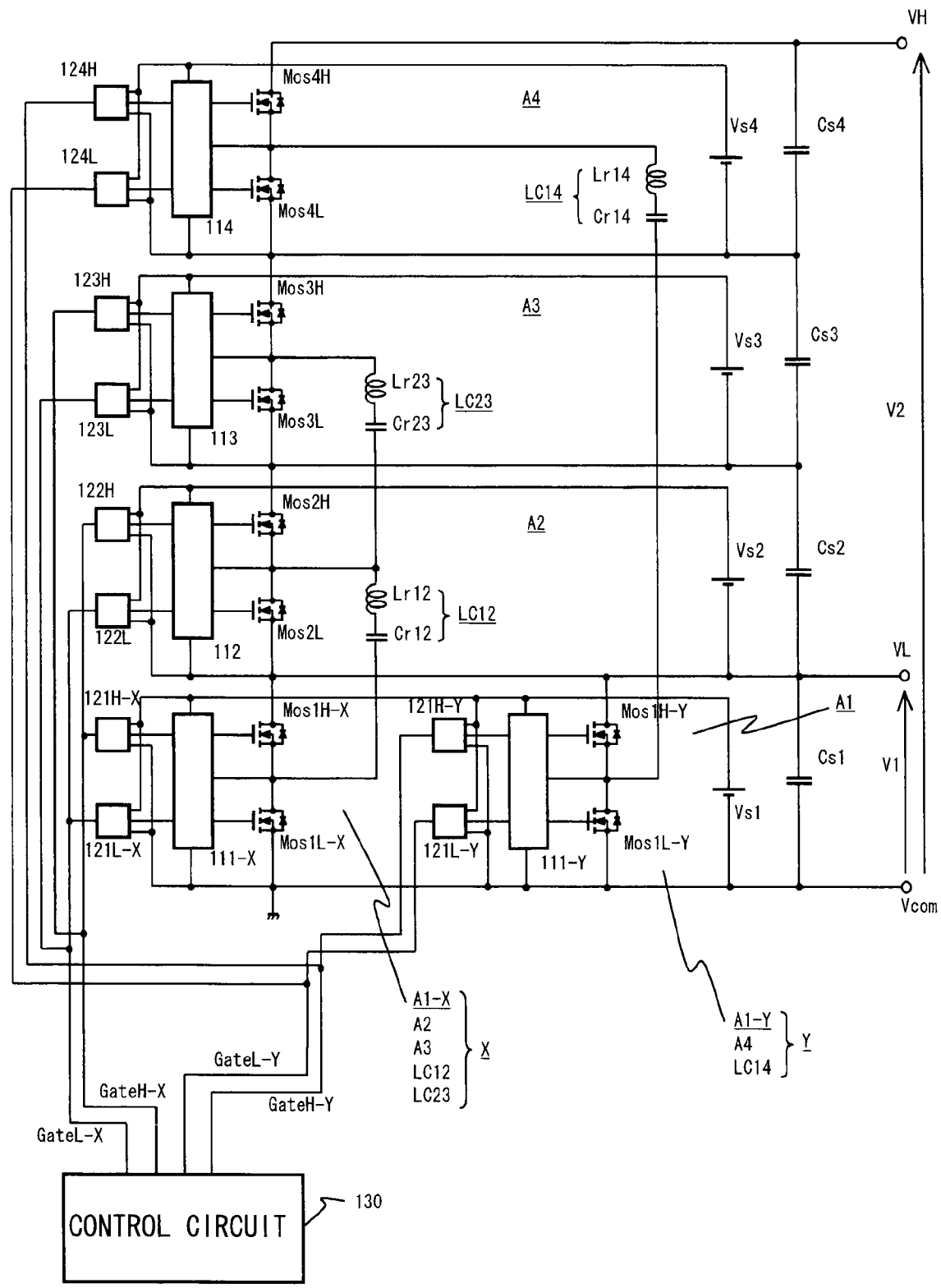
FIG. 12 is a block diagram to represent a circuital structure of a DC/DC power conversion device according to an eighth embodiment.

FIG. 12 is a block diagram to represent a circuital structure of a DC/DC power conversion device according to the eighth embodiment of the present invention.

As shown in FIG. 12, a DC/DC power conversion device includes a circuit A1 as a first circuit with two cell circuits A1-X and A1-Y connected in parallel and three circuits A2 to A4 as a second circuit. The circuit A1 as the first circuit and the circuits A2 to A4 as the second circuit are arranged for configuration of a plurality of stages (in this case, four stages). Furthermore, the DC/DC power conversion device includes voltage sources Vs1, Vs2, Vs3 and Vs4 for driving, smoothing capacitors Cs1, Cs2, Cs3 and Cs4 for smoothing input and output voltages and further functioning as voltage sources for energy transfer, a control circuit 130, and input and output voltage terminals Vcom, VL and VH. The DC/DC power conversion device has a function to convert a voltage V1 input across the voltage terminals VL and Vcom into a boosted voltage V2 about four times a magnitude of the voltage V1 for output across the voltage terminals VH and Vcom.

The cell circuits A1-X and A1-Y, and the second circuits A2 to A4 are configured by connecting two MOSFETs in series as a low voltage sided element and a high voltage sided element in the same manner as the first embodiment. The first circuit A1 is configured by connecting in parallel the cell circuits A1-X and A1-Y and connecting them between both terminals of the smoothing capacitor Cs1.

The second circuits A2 to A4 are connected between both terminals of the smoothing capacitors Cs2, Cs3 and Cs4, respectively. The circuit A1 and three circuits A2, A3 and A4 are connected in series to configure four-stage circuits. Contact points of two MOSFETs in the cell circuits A1-X, A1-Y and the circuits A2, A3 and A4 are middle points. An LC serial body LC14 including a capacitor Cr14 and an inductor Lr14 connected in series and playing a part in transferring energy is connected between the middle points of the cell circuit A1-Y and the circuit A4.

LC serial bodies LC12 and LC23 including capacitors Cr12 and Cr23 and inductors Lr12 and Lr23 connected in series and playing a part in transferring energy are sequentially connected between the middle points of the respective adjacent circuits of three circuits connected in series in an order of the cell circuit A1-X, the circuit A2 and the circuit A3. Values of resonant cycles determined by inductances of the inductors Lr and capacitances of the capacitors Cr of the respective stages are set to be identical.

The DC/DC power conversion device includes two column circuits X and Y such as a column circuit X comprised of the cell circuit A1-X, the circuit A2, the circuit A3, the LC serial body LC12 between the cell circuit A1-X and the circuit A2, and the LC serial body LC23 between the circuit A2 and the circuit A3, and a column circuit Y comprised of the cell circuit A1-Y, the circuit A4 and the LC serial body LC14.

Moreover, the DC/DC power conversion device includes gate driving circuits 111-X and 111-Y, and 112 to 114 and photocouplers 121L-X and 121H-X, 121L-Y and 121H-Y, and 122L and 122H to 124L and 124H for driving the MOSFETs in the cell circuits A1-X and A1-Y and the circuits A2, A3 and A4.

The operation thereof will now be described.

The circuit A1 as the first circuit operates as an inverter circuit for driving which transmits energy input across the voltage terminals VL and Vcom to the high voltage sides. In other words, the cell circuits A1-X and A1-Y are used as inverter circuits for driving.

In the column circuit X, the cell circuit A1-X operates as an inverter circuit for driving and the circuits A2 and A3 operate as a rectifier circuit. In the column circuit Y, the cell circuit A1-Y operates as an inverter circuit for driving and the circuit A4 operates as a rectifier circuit.

The control circuit 130 generates the gate signals GateL-X and GateH-X, and GateL-Y and GateH-Y for the respective column circuits X and Y, and the respective column circuits X and Y are driven thereby. The gate signals GateL-X and GateH-X, and GateL-Y and GateH-Y for the respective column circuits X and Y are the same as those of the above-described embodiments, and the relationship of the currents flowing through the MOSFETs in the respective circuits and the gate signals is the same as that shown in FIG. 2 of the first embodiment.

The capacitances of the smoothing capacitors Cs1, Cs2, Cs3 and Cs4 are set to be sufficiently larger than those of the capacitors Cr12, Cr23 and Cr14 of the LC serial bodies. As described above, the voltage V1 input across the voltage terminals VL and Vcom is converted into the boosted voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs1 is charged with the voltage V1 and the smoothing capacitors Cs2, Cs3 and Cs4 are averagely charged with a voltage of (V2−V1)/3.

The operation of the column circuit X comprised of the cell circuit A1-X, the circuits A2 and A3 and the LC serial bodies LC12 and LC23 will be described.

When the low voltage sided MOSFETs Mos1L-X, Mos2L and Mos3L of the respective cell circuits A1-X and the circuits A2 and A3 turn on by the gate signal GateL-X for the low voltage sided MOSFETs, some energy accumulated in the smoothing capacitors Cs1 and Cs2 is transferred to the capacitor Cr12 and Cr 23 via following paths due to voltage differences therebetween.

Cs1⇒Mos2L⇒Lr12⇒Cr12⇒Mos1L-X

Cs1⇒Cs2⇒Mos3L⇒Lr23⇒Cr23⇒Lr12⇒Cr12⇒Mos1L-X

Subsequently, when the high voltage sided MOSFETs Mos1H-X, Mos2H and Mos3H of the cell circuit A1-X and the circuits A2 and A3 turn on by the gate signal GateH-X for the high voltage sided MOSFETs, energy accumulated in the capacitors Cr12 and Cr23 is transferred to the smoothing capacitors Cs2 and Cs3 via following paths due to voltage differences therebetween.

Cs12⇒Lr12⇒Mos2H⇒Cs2⇒Mos1H-X

Cr12⇒Lr12⇒Cr23⇒Lr23⇒Mos3H⇒Cs3⇒Cs2⇒Mos1H-X

The operation of the column circuit Y comprised of the cell circuit A1-Y, the circuit A4 and the LC serial body LC14 will now be described.

When the low voltage sided MOSFETs Mos1L-Y and Mos4L of the cell circuit A1-Y and the circuit A4 turn on by the gate signal GateL-Y for the low voltage sided MOSFETs, some energy accumulated in the smoothing capacitors Cs1, Cs2 and Cs3 is transferred to the capacitor Cr14 via a following path due to voltage differences therebetween.

Cs1⇒Cs2⇒Cs3⇒Mos4L⇒Lr14⇒Cr14⇒Mos1L-Y

Subsequently, when the high voltage sided MOSFETs Mos1H-Y and Mos4H of the cell circuit A1-Y and the circuit A4 turn on by the gate signal GateH-Y for the high voltage sided MOSFETs, energy accumulated in the capacitor Cr14 is transferred to the smoothing capacitors Cs2, Cs3 and Cs4 via a following path due to voltage differences therebetween.

Cr14⇒Lr14⇒Mos4H⇒Cs4⇒Cs3⇒Cs2⇒Mos1H-Y

As above, energy is transferred from the smoothing capacitor Cs1 to the smoothing capacitors Cs2, Cs3 and Cs4 by the charge-discharge of the capacitors Cr12, Cr23 and Cr14. Furthermore, the voltage V1 input across the voltage terminals VL and Vcom is converted into the boosted voltage V2 about four times the magnitude of the voltage V1 for output across the voltage terminals VH and Vcom.

Since the respective capacitors Cr12, Cr23 and Cr14 are connected in series to the respective inductors Lr12, Lr23 and Lr14 to configure the LC serial bodies LC12, LC23 and LC14, the transfer of the energy uses a resonant phenomenon, and thus a large amount of energy can be transferred efficiently.

Moreover, since the rectifier circuits A2, A3 and A4 adopt the MOSFETs in the present embodiment, conduction loss can be reduced and efficiency of power conversion can be increased relative to a case of adopting diodes as well.

The respective column circuits X and Y operate as described above. And the driving signals for driving the respective column circuits X and Y have the same driving cycle T (where T is a resonant cycle determined by the LC serial body) and are also out of phase with each other by T/2 like the third embodiment (Refer to FIG. 7).

With this, charge-discharge timing of the smoothing capacitors Cs1, Cs2, Cs3 and Cs4 become different, the currents flowing through the smoothing capacitors Cs1, Cs2 and Cs3 are generated dispersedly within one cycle, and the charge-discharge currents are circulated between the column circuits as well, thereby reducing the AC currents (ripple currents) flowing through the smoothing capacitors Cs1, Cs2 and Cs3. Such reduction of the ripple currents flowing through the smoothing capacitors causes reliability of the DC/DC power conversion device to be increased, efficiency for power conversion to be increased and a structure of the device to be made small-sized.

Although the DC/DC power conversion device includes two column circuits X and Y such as the column circuit X comprised of the cell circuit A1-X, the circuits A2 and A3 and the LC serial bodies LC21 and LC23, and the column circuit Y comprised of the cell circuit A1-Y, the circuit A4 and the LC serial body LC14 in the present embodiment, a make-up of two column circuits is not limited thereto. The number (m) of the column circuits may be more than 3.

In this case, column circuits are provided, which are comprised of above three circuits configured by connecting in series a cell circuit and above two circuits as a second circuit sequentially, and LC serial bodies connected respectively to middle points between the respective adjacent circuits. The driving signals for driving the respective column circuits have the same driving cycle and are also out of phase with each other by T/m, or 2π/m(rad), thereby reducing the AC currents (ripple currents) flowing through the smoothing capacitors efficiently. Moreover, not limited to the phase difference, the driving of being out of phase with the column circuits leads the charge-discharge currents toward the smoothing capacitors to be circulated among the column circuits for acquisition of an effect of reducing the ripple currents.

Furthermore, although the voltage boost typed DC/DC power conversion device of boosting the voltage V1 input across the voltage terminals VL and Vcom into the voltage V2 about four times higher than that for output across the voltage terminals VH and Vcom has been described in the present embodiment, an operation of deboosting the voltage V2 into the voltage V1 a quarter time lower than that is possible in the same manner as the second and the fourth embodiments. Moreover, if V1×4>V2, an operation of boosting voltage is performed, and, if V1×4<V2, an operation of deboosting voltage is performed, and thus energy transfer in both directions can be realized.

Although the rectifier circuits A2, A3 and A4 adopt the MOSFETs in the present embodiment, the rectifier circuits may adopt diodes like the fifth and the sixth embodiments.

Ninth Embodiment

A DC/DC power conversion device according to the ninth embodiment of the present invention will now be described.

Figure 13:
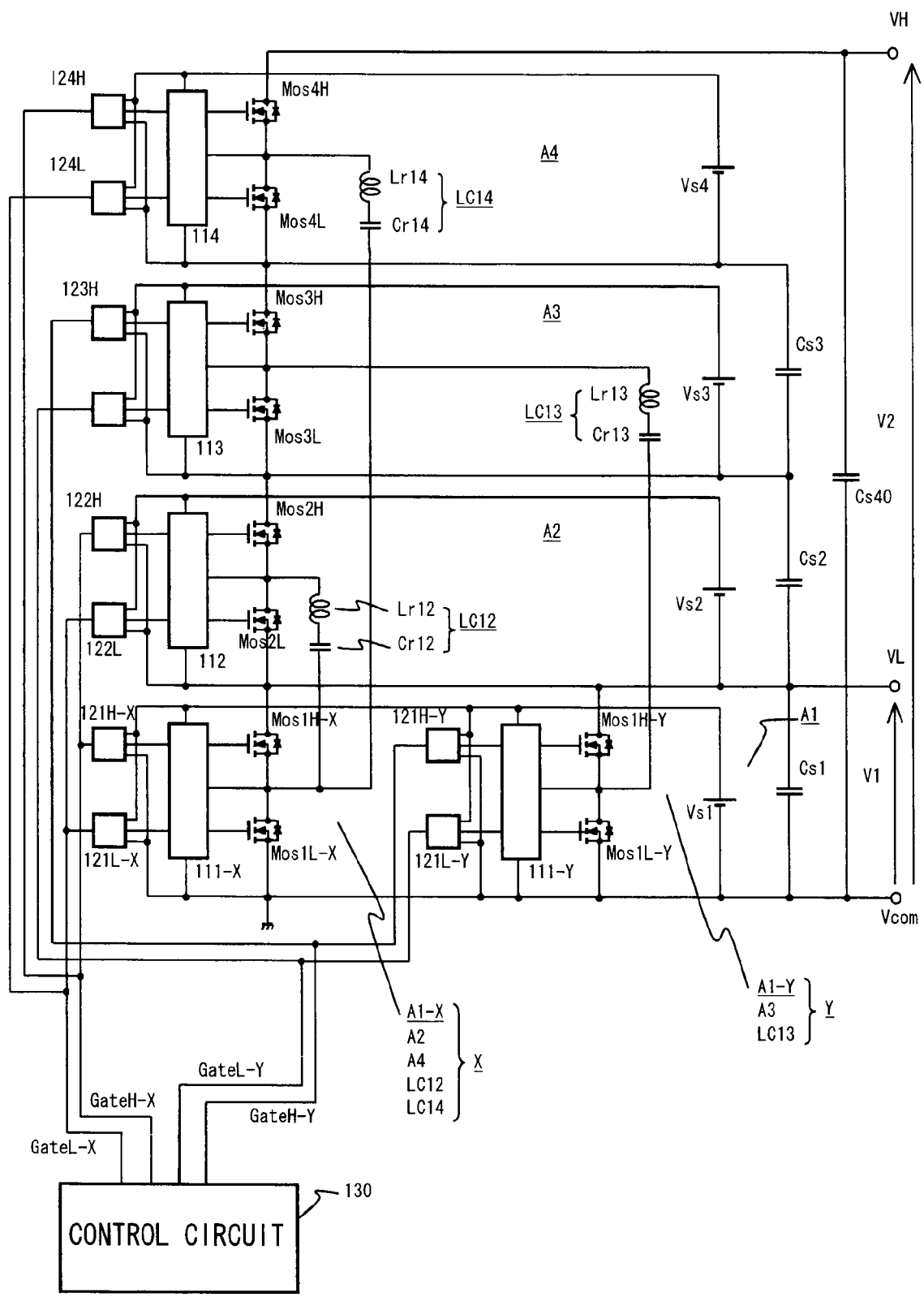
FIG. 13 is a block diagram to represent a circuital structure of a DC/DC power conversion device according to a ninth embodiment.

FIG. 13 is a block diagram to represent a circuital structure of a DC/DC power conversion device according to the ninth embodiment of the present invention, which modifies disposition of a smoothing capacitor of the DC/DC power conversion device according to the third embodiment shown in FIG. 6. The remaining configurations thereof are the same as those shown in FIG. 6, and the DC/DC power conversion device according to the present embodiment is also the same as that according to the third embodiment with the function to convert a voltage V1 input across the voltage terminals VL and Vcom into a boosted voltage V2 about four times a magnitude of the voltage V1 for output across the voltage terminals VH and Vcom.

The present embodiment is different from the third embodiment in that there is no smoothing capacitor Cs4 but instead a smoothing capacitor Cs40 as a high voltage side is disposed between the voltage terminals VH and Vcom, that is, between the high voltage sided terminal of the circuit A4 and the low voltage sided terminal of the circuit A1.

The operation thereof will now be described.

The circuit A1 as the first circuit operates as an inverter circuit for driving which transmits energy input across the voltage terminals VL and Vcom to the high voltage sides. In other words, the respective cells A1-X and A1-Y are used as inverter circuits for driving like the third embodiment.

In the column circuit X, the cell circuit A1-X operates as an inverter circuit for driving and the circuits A2 and A4 operate as a rectifier circuit. In the column circuit Y, the cell circuit A1-Y operates as an inverter circuit for driving and the circuit A3 operates as a rectifier circuit.

Like the third embodiment, the control circuit 130 generates the gate signals GateL-X and GateH-X, and GateL-Y and GateH-Y for the respective column circuits X and Y, and the respective column circuits X and Y are driven thereby.

The capacitances of the smoothing capacitors Cs1, Cs2, Cs3 and Cs40 are set to be sufficiently larger than those of the capacitors Cr12, Cr13 and Cr14 of the LC serial bodies.

As described above, the voltage V1 input across the voltage terminals VL and Vcom is converted into the boosted voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs1 is charged with the voltage V1 and the smoothing capacitors Cs2 and Cs3 are averagely charged with a voltage of (V2−V1)/3. The smoothing capacitor Cs40 is charged with the voltage V2.

The operation of the column circuit X comprised of the cell circuit A1-X, the circuits A2 and A4 and the LC serial bodies LC12 and LC14 will be described.

When the low voltage sided MOSFETs Mos1L-X, Mos2L and Mos4L of the cell circuits A1-X and the circuits A2 and A4 turn on by the gate signal GateL-X for the low voltage sided MOSFETs, some energy accumulated in the smoothing capacitors Cs1, Cs2 and Cs3 is transferred to the capacitor Cr12 and Cr14 via following paths due to voltage differences therebetween.

Cs1⇒Mos2L⇒Lr12⇒Cr12⇒Mos1L-X

Cs1⇒Cs2⇒Cs3⇒Mos4L⇒Lr14⇒Cr14⇒Mos1L-X

Subsequently, when the high voltage sided MOSFETs Mos1H-X, Mos2H and Mos4H of the cell circuit A1-X and the circuits A2 and A4 turn on by the gate signal GateH-X for the high voltage sided MOSFETs, energy accumulated in the capacitors Cr12 and Cr14 is transferred to the smoothing capacitors Cs2 and Cs40 via following paths due to voltage differences therebetween.

Cr12⇒Lr12⇒Mos2H⇒Cs2⇒Mos1H-X

Cr14⇒Lr14⇒Mos4H⇒Cs40⇒Cs1⇒Mos1H-X

The operation of the column circuit Y comprised of the cell circuit A1-Y, the circuit A3 and the LC serial body LC13 will now be described.

When the low voltage sided MOSFETs Mos1L-Y and Mos3L of the cell circuit A1-Y and the circuit A3 turn on by the gate signal GateL-Y for the low voltage sided MOSFETs, some energy accumulated in the smoothing capacitors Cs1 and Cs2 is transferred to the capacitor Cr13 via a following path due to voltage differences therebetween.

Cs1⇒Cs2⇒Mos3L⇒Lr13⇒Cr13⇒Mos1L-Y

Subsequently, when the high voltage sided MOSFETs Mos1H-Y and Mos3H of the cell circuit A1-Y and the circuit A3 turn on by the gate signal GateH-Y for the high voltage sided MOSFETs, energy accumulated in the capacitor Cr13 is transferred to the smoothing capacitors Cs2 and Cs3 via a following path due to voltage differences therebetween.

Cr13⇒Lr13⇒Mos3H⇒Cs3⇒Cs2⇒Mos1H-Y

As above, energy is transferred from the smoothing capacitor Cs1 to the smoothing capacitors Cs2, Cs3 and Cs40 by the charge-discharge of the capacitors Cr12, Cr13 and Cr14. The flow of energy transfer at the time the high voltage sided MOSFETs Mos1H-X and Mos4H of the cell circuit A1-X and the circuit A4 turn on in the present embodiment is different from that in the third embodiment.

Furthermore, the voltage V1 input across the voltage terminals VL and Vcom is converted into the boosted voltage V2 about four times the magnitude of the voltage V1 for output across the voltage terminals VH and Vcom. Since the respective capacitors Cr12, Cr13 and Cr14 are connected in series to the respective inductors Lr12, Lr13 and Lr14 to configure the LC serial bodies LC12, LC13 and LC14, the energy transfer uses a resonant phenomenon, and thus a large amount of energy can be transferred efficiently. Moreover, since the rectifier circuits A2 to A4 adopt the MOSFETs in the present embodiment, conduction loss can be reduced and efficiency of power conversion can be also increased relative to a case of adopting diodes.

The respective column circuits X and Y operate as described above. The entire operation of the DC/DC power conversion device with two column circuits X and Y will now be described.

The gate signals GateH-X and GateH-Y, and GateL-X and GateL-Y for driving the MOSFETs of the respective column circuits X and Y are the same as those shown in FIG. 7 of the third embodiment. As shown in FIG. 7, the drive signals for driving the respective column circuits X and Y have the same cycle T (where T is a resonant cycle determined by the LC serial body) and are also out of phase with the column circuits X and Y by T/2.

Figure 14:
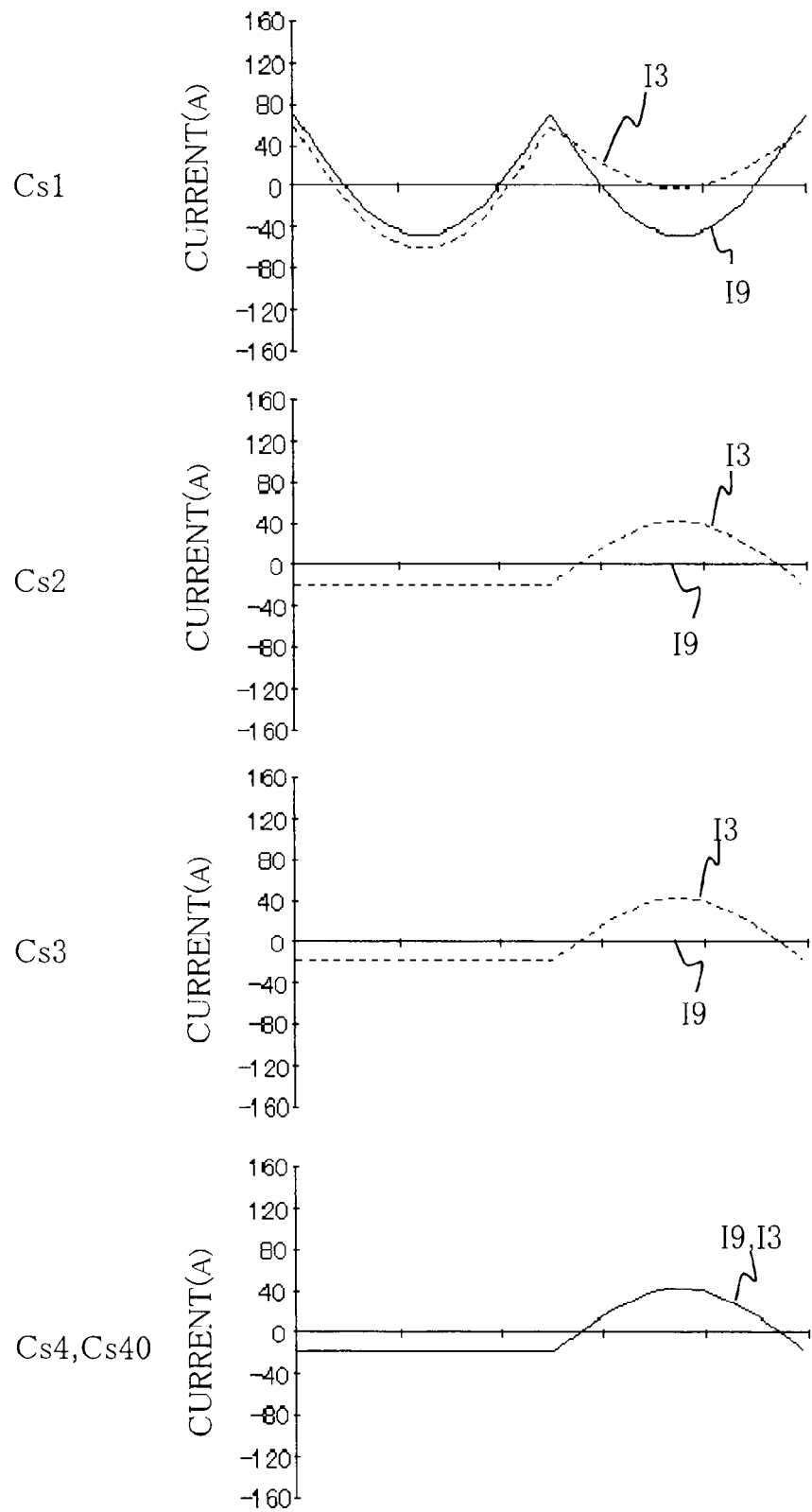
FIG. 14 shows waveforms of currents flowing through smoothing capacitors according to the ninth embodiment together with comparative examples.

For example, FIG. 14 shows waveforms of currents flowing through the smoothing capacitors Cs1, Cs2, Cs3, Cs40 and Cs4 under the condition of the voltage V1 of 72V and an input DC current of 75 A.

In more detail, FIG. 14 shows the waveforms (represented by I9) of currents flowing through the respective smoothing capacitors Cs1, Cs2, Cs3 and Cs40 according to the present embodiment, and the waveforms (represented by I3) of currents flowing through the smoothing capacitors Cs1, Cs2, Cs3 and Cs4 according to the third embodiment as comparative examples. The longitudinal axis represents currents and the transverse axis represents time in FIG. 14.

As shown in FIG. 14, the ripple currents flowing through the smoothing capacitors Cs2 and Cs3 according to the present embodiment become zero to be reduced largely. The ripple current flowing through the smoothing capacitor Cs40 of the present embodiment is the same as that flowing through the smoothing capacitor Cs4 of the third embodiment. The ripple current flowing through the smoothing capacitor Cs1 of the present embodiment becomes larger than that flowing through the smoothing capacitor Cs1 of the third embodiment, and the ripple current flowing through the smoothing capacitor Cs1 of the present embodiment is 1.06 times the magnitude of that flowing through the smoothing capacitor Cs1 of the third embodiment. As a whole, the present embodiment reduces the ripple currents of the smoothing capacitors relative to the third embodiment.

As above, the first circuit A1, which operates as an inverter circuit for driving, among the four-stage circuits A1, A2, A3 and A4 is configured by connecting in parallel two cell circuits A1-X and A1-Y, and this configures two column circuits X and Y in the DC/DC power conversion device.

The respective column circuits X and Y have the same driving cycle and are also out of phase with each other by T/2, or $2\pi/2$(rad) for driving the DC/DC power conversion device. With this, charge-discharge timing of the smoothing capacitors Cs1, Cs2 and Cs3 become different, the currents flowing to the smoothing capacitors Cs1, Cs2 and Cs3 are generated dispersedly within one cycle, and the charge-discharge currents are circulated between the column circuits as well, thereby reducing the AC currents (ripple currents) flowing through the smoothing capacitors Cs1, Cs2 and Cs3. In addition, the smoothing capacitor Cs40 is disposed between the voltage terminals VH and Vcom to reduce more the ripple currents of the smoothing capacitors than the third embodiment.

Such reduction of the ripple currents flowing through the smoothing capacitors causes reliability of the DC/DC power conversion device to be increased, efficiency for power conversion to be increased and a structure of the device to be made small-sized.

Tenth Embodiment

A DC/DC power conversion device according to the tenth embodiment of the present invention will now be described.

Figure 15:
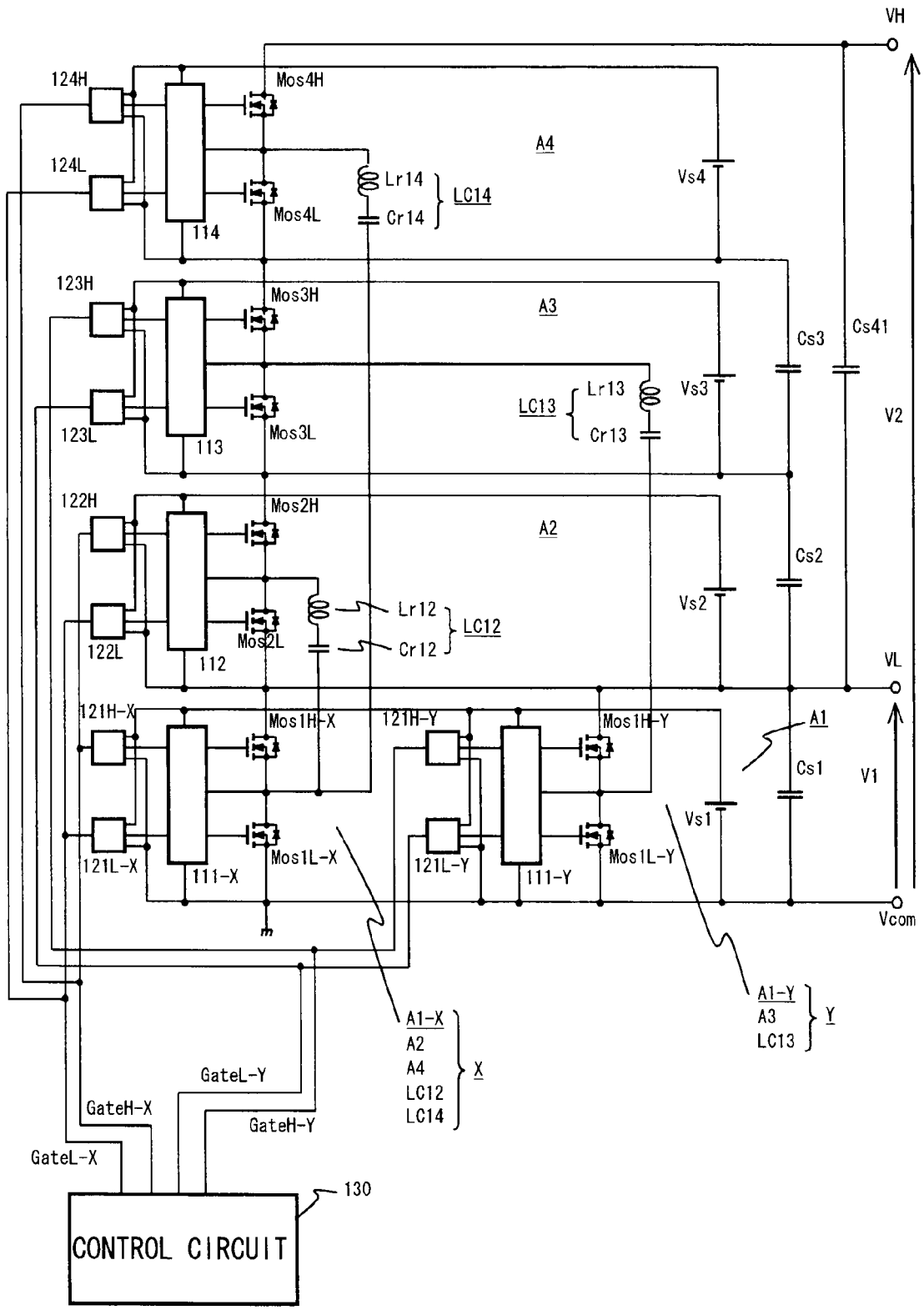
FIG. 15 is a block diagram to represent a circuital structure of a DC/DC power conversion device according to a tenth embodiment.

FIG. 15 is a block diagram to represent a circuital structure of a DC/DC power conversion device according to the tenth embodiment of the present invention, which modifies disposition of a smoothing capacitor of the DC/DC power conversion device according to the third embodiment shown in FIG. 6 using a different method from the ninth embodiment. The remaining configurations thereof are the same as those shown in FIG. 6, and the DC/DC power conversion device according to the present embodiment is also the same as that according to the third embodiment with the function to convert a voltage V1 input across the voltage terminals VL and Vcom into a boosted voltage V2 about four times a magnitude of the voltage V1 for output across the voltage terminals VH and Vcom.

The present embodiment is different from the third embodiment in that there is no smoothing capacitor Cs4 but instead a smoothing capacitor Cs41 as a high voltage side is disposed between the voltage terminals VH and VL, that is, between the high voltage sided terminal of the circuit A4 and the high voltage sided terminal of the circuit A1 (the low voltage sided terminal of the circuit A2).

The operation thereof will now be described.

The circuit A1 as the first circuit operates as an inverter circuit for driving which transmits energy input across the voltage terminals VL and Vcom to the high voltage sides. In other words, the respective cell circuits A1-X and A1-Y comprising the first circuit A1 are used as inverter circuits for driving like the third and the ninth embodiments.

In the column circuit X, the cell circuit A1-X operates as an inverter circuit for driving and the circuits A2 and A4 operate as a rectifier circuit. In the column circuit Y, the cell circuit A1-Y operates as an inverter circuit for driving and the circuit A3 operates as a rectifier circuit.

Like the third and the ninth embodiments, the control circuit 130 generates the gate signals GateL-X and GateH-X, and GateL-Y and GateH-Y for the respective column circuits X and Y, and the respective column circuits X and Y are driven thereby.

The capacitances of the smoothing capacitors Cs1, Cs2, Cs3 and Cs41 are set to be sufficiently larger than those of the capacitors Cr12, Cr13 and Cr14 of the LC serial bodies.

As described above, the voltage V1 input across the voltage terminals VL and Vcom is converted into the boosted voltage V2 about four times higher than that for output across the voltage terminals VH and Vcom and a load is connected between the voltage terminals VH and Vcom, and thus the voltage V2 has a lower value than 4×V1. In the steady state, the smoothing capacitor Cs1 is charged with the voltage V1 and the smoothing capacitors Cs2 and Cs3 are averagely charged with a voltage of (V2−V1)/3. The smoothing capacitor Cs41 is charged with the voltage (V2−V1).

The operation of the column circuit X comprised of the cell circuit A1-X, the circuits A2 and A4 and the LC serial bodies LC12 and LC14 will be described.

When the low voltage sided MOSFETs Mos1L-X, Mos2L and Mos4L of the respective cell circuits A1-X and the circuits A2 and A4 turn on by the gate signal GateL-X for the low voltage sided MOSFETs, some energy accumulated in the smoothing capacitors Cs1, Cs2 and Cs3 is transferred to the capacitor Cr12 and Cr 14 via following paths due to voltage differences therebetween.

Cs1⇒Mos2L⇒Lr12⇒Cr12⇒Mos1L-X

Cs1⇒Cs2⇒Cs3⇒Mos4L⇒Lr14⇒Cr14⇒Mos1L-X

Subsequently, when the high voltage sided MOSFETs Mos1H-X, Mos2H and Mos4H of the cell circuit A1-X and the circuits A2 and A4 turn on by the gate signal GateH-X for the high voltage sided MOSFETs, energy accumulated in the capacitors Cr12 and Cr14 is transferred to the smoothing capacitors Cs2 and Cs41 via following paths due to voltage differences therebetween.

Cr12⇒Lr12⇒Mos2H⇒Cs2⇒Mos1H-X

Cr14⇒Lr14⇒Mos4H⇒Cs41⇒Mos1H-X

The operation of the column circuit Y comprised of the cell circuit A1-Y, the circuit A3 and the LC serial body LC13 will now be described.

When the low voltage sided MOSFETs Mos1L-Y and Mos3L of the cell circuit A1-Y and the circuit A3 turn on by the gate signal GateL-Y for the low voltage sided MOSFETs, some energy accumulated in the smoothing capacitors Cs1 and Cs2 is transferred to the capacitor Cr13 via a following path due to voltage differences therebetween.

Cs1⇒Cs2⇒Mos3L⇒Lr13⇒Cr13⇒Mos1L-Y

Subsequently, when the high voltage sided MOSFETs Mos1H-Y and Mos3H of the cell circuit A1-Y and the circuit A3 turn on by the gate signal GateH-Y for the high voltage sided MOSFETs, energy accumulated in the capacitor Cr13 is transferred to the smoothing capacitors Cs2 and Cs3 via a following path due to voltage differences therebetween.

Cr13⇒Lr13⇒Mos3H⇒Cs3⇒Cs2⇒Mos1H-Y

As above, energy is transferred from the smoothing capacitor Cs1 to the smoothing capacitors Cs2, Cs3 and Cs41 by the charge-discharge of the capacitors Cr12, Cr13 and Cr14. The flow of energy transfer at the time the high voltage sided MOSFETs Mos1H-X and Mos4H of the cell circuit A1-X and the circuit A4 turn on in the present embodiment is different from that in the third and the ninth embodiments.

Furthermore, the voltage V1 input across the voltage terminals VL and Vcom is converted into the boosted voltage V2 about four times the magnitude of the voltage V1 for output across the voltage terminals VH and Vcom. Since the respective capacitors Cr12, Cr13 and Cr14 are connected in series to the respective inductors Lr12, Lr13 and Lr14 to configure the LC serial bodies LC12, LC13 and LC14, the energy transfer uses a resonant phenomenon, and thus a large amount of energy can be transferred efficiently. Moreover, since the rectifier circuits A2 to A4 adopt the MOSFETs in the present embodiment, conduction loss can be reduced and efficiency of power conversion can be increased relative to a case of adopting diodes, too.

The respective column circuits X and Y operate as described above. The entire operation of the DC/DC power conversion device with two column circuits X and Y will now be described.

The gate signals GateH-X and GateH-Y, and GateL-X and GateL-Y for driving the MOSFETs of the respective column circuits X and Y are the same as those shown in FIG. 7 of the third embodiment. As shown in FIG. 7, the drive signals for driving the respective column circuits X and Y have the same cycle T (where T is a resonant cycle determined by the LC serial body) and are out of phase with the column circuits X and Y by T/2 as well.

Figure 16:
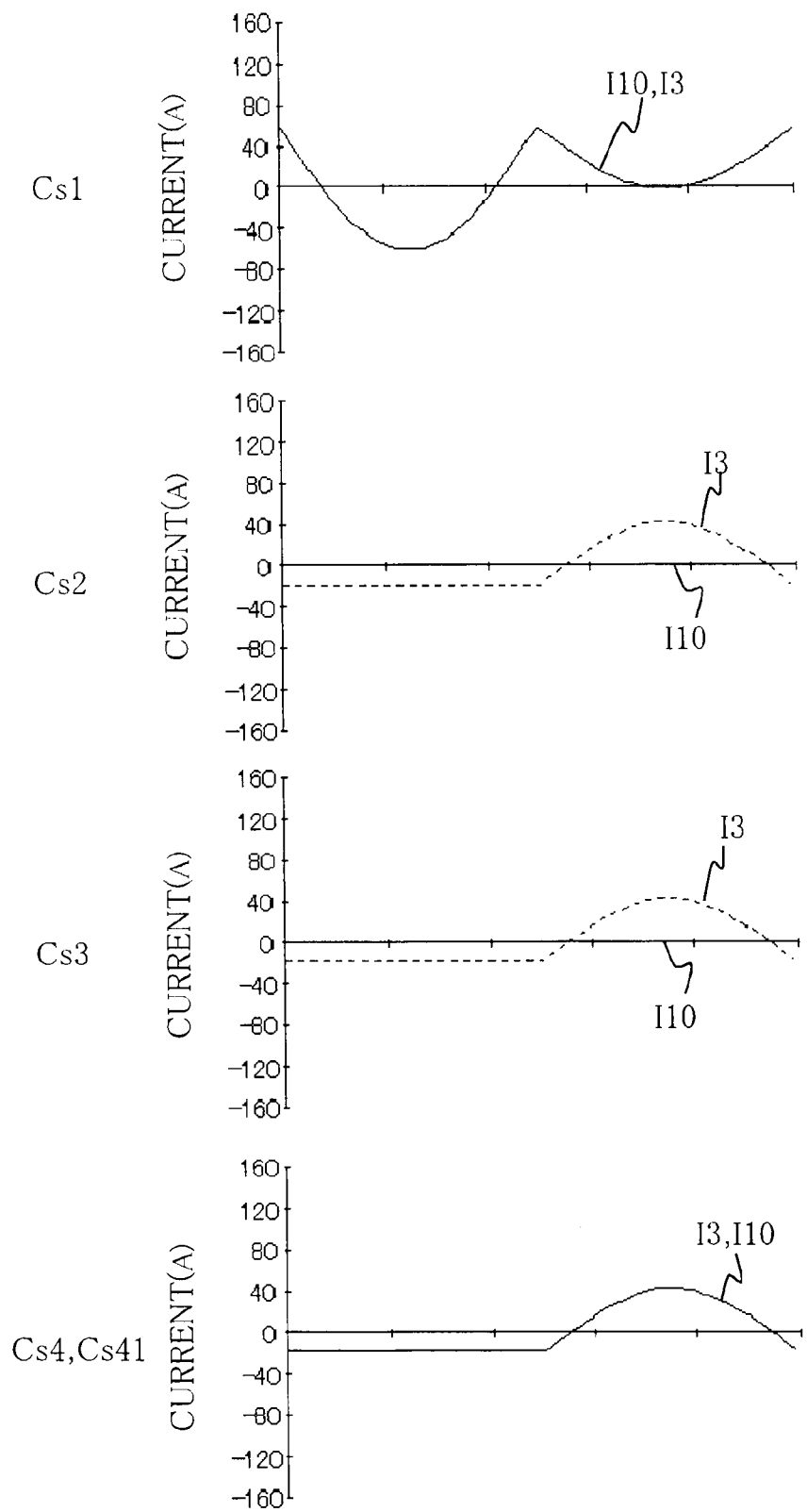
FIG. 16 shows waveforms of currents flowing through smoothing capacitors according to the tenth embodiment together with comparative examples.

FIG. 16 shows waveforms of currents flowing through the smoothing capacitors Cs1, Cs2, Cs3, Cs41 and Cs4 under the condition of the voltage V1 of 72V and an input DC current of 75 A, for example.

In more detail, FIG. 16 shows the waveforms (represented by I10) of currents flowing through the respective smoothing capacitors Cs1, Cs2, Cs3 and Cs41 according to the present embodiment, and the waveforms (represented by I3) of currents flowing through the smoothing capacitors Cs1, Cs2, Cs3 and Cs4 according to third embodiment as comparative examples. The longitudinal axis represents currents and the transverse axis represents time in FIG. 16.

As shown in FIG. 16, the ripple currents flowing through the smoothing capacitors Cs2 and Cs3 according to the present embodiment become zero to be reduced largely, and the ripple current flowing through the smoothing capacitor Cs41 of the present embodiment is the same as that flowing through the smoothing capacitor Cs4 of the third embodiment. In addition, the ripple current of the smoothing capacitor Cs1 according to the present embodiment is the same as that of the smoothing capacitor Cs1 according to the third embodiment. For this reason, the present embodiment reduces the ripple currents of the smoothing capacitors relative to the third embodiment.

As above, the first circuit A1, which operates as an inverter circuit for driving, among the four-stage circuits A1, A2, A3 and A4 is configured by connecting in parallel two cell circuits A1-X and A1-Y, and this configures two column circuits X and Y in the DC/DC power conversion device.

The respective column circuits X and Y have the same driving cycle and are also out of phase with each other by T/2, or $2\pi/2$(rad) for driving the DC/DC power conversion device.

With this, charge-discharge timing of the smoothing capacitors Cs1, Cs2 and Cs3 become different, the currents flowing to the smoothing capacitors Cs1, Cs2 and Cs3 are generated dispersedly within one cycle, and the charge-discharge currents are circulated between the column circuits as well, thereby reducing the AC currents (ripple currents) flowing through the smoothing capacitors Cs1, Cs2 and Cs3. In addition, the smoothing capacitor Cs41 is disposed between the voltage terminals VH and VL to reduce more the ripple currents of the smoothing capacitors than the third embodiment.

Such reduction of the ripple currents flowing through the smoothing capacitors causes reliability of the DC/DC power conversion device to be increased, efficiency for power conversion to be increased and a structure of the device to be made small-sized.

Although the ninth and the tenth embodiments reduce the ripple currents effectively by driving out of phase with two column circuits by T/2, or $2\pi/2$(rad), not limited to the phase difference, an effect of reducing the ripple currents is acquired by being out of phase with the column circuits.

Although the DC/DC power conversion device includes two column circuits X and Y such as the column circuit X comprised of the cell circuit A1-X, the circuits A2 and A4 and the LC serial bodies LC12 and LC14, and the column circuit Y comprised of the cell circuit A1-Y, the circuit A3 and the LC serial body LC13 in the ninth and the tenth embodiments, a make-up of two column circuits is not limited thereto.

For example, a make-up may be a column circuit comprised of the cell circuit A1-X, the circuits A2 and A3 and LC serial bodies LC12 and LC13 and a column circuit comprised of the cell circuit A1-Y, the circuit A4 and the LC serial body LC14.

Furthermore, although the ninth and the tenth embodiments represent the voltage boost typed DC/DC power conversion device of V1⇒V2, a voltage deboost typed energy transfer of V2⇒V1 can be realized like the fourth embodiment, making V1×4<V2, by using the circuits A2, A3 and A4 as an inverter circuit for driving and by using the circuit A1 as a rectifier circuit, and thus the ripple currents flowing through the smoothing capacitors can be reduced like the ninth and the tenth embodiments.

Additionally, energy transfer in both directions can be realized by the circuital configurations of the DC/DC power conversion device according to the ninth and the tenth embodiments. In this case, if V1×4>V2, an operation of boosting voltage is performed, and, on boosting voltage, the circuit A1 is used as an inverter circuit for driving and the circuits A2, A3 and A4 are used as a rectifier circuit. Further, if V1×4<V2, an operation of deboosting voltage is performed, and, on deboosting voltage, the circuits A2, A3 and A4 are used as an inverter circuit for driving and the circuit A1 is used as a rectifier circuit.

The boosting-deboosting DC/DC power conversion device controlled as described above obtains the same effects as the ninth and the tenth embodiments and can be also used widely due to realization of energy transfer in both directions using one device.

Although the rectifier circuits A2, A3 and A4 adopt the MOSFETs in the ninth and the tenth embodiments, the rectifier circuits may adopt diodes like the fifth and the sixth embodiments. Further, in a case of a deboosted typed energy transfer of V2⇒V1, the rectifier circuits are A1-X and A1-Y, which may adopt diodes.

Eleventh Embodiment

A DC/DC power conversion device according to the eleventh embodiment of the present invention will now be described.

Figure 17:
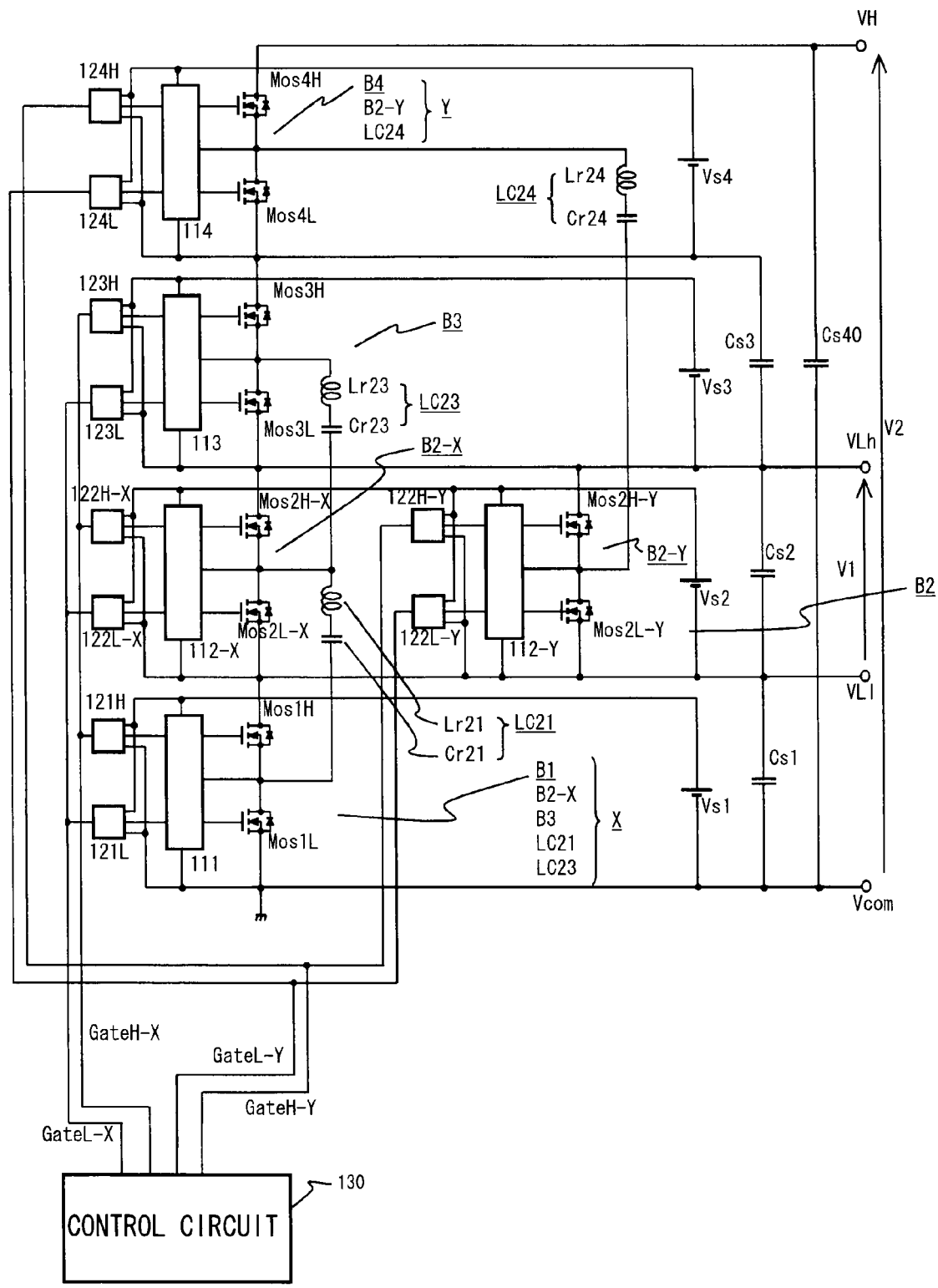
FIG. 17 is a block diagram to represent a circuital structure of a DC/DC power conversion device according to an eleventh embodiment.

FIG. 17 is a block diagram to represent a circuital structure of a DC/DC power conversion device according to the eleventh embodiment of the present invention, which modifies disposition of a smoothing capacitor of the DC/DC power conversion device according to the seventh embodiment shown in FIG. 11. The remaining configurations thereof are the same as those shown in FIG. 11, and the DC/DC power conversion device according to the present embodiment is also the same as that according to the seventh embodiment with the function to convert a voltage V1 input across the voltage terminals VLh and VLl into a boosted voltage V2 about four times a magnitude of the voltage V1 for output across the voltage terminals VH and Vcom.

The present embodiment is different from the seventh embodiment in that there is no smoothing capacitor Cs4 but instead a smoothing capacitor Cs40 as a high voltage side is disposed between the voltage terminals VH and Vcom, that is, between the high voltage sided terminal of the circuit B4 and the low voltage sided terminal of the circuit B1.

The operation thereof will be described.

The circuit B2 as the first circuit operates as an inverter circuit for driving which transmits energy input across the voltage terminals VLh and VLl to the high voltage side like the seventh embodiment. In other words, the respective cells B2-X and B2-Y comprising the circuit B2 as the first circuit are used as inverter circuits for driving. In the column circuit X, the cell circuit B2-X operates as an inverter circuit for driving and the circuits B1 and B3 operate as a rectifier circuit. In the column circuit Y, the cell circuit B2-Y operates as an inverter circuit for driving and the circuit B4 operates as a rectifier circuit.

Like the seventh embodiment, the control circuit 130 generates the gate signals GateL-X and GateH-X, and GateL-Y and GateH-Y for the respective column circuits X and Y, and the respective column circuits X and Y are driven thereby.

The capacitances of the smoothing capacitors Cs1, Cs2, Cs3 and Cs40 are set to be sufficiently larger than those of the capacitors Cr21, Cr23 and Cr24 of the LC serial bodies.

As described above, the voltage V1 input across the voltage terminals VLh and VLl is converted into the boosted voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs2 is charged with the voltage V1 and the smoothing capacitors Cs1 and Cs3 are averagely charged with a voltage of (V2−V1)/3. The smoothing capacitor Cs40 is charged with the voltage V2.

The operation of the column circuit X comprised of the cell circuit B2-X, the circuits B1 and B3 and the LC serial bodies LC21 and LC23 will be described.

When the low voltage sided MOSFETs Mos2L-X, Mos1L and Mos3L of the respective cell circuits B2-X and the circuits B1 and B3 turn on by the gate signal GateL-X for the low voltage sided MOSFETs, some energy accumulated in the capacitor Cr21 is transferred to the smoothing capacitor Cs1 and some energy accumulated in the smoothing capacitor Cs2 to the capacitor Cr23 via following paths due to voltage differences therebetween.

Cr21⇒Lr21⇒Mos2L-X⇒Cs1⇒Mos1L

Cs2⇒Mos3L⇒Lr23⇒Cr23⇒Mos2L-X

Subsequently, when the high voltage sided MOSFETs Mos2H-X, Mos1H and Mos3H of the cell circuit B2-X and the circuits B1 and B3 turn on by the gate signal GateH-X for the high voltage sided MOSFETs, some energy accumulated in the smoothing capacitor Cs2 is transferred to the capacitor Cr21 and some energy accumulated in the capacitor Cr23 to the smoothing capacitor Cs3 via following paths due to voltage differences therebetween.

Cs2⇒Mos2H-X⇒Lr21⇒Cr21⇒Mos1H

Cr23⇒Lr23⇒Mos3H⇒Cs3⇒Mos2H-X

The operation of the column circuit Y comprised of the cell circuit B2-Y, the circuit B4 and the LC serial body LC24 will now be described.

When the low voltage sided MOSFETs Mos2L-Y and Mos4L of the cell circuits B2-Y and the circuit B4 turn on by the gate signal GateL-Y for the low voltage sided MOSFETs, some energy accumulated in the smoothing capacitor Cs2 and Cs3 is transferred to the capacitor Cr24 via a following path due to voltage differences therebetween.

Cs2⇒Cs3⇒Mos4L⇒Lr24⇒Cr24⇒Mos2L-Y

Subsequently, when the high voltage sided MOSFETs Mos2H-Y and Mos4H of the cell circuit B2-Y and the circuit B4 turn on by the gate signal GateH-Y for the high voltage sided MOSFETs, energy accumulated in the capacitor Cr24 and the smoothing capacitors Cs1 and Cs2 is transferred to the smoothing capacitor Cs40 via a following path due to voltage differences therebetween.

Cs1⇒Cs2⇒Mos2H-Y⇒Cr24⇒Lr24⇒Mos4H⇒Cs40

As above, energy is transferred from the smoothing capacitor Cs1 to the smoothing capacitors Cs2, Cs3 and Cs40 by the charge-discharge of the capacitors Cr21, Cr23 and Cr24. The flow of energy transfer at the time the high voltage sided MOSFETs Mos2H-Y and Mos4H of the cell circuit B2-Y and the circuit B4 turn on in the present embodiment is different from that in the seventh embodiments.

Furthermore, the voltage V1 input across the voltage terminals VLh and VLl is converted into the boosted voltage V2 about four times the magnitude of the voltage V1 for output across the voltage terminals VH and Vcom. Since the respective capacitors Cr21, Cr23 and Cr24 are connected in series to the respective inductors Lr21, Lr23 and Lr24 to configure the LC serial bodies LC21, LC23 and LC24, the transfer of the energy uses a resonant phenomenon, and thus a large amount of energy can be transferred efficiently. Moreover, since the rectifier circuits B1, B3 and B4 adopt the MOSFETs in the present embodiment as well, conduction loss can be reduced and efficiency of power conversion can be increased relative to a case of adopting diodes as well.

The respective column circuits X and Y operate as described above. The entire operation of the DC/DC power conversion device with two column circuits X and Y will now be described.

The gate signals GateH-X and GateH-Y, and GateL-X and GateL-Y for driving the MOSFETs of the respective column circuits X and Y are the same as those shown in FIG. 7 of the third embodiment. As shown in FIG. 7, the drive signals for driving the respective column circuits X and Y have the same cycle T (where T is a resonant cycle determined by the LC serial body) and are also out of phase with the column circuits by T/2.

Figure 18:
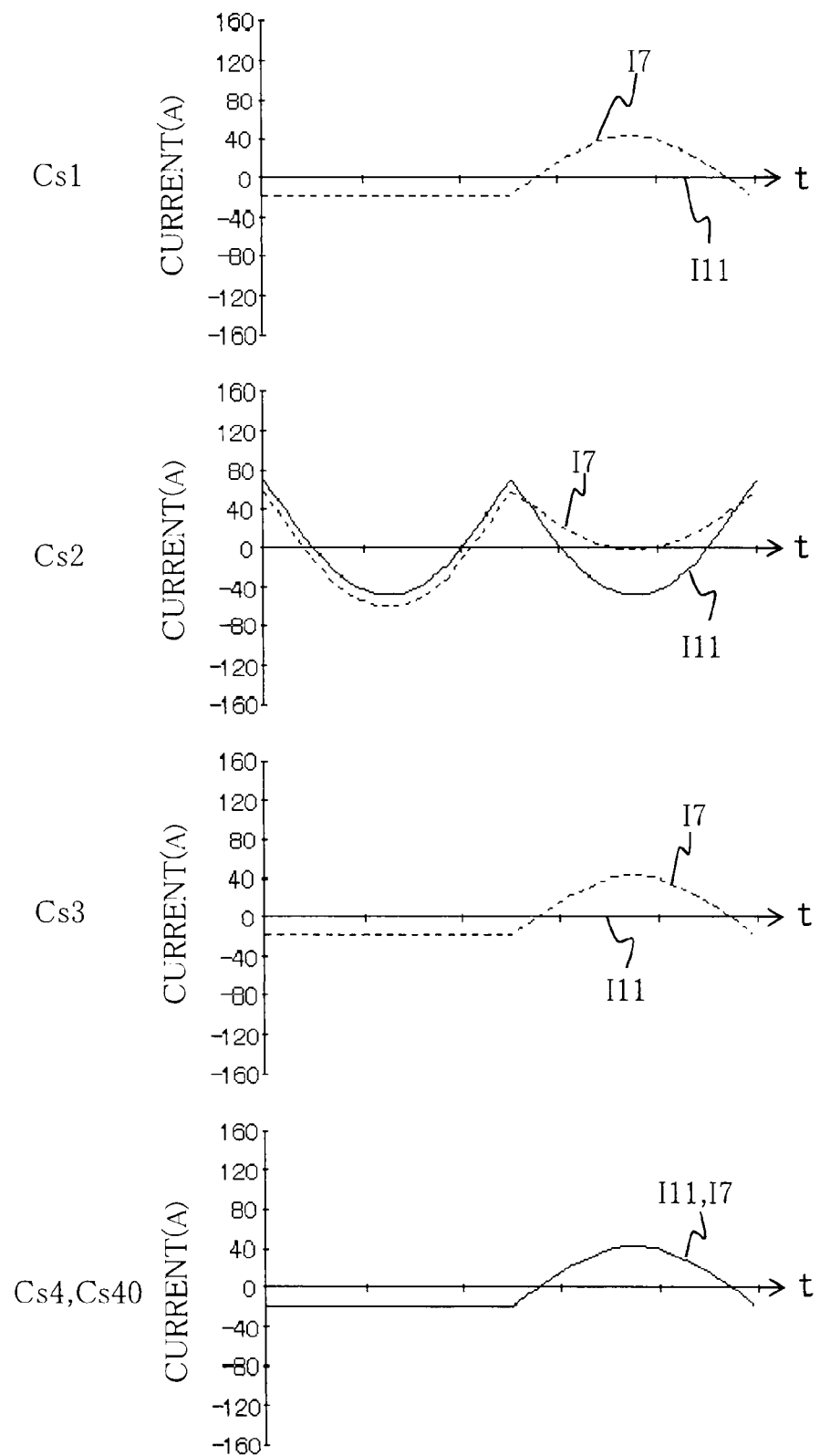
FIG. 18 shows waveforms of currents flowing through smoothing capacitors according to the eleventh embodiment together with comparative examples.

For example, FIG. 18 shows waveforms of currents flowing through the smoothing capacitors Cs1, Cs2, Cs3, Cs40 and Cs4 under the condition of the voltage V1 of 72V and an input DC current of 75 A. In more detail, FIG. 18 shows the waveforms (represented by I11) of currents flowing through the respective smoothing capacitors Cs1, Cs2, Cs3 and Cs40 according to the present embodiment, and the waveforms (represented by I7) of currents flowing through the smoothing capacitors Cs1, Cs2, Cs3 and Cs4 according to the seventh embodiment as comparative examples. The longitudinal axis represents currents and the transverse axis represents time in FIG. 18.

As shown in FIG. 18, the ripple currents flowing through the smoothing capacitors Cs1 and Cs3 according to the present embodiment become zero to be reduced largely, and the ripple current flowing through the smoothing capacitor Cs40 of the present embodiment is the same as that flowing through the smoothing capacitor Cs4 of the seventh embodiment.

The ripple current flowing through the smoothing capacitor Cs2 of the present embodiment becomes larger than that flowing through the smoothing capacitor Cs2 of the seventh embodiment, and the ripple current flowing through the smoothing capacitor Cs2 of the present embodiment is 1.06 times the magnitude of that flowing through the smoothing capacitor Cs2 of the seventh embodiment. As a whole, the present embodiment reduces the ripple currents of the smoothing capacitors relative to the seventh embodiment.

As above, the second circuit B2, which operates as an inverter circuit for driving, among the four-stage circuits B1, B2, B3 and B4 is configured by connecting in parallel two cell circuits B2-X and B2-Y, and this configures two column circuits X and Y in the DC/DC power conversion device. The respective column circuits X and Y have the same driving cycle and are also out of phase with each other by T/2, or $2\pi/2$(rad) for driving the DC/DC power conversion device.

With this, charge-discharge timing of the smoothing capacitors Cs1, Cs2 and Cs3 become different, the currents flowing to the smoothing capacitors Cs1, Cs2 and Cs3 are generated dispersedly within one cycle, and the charge-discharge currents are circulated between the column circuits as well, thereby reducing the AC currents (ripple currents) flowing through the smoothing capacitors Cs1, Cs2 and Cs3. In addition, the smoothing capacitor Cs40 is disposed between the voltage terminals VH and Vcom to reduce more the ripple currents of the smoothing capacitors than the seventh embodiment.

Such reduction of the ripple currents flowing through the smoothing capacitors causes reliability of the DC/DC power conversion device to be increased, efficiency for power conversion to be increased and a structure of the device to be made small-sized.

Twelfth Embodiment

A DC/DC power conversion device according to the twelfth embodiment of the present invention will now be described.

Figure 19:
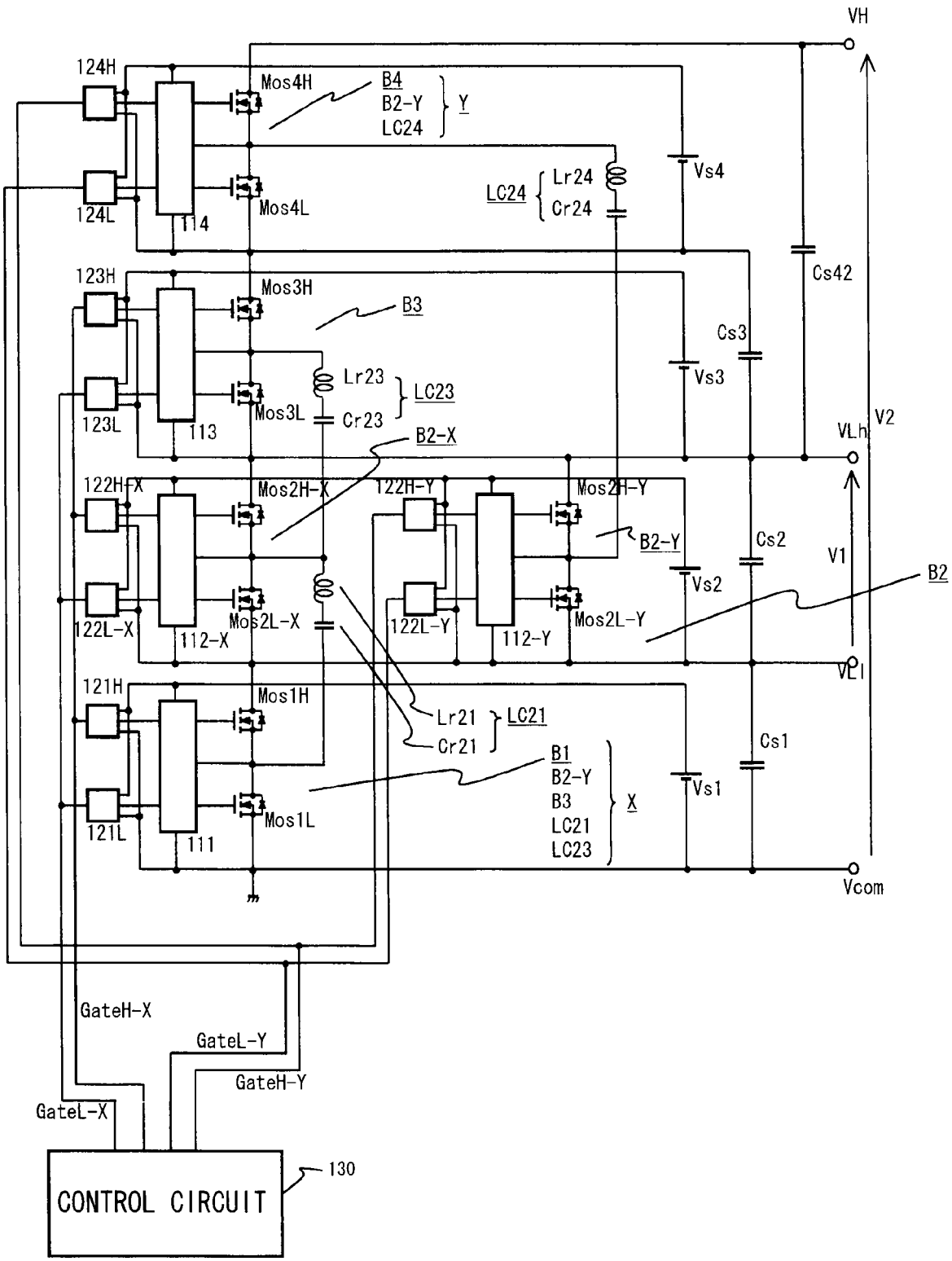
FIG. 19 is a block diagram to represent a circuital structure of a DC/DC power conversion device according to a twelfth embodiment.

FIG. 19 is a block diagram to represent a circuital structure of a DC/DC power conversion device according to the twelfth embodiment of the present invention, which modifies disposition of a smoothing capacitor of the DC/DC power conversion device according to the seventh embodiment shown in FIG. 11 using a different method from the eleventh embodiment. The remaining configurations thereof are the same as those shown in FIG. 11, and the DC/DC power conversion device according to the present embodiment is also the same as that according to the seventh embodiment with the function to convert a voltage V1 input across the voltage terminals VLh and VL1 into a boosted voltage V2 about four times a magnitude of the voltage V1 for output across the voltage terminals VH and Vcom.

The present embodiment is different from the seventh embodiment in that there is no smoothing capacitor Cs4 but instead a smoothing capacitor Cs42 as a high voltage side is disposed between the voltage terminals VH and VLh, that is, between the high voltage sided terminal of the circuit B4 and the high voltage sided terminal of the circuit B2 (the low voltage sided terminal of the circuit B3).

The operation thereof will be described.

The circuit B2 as the first circuit operates as an inverter circuit for driving which transmits energy input across the voltage terminals VLh and VL1 to the high voltage side like the seventh embodiment. In other words, the respective cells B2-X and B2-Y are used as inverter circuits for driving.

In the column circuit X, the cell circuit B2-X operates as an inverter circuit for driving and the circuits B1 and B3 operate as a rectifier circuit. In the column circuit Y, the cell circuit B2-Y operates as an inverter circuit for driving and the circuit B4 operates as a rectifier circuit.

Like the seventh embodiment, the control circuit 130 generates the gate signals GateL-X and GateH-X, and GateL-Y and GateH-Y for the respective column circuits X and Y, and the respective column circuits X and Y are driven thereby.

The capacitances of the smoothing capacitors Cs1, Cs2, Cs3 and Cs42 are set to be sufficiently larger than those of the capacitors Cr21, Cr23 and Cr24 of the LC serial bodies.

As described above, the voltage V1 input across the voltage terminals VLh and VL1 is converted into the boosted voltage V2 about four times higher than that for output across the voltage terminals VH and Vcom and a load is connected between the voltage terminal VH and Vcom, and thus the voltage V2 has a lower value than 4×V1. In the steady state, the smoothing capacitor Cs2 is charged with the voltage V1 and the smoothing capacitors Cs1 and Cs3 are averagely charged with a voltage of (V2−V1)/3. The smoothing capacitor Cs42 is averagely charged with a voltage of 2/3×(V2−V1).

The operation of the column circuit X comprised of the cell circuit B2-X, the circuits B1 and B3 and the LC serial bodies LC21 and LC23 will be described.

When the low voltage sided MOSFETs Mos2L-X, Mos1L and Mos3L of the respective cell circuits B2-X and the circuits B1 and B3 turn on by the gate signal GateL-X for the low voltage sided MOSFETs, some energy accumulated in the capacitor Cr21 is transferred to the smoothing capacitor Cs1 and some energy accumulated in the smoothing capacitor Cs2 to the capacitor Cr23 via following paths due to voltage differences therebetween.

Cr21⇒Lr21⇒Mos2L-X⇒Cs1⇒Mos1L

Cs2⇒Mos3L⇒Lr23⇒Cr23⇒Mos2L-X

Subsequently, when the high voltage sided MOSFETs Mos2H-X, Mos1H and Mos3H of the cell circuit B2-X and the circuits B1 and B3 turn on by the gate signal GateH-X for the high voltage sided MOSFETs, some energy accumulated in the smoothing capacitor Cs2 is transferred to the capacitor Cr21 and some energy accumulated in the capacitor Cr23 to the smoothing capacitor Cs3 via following paths due to voltage differences therebetween.

Cs2⇒Mos2H-X⇒Lr21⇒Cr21⇒Mos1H

Cr23⇒Lr23⇒Mos3H⇒Cs3⇒Mos2H-X

The operation of the column circuit Y comprised of the cell circuit B2-Y, the circuit B4 and the LC serial body LC24 will now be described.

When the low voltage sided MOSFETs Mos2L-Y and Mos4L of the cell circuits B2-Y and the circuit B4 turn on by the gate signal GateL-Y for the low voltage sided MOSFETs, some energy accumulated in the smoothing capacitor Cs2 and Cs3 is transferred to the capacitor Cr24 via a following path due to voltage differences therebetween.

Cs2⇒Cs3⇒Mos4L⇒Lr24⇒Cr24⇒Mos2L-Y

Subsequently, when the high voltage sided MOSFETs Mos2H-Y and Mos4H of the cell circuit B2-Y and the circuit B4 turn on by the gate signal GateH-Y for the high voltage sided MOSFETs, energy accumulated in the capacitor Cr24 is transferred to the smoothing capacitor Cs42 via a following path due to voltage differences therebetween.

Cr24⇒Lr24⇒Mos4H⇒Cs42⇒Mos2H-Y

As above, energy is transferred from the smoothing capacitor Cs1 to the smoothing capacitors Cs2, Cs3 and Cs42 by the charge-discharge of the capacitors Cr21, Cr23 and Cr24. The flow of energy transfer at the time the high voltage sided MOSFETs Mos2H-Y and Mos4H of the cell circuit B2-Y and the circuit B4 turn on in the present embodiment is different from that in the seventh embodiments.

Furthermore, the voltage V1 input across the voltage terminals VLh and VLl is converted into the boosted voltage V2 about four times the magnitude of the voltage V1 for output across the voltage terminals VH and Vcom. Since the respective capacitors Cr21, Cr23 and Cr24 are connected in series to the respective inductors Lr21, Lr23 and Lr24 to configure the LC serial bodies LC21, LC23 and LC24, the transfer of the energy uses a resonant phenomenon, and thus a large amount of energy can be transferred efficiently. Moreover, since the rectifier circuits B1, B3 and B4 adopt the MOSFETs in the present embodiment as well, conduction loss can be reduced and efficiency of power conversion can be increased relative to a case of adopting diodes as well.

The respective column circuits X and Y operate as described above. The entire operation of the DC/DC power conversion device with two column circuits X and Y will now be described.

The gate signals GateH-X and GateH-Y, and GateL-X and GateL-Y for driving the MOSFETs of the respective column circuits X and Y are the same as those shown in FIG. 7 of the third embodiment. As shown in FIG. 7, the drive signals for driving the respective column circuits X and Y have the same cycle T (where T is a resonant cycle determined by the LC serial body) and are also out of phase with the column circuits by T/2.

Figure 20:
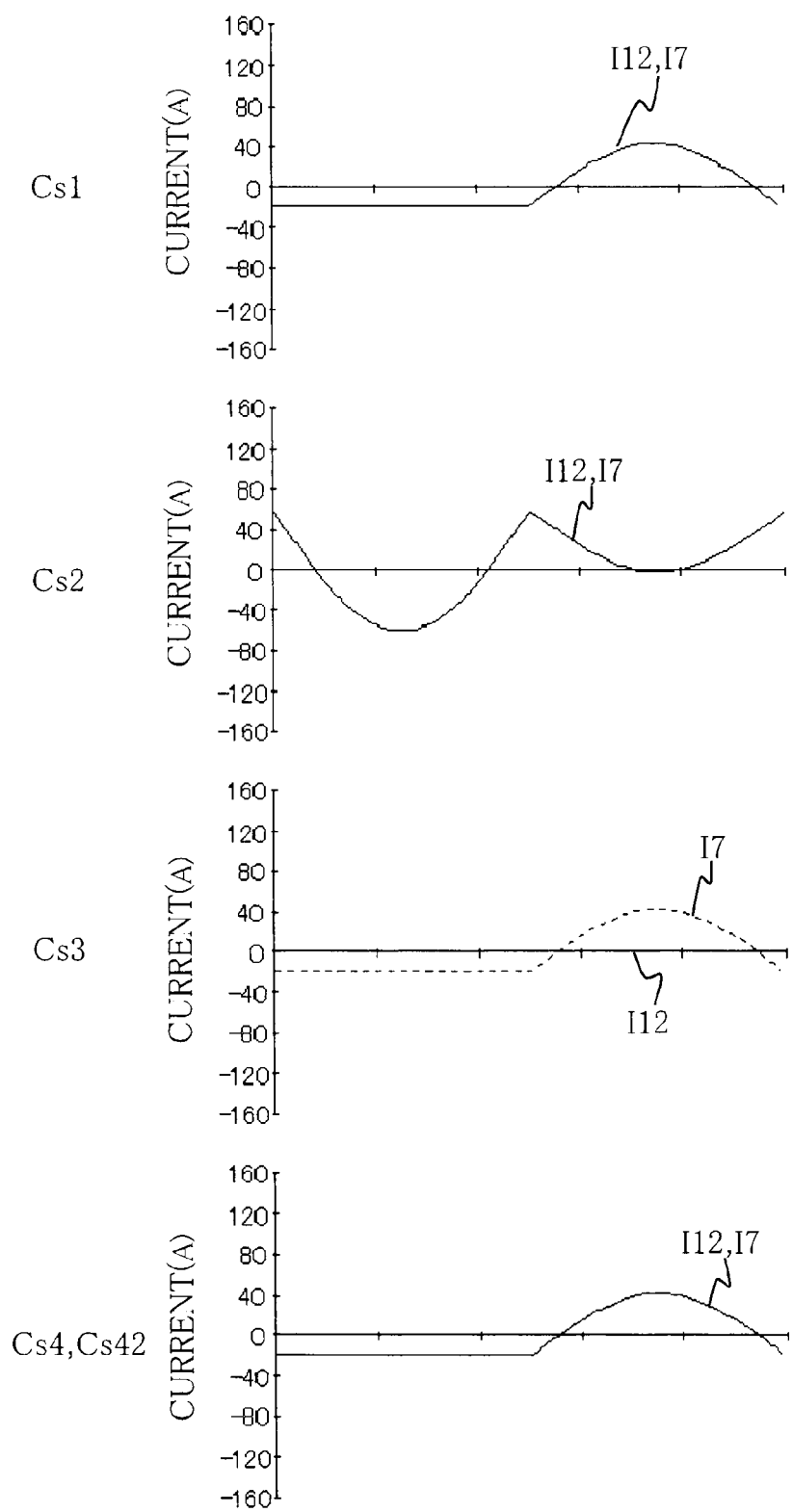
FIG. 20 shows waveforms of currents flowing through smoothing capacitors according to the twelfth embodiment together with comparative examples.

For example, FIG. 20 shows waveforms of currents flowing through the smoothing capacitors Cs1, Cs2, Cs3, Cs42 and Cs4 under the condition of the voltage V1 of 72V and an input DC current of 75 A. In more detail, FIG. 20 shows the waveforms (represented by I12) of currents flowing through the respective smoothing capacitors Cs1, Cs2, Cs3 and Cs42 according to the present embodiment, and the waveforms (represented by I7) of currents flowing through the smoothing capacitors Cs1, Cs2, Cs3 and Cs4 according to the seventh embodiment as comparative examples. The longitudinal axis represents currents and the transverse axis represents time in FIG. 20.

As shown in FIG. 20, the ripple current flowing through the smoothing capacitor Cs3 according to the present embodiment becomes zero to be reduced largely, and the ripple currents flowing through the smoothing capacitors Cs1 and Cs2 of the present embodiment are the same as those of the seventh embodiment. The ripple current flowing through the smoothing capacitor Cs42 of the present embodiment is the same as that flowing through the smoothing capacitor Cs4 of the seventh embodiment. For this reason, the present embodiment reduces the ripple currents of the smoothing capacitors relative to the seventh embodiment.

As above, the second circuit B2, which operates as an inverter circuit for driving, among the four-stage circuits B1, B2, B3 and B4 is configured by connecting in parallel two cell circuits B2-X and B2-Y, and this configures two column circuits X and Y in the DC/DC power conversion device. The respective column circuits X and Y have the same driving cycle and are also out of phase with each other by T/2, or 2π/2(rad) for driving the DC/DC power conversion device.

With this, charge-discharge timing of the smoothing capacitors Cs1, Cs2 and Cs3 become different, the currents flowing to the smoothing capacitors Cs1, Cs2 and Cs3 are generated dispersedly within one cycle, and the charge-discharge currents are circulated between the column circuits as well, thereby reducing the AC currents (ripple currents) flowing through the smoothing capacitors Cs1, Cs2 and Cs3. In addition, the smoothing capacitor Cs42 is disposed between the voltage terminals VH and VLh to reduce more the ripple currents of the smoothing capacitors than the seventh embodiment.

Such reduction of the ripple currents flowing through the smoothing capacitors causes reliability of the DC/DC power conversion device to be increased, efficiency for power conversion to be increased and a structure of the device to be made small-sized.

Although the eleventh and the twelfth embodiments reduce the ripple currents effectively by driving out of phase with two column circuits by T/2, or 2π/2(rad), not limited to the phase difference, an effect of reducing the ripple currents is acquired by being out of phase with the column circuits.

Although the DC/DC power conversion device includes two column circuits X and Y such as the column circuit X comprised of the cell circuit B2-X, the circuits B1 and B3 and the LC serial bodies LC21 and LC23, and the column circuit Y comprised of the cell circuit B2-Y, the circuit B4 and the LC serial body LC24 in the eleventh and the twelfth embodiments, a make-up of two column circuits is not limited thereto.

For example, a make-up may be a column circuit comprised of the cell circuit B2-X, the circuits B1 and B4 and LC serial bodies LC21 and LC24 and a column circuit comprised of the cell circuit B2-Y, the circuit B3 and the LC serial body LC23.

Furthermore, although the eleventh and the twelfth embodiments represent the voltage boost typed DC/DC power conversion device of V1⇒V2, a voltage deboost typed energy transfer of V2⇒V1 can be realized like the fourth embodiment, making V1×4<V2, by using the circuits B1, B3 and B4 as an inverter circuit for driving and by using the circuit B2 as a rectifier circuit, and thus the ripple currents flowing through the smoothing capacitors can be reduced like the eleventh and the twelfth embodiments.

Additionally, energy transfer in both directions can be realized by the circuital configurations of the DC/DC power conversion device according to the eleventh and the twelfth embodiments, and, in this case, if V1×4>V2, an operation of boosting voltage is performed, and, on boosting voltage, the circuit B2 is used as an inverter circuit for driving and the circuits B1, B3 and B4 are used as a rectifier circuit. Further, if V1×4<V2, an operation of deboosting voltage is performed, and, on deboosting voltage, the circuits B1, B3 and B4 are used as an inverter circuit for driving and the circuit B2 is used as a rectifier circuit.

The boosting-deboosting DC/DC power conversion device controlled as described above obtains the same effects as the eleventh and the twelfth embodiments and can be also used widely due to realization of energy transfer in both directions using one device.

Although the rectifier circuits B1, B3 and B4 adopt the MOSFETs in the eleventh and the twelfth embodiments, the rectifier circuits may adopt diodes like the fifth and the sixth embodiments. Further, in a case of a deboosted typed energy transfer of V2⇒V1, the rectifier circuits are B2-X and B2-Y, which may adopt diodes.

In the first to the twelfth embodiments, the capacitors for energy transfer have been connected to the inductors in series to configure the LC serial bodies for energy transfer using a resonant phenomenon. The energy transfer may be performed using only the capacitors without the inductors.

In this case, in the same manner as the respective embodiments, a plurality of column circuits are configured and the respective column circuits have the same driving cycle T and are also out of phase with each other, and thus an effect of reducing the ripple currents flowing through the smoothing capacitors is acquired. In this case, too, when the number of the column circuits is m, a driving such as being out of phase with each other by T/m, or 2π/m(rad) among the column circuits is the most effective.

Moreover, although power MOSFETs with parasitic diodes formed between sources and drains thereof have been adopted as switching elements of the inverter circuits for driving and the rectifier circuits in the respective embodiments, other semiconductor switching elements capable of controlling on and off operations by control electrodes such as IGBT, and so on, may be adopted, and, in such case, diodes connected in inverse parallel are used, which function as the parasitic diodes of the power MOSFETs.

Various modifications and alterations of this invention will be apparent to those skilled in the art without departing from the scope and spirit of this invention, and it should be understood that this is not limited to the illustrative embodiments set forth herein.

What is claimed is:

1. A DC/DC power conversion device comprising:
  n-stage circuits configured by connecting in series circuits of n (where n is 3 or more) comprised of an inverter circuit for driving, which is configured by connecting in series high voltage sided elements and low voltage sided elements made of semiconductor switching elements and by connecting them between positive terminals and negative terminals of smoothing capacitors, and a rectifier circuit, which is configured by connecting in series high voltage sided elements and low voltage sided elements made of semiconductor switching elements or diodes and by connecting them between positive terminals and negative terminals of smoothing capacitors;
  a first circuit, corresponding to at least one among the n-stage circuits and configured by connecting in parallel cell circuits of m, where m is an integer of 2 or more, including the high voltage sided elements and the low voltage sided elements connected in series for connection between the positive and the negative terminals of the smoothing capacitors,
  second circuits corresponding to a plurality of remaining circuits among the n-stage circuits;
  capacitors for energy transfer connected between middle points of the cell circuits and middle points of the second circuits; and column circuits of m comprised of the cell circuits, the second circuits and the capacitors for energy transfer, and
  wherein the first circuit is either the inverter circuit for driving or the rectifier circuit, and the second circuit is the remaining one between the inverter circuit for driving and the rectifier circuit;
  the middle points are contact points of the high voltage sided elements and the low voltage sided elements of the cell circuits and the second circuits; and
  driving signals for driving the respective column circuits have the same driving cycle T and are out of phase with each other.

2. The DC/DC power conversion device of claim 1, wherein phases of the respective driving signals for driving the column circuits of m are different from each other by T/m.

3. The DC/DC power conversion device of claim 1, wherein the number (m) of the cell circuits of the first circuit is the same as the number of the second circuits, and each of the column circuits is comprised of one cell circuit, one second circuit, and one capacitor for energy transfer connected therebetween.

4. The DC/DC power conversion device of claim 1, wherein the column circuits are comprised of the capacitors for energy transfer connected respectively between one cell circuit and each of one or more second circuit.

5. The DC/DC power conversion device of claim 1, wherein the column circuits are comprised of the capacitors for energy transfer connected respectively between respective adjacent circuits which are configured by connecting in series one cell circuit and two or more second circuits sequentially.

6. The DC/DC power conversion device of claim 1, wherein both ends of the first circuit are connected between other circuits in the circuits of n to be positioned at the middle.

7. The DC/DC power conversion device of claim 1, wherein the n-stage circuits connected in series are comprised of the first circuit of one and the second circuits of (n−1).

8. The DC/DC power conversion device of claim 1, wherein inductors are connected in series to the capacitors for energy transfer.

9. The DC/DC power conversion device of claim 8, wherein a plurality of serial bodies comprised of the capacitors for energy transfer and the inductors and disposed between the middle points of the cell circuits and the middle points of the second circuits have the same resonant cycle determined by capacitances of the capacitors and inductances of the inductors.

10. A DC/DC power conversion device comprising:
  n-stage circuits configured by connecting in series circuits of n (where n is 3 or more) comprised of an inverter circuit for driving configured by connecting in series a high voltage sided element and a low voltage sided element made of semiconductor switching elements, and a rectifier circuit configured by connecting in series a high voltage sided element and a low voltage sided element made of semiconductor switching elements or diodes;
  a high voltage sided smoothing capacitor connected between a high voltage sided terminal of one high voltage sided circuit and a low voltage sided terminal of a predetermined low voltage sided circuit in the n-stage circuits,
  smoothing capacitors connected respectively between high voltage sided terminals and low voltage sided terminals of remaining low voltage sided circuits of (n−1) stages,
  a first circuit corresponding to at least one among the n-stage circuits and configured by connecting in parallel two cell circuits including the high voltage sided element and the low voltage sided element connected in series,
  a second circuits corresponding to a plurality of remaining circuits among the n-stage circuits;
  capacitors for energy transfer connected between middle points of the cell circuits and middle points of the second circuits, two column circuits comprised of the cell circuits, the second circuits and the capacitors for energy transfer,
  wherein the first circuit is either the inverter circuit for driving or the rectifier circuit, and the second circuit is the remaining one between the inverter circuit for driving and the rectifier circuit;
  the middle points are contact points of the high voltage sided elements and the low voltage sided elements of the cell circuits and the second circuits; and
  driving signals for driving the respective column circuits have the same driving cycle T and are out of phase with each other.

11. The DC/DC power conversion device of claim 10, wherein phases of the respective driving signals for driving the two column circuits are different from each other by T/2.

12. The DC/DC power conversion device of claim 10, wherein the low voltage sided terminal of the predetermined low voltage sided circuit connected to the high voltage sided smoothing capacitor is a low voltage sided terminal of the lowest voltage sided circuit among the n-stage circuits.

13. The DC/DC power conversion device of claim 10, wherein the low voltage sided terminal of the predetermined low voltage sided circuit connected to the high voltage sided smoothing capacitor is connected to a high voltage sided terminal of the first circuit.

14. The DC/DC power conversion device of claim 10, wherein the column circuits are comprised of the capacitors for energy transfer connected respectively between one cell circuit and each of one or more second circuit.

15. The DC/DC power conversion device of claim 10, wherein the column circuits are comprised of the capacitors for energy transfer connected respectively between respective adjacent circuits which are configured by connecting in series one cell circuit and two or more second circuits sequentially.

16. The DC/DC power conversion device of claim 10, wherein both ends of the first circuit are connected between other circuits in the circuits of n to be positioned at the middle.

17. The DC/DC power conversion device of claim 10, wherein the n-stage circuits connected in series are comprised of the first circuit of one and the second circuits of (n−1).

18. The DC/DC power conversion device of claim 10, wherein inductors are connected in series to the capacitors for energy transfer.

19. The DC/DC power conversion device of claim 18, wherein a plurality of serial bodies comprised of the capacitors for energy transfer and the inductors and disposed between the middle points of the cell circuits and the middle points of the second circuits have the same resonant cycle determined by capacitances of the capacitors and inductances of the inductors.

* * * * *